United States Patent [19]

Ehrlich et al.

[11] 3,826,899

[45] July 30, 1974

[54] BIOLOGICAL CELL ANALYZING SYSTEM

[75] Inventors: Melvin P. Ehrlich, Roslyn Estates, L. I., N.Y.; Milton Stoller, West Hartford, Conn.; Stanley Grand, Westbury, L. I.; Robert De Cote, Flushing, both of N.Y.

[73] Assignee: Nuclear Research Associates, Inc., New Hyde Park, N.Y.

[22] Filed: Aug. 23, 1972

[21] Appl. No.: 283,074

Related U.S. Application Data

[62] Division of Ser. No. 850,547, Aug. 15, 1969, Pat. No. 3,699,336.

[52] U.S. Cl....... 235/92 PC, 235/92 R, 340/146.3 Y

[51] Int. Cl. .......................................... G06m 11/02

[58] Field of Search ................................ 235/92 PC

[56] References Cited

UNITED STATES PATENTS 3,315,229 2/1967 Smithline ........................ 235/92 PC

*Primary Examiner*—Paul J. Henon
*Assistant Examiner*—Robert F. Gnuse

[57] ABSTRACT

A biological cell analyzing system which is capable of automatically categorizing unstained biological cells as normal or non-normal. The cells are made to flow through a transparent tube in single file and are scanned with a mixture of ultra-violet and visible light. The cytoplasm and nucleus of each cell absorb ultra-violet radiation to different degrees, and the emergent light signal, as modulated by the scanned cells, is detected, amplified, and extended to a data processor which logically analyzes the signal from each cell on a real-time basis. The visible light signal is subtracted from the ultra-violet light signal to improve the signal/noise ratio of the latter, and to automatically cancel out non-biological debris. A number of acceptance tests are electronically performed on each cell, and if any of the tests is failed the cell is categorized as non-normal. Ambiguous conditions, resulting for example from the clumping of cells, are identified and separately counted. The system can process up to several thousand cells from a single sample during a 1-minute run.

53 Claims, 31 Drawing Figures

PATENTED JUL 30 1974 3,826,899

SHEET 08 OF 25

PATENTED JUL 30 1974

3,826,899

SHEET 12 OF 25

BIOLOGICAL CELL ANALYZING SYSTEM

This application is a division of application Ser. No. 850,547 filed Aug. 15, 1969 now Pat. No. 3,699,336 and copending herewith.

This invention relates to systems for automatically analyzing the chemical and morphological characteristics of biological cells, and more particularly to a system which is capable of analyzing unstained cells at a rate up to several thousand per minute.

For many years biological cells have been analyzed by first staining and then visually inspecting them under a microscope. The cytoplasm and nucleus of a cell appear differently when properly stained and a variety of objective criteria have been formulated to determine whether a cell is abnormal. The major disadvantages of the conventional approach to the examination of bilogical cells are that the cells must first be stained and isolated, and then visually examined by a cytotechnologist or a pathologist on a cell-by-cell basis. Since the vast majority of randomly obtained cell samples are normal, the task of mass screening is time consuming and costly.

In an effort to automate the analysis of biological cells, various schemes have been proposed. Some of these schemes entail the scanning of cells by irradiating them with ultra-violet light. Ultra-violet light is absorbed to a much greater extent by the DNA and RNA in the nucleus of a cell than by the cytoplasm of a cell. The ultra-violet light absorption in the two regions of the cell can be used to characterize the cell in accordance with various criteria as is known to those skilled in the art. For example, the total absorption is a measure of the size of the nucleus, an enlarged nucleus often being indicative of a cancerous cell. Examples of such prior art systems are disclosed in Kamentsky Pat. Nos. 3,327,117 and 3,327,119. In general, a shortcoming of the prior art automated scanning systems is that cells must still be handled individually, e.g., they must be placed on slides prior to examination. Also, the staining of cells is subject to non-uniformities in both the stain itself and the uptake per cell, and the overlapping of cells makes it very difficult to analyze them on an individual basis.

It is a general object of our invention to provide a system which automatically analyzes unstained biological cells on a cell-by-cell basis at a very high rate and which does not require the placing of cells on slides prior to scanning, thereby making mass screening feasible.

As suggested in the prior art, the present invention is predicated on the facts that the major portion of the DNA contained in a cell is in its nucleus and that DNA (when unstained) absorbs ultra-violet light to a much greater extent than do the other constituents of the cell. Individual cells in the system of the invention are scanned on a line-by-line basis, in a manner similar to the generation of a television signal. One of the problems which may be encountered with the scanning of a cell with ultra-violet light, however, is that conventional sources of ultra-violet radiation do not emit radiation with a constant intensity — there is generally a considerable amount of noise in the ultra-violet light output of the source. The logic circuits which analyze the ultra-violet signal after it is modulated by a cell may erroneously treat noise in the original source output as cellular information. Similarly, debris such as food particles, blood clots, etc. associated with the cells may modulate the ultra-violet signal although not representing true cellular information.

Another object of our invention is to improve the signal/noise ratio of a signal which is derived by scanning cells with ultra-violet light and to prevent non-cellular debris from being considered as cellular material.

Although the nucleus and cytoplasm of the cell absorb ultra-violet light to different degrees and this has been used in the prior art to distinguish between nuclear and cytoplasmic material, in some cases the relative absorption characteristics are not in themselves sufficiently different to allow differentiation between the two regions of a cell.

Another object of our invention is to provide a mechanism for more clearly differentiating between the nucleus and cytoplasm of a cell with the use of ultra-violet light.

It is also important in many cases to determine whether the cells being examined are deep lung cells. Lung cells can be obtained from a patient by having him cough deeply into a collection kit, such as the Cytec sputum collection kit marketed by the assignee of this application.

It is to be expected, however, that some persons will simply spit into the collection kit without first coughing deeply; in such a case, the cells collected will not be lung cells. It is very often desirable to verify that lung cells are being examined, which is usually done by verifying that a specific type of cell — the histiocyte — is contained in the specimen.

It is another object of our invention to provide a system which is capable of automatically characterizing a cell as a histiocyte.

In any system designed to examine automatically cells on an individual basis, it is necessary to detect "ambiguous" conditions. An ambiguous condition often arises when cells cling together in a clump. The various tests performed on the cells may erroneously categorize a clump of cells or debris as a non-normal cell when instead the scanned biological material should not be categorized as either normal or non-normal since a single cell has not been examined.

It is another object of our invention to detect ambiguous conditions (cell clumps, organic debris, etc.) and prevent their categorization as normal or non-normal cells.

There are numerous other objects of the present invention, such as the provision for electronic simulation of a cell, provision for a visual display of cells as they are scanned, and many others.

These various individual objects will become apparent upon a reading of the detailed description below. In general, the techniques of automated cytology to be described herein can be used in many other applications, e.g., to distinguish between the various types of white cells in blood, to examine cervical cell samples, etc.

Before considering the illustrative embodiment of the present invention, it is necessary to understood the use of the terms "normal" and "non-normal" as used in the specification. Cells are usually categorized by a pathologist as normal or abnormal. However, there is a "gray" area separating the two regions defined by these antithetical terms. It is exceedingly difficult in some cases even for a trained pathologist to properly categorize a cell when it falls in the gray area. It is contemplated that the greatest advantage of an automated system of the type considered herein is that cell samples from vast numbers of persons can be accurately screened at relatively little cost. The system is designed to categorize a cell as normal if it is indeed clearly normal. Any cell falling into the gray region, that is, any cell which is not clearly normal, is categorized as non-normal. Thus, abnormal cells are categorized as non-normal as are cells which may be normal but are not clearly so. This latter class may be loosely referred to as "suspicious" or "atypical".

In order to examine cells on an individual basis, it is necessary to isolate them. Rather than placing the cells on slides, in accordance with the principles of our invention, they are made to flow in an essentially single file through a capillary tube having an inner diameter in the order of only 90 microns. Typical normal lung cell diameters are 40–50 microns, and by causing the cells to flow (in a carrier solution) through a small-bore capillary tube, it is possible to control an essentially single file flow past an optical scanning station. (In general, the inner diameter of the capillary tube is approximately twice as large as the diameter of a normal cell of the type being examined.)

The sample obtained from a patient is converted into a homogeneous dispersion of cells in an alcohol-base carrier solution. In the case of the Cytec sputum collection kit, the cells are received from the patient in the form of a mucal clump. They can be broken up mechanically (for example, with the use of a blender) and then filtered. The carrier solution is 50 percent water and 50 percent alcohol. Techniques for obtaining a filtered homogeneous dispersion of cells from such samples are well known to those skilled in the art.

As the cells flow in single file through the capillary tube, successive transverse lines are scanned with a mixture of ultra-violet and visible light derived from a common source. The modulated light signal is spectrally separated and extended to respective photomultiplier tubes which produce electrical signals corresponding to the degree of modulation of the respective light wavelengths during each line scan. The ultra-violet signal is the primary source of cell information in that it provides a measure of the bounds of nucleus and cytoplasm along each line scan. However, the visible light signal is electrically subtracted from the ultra-violet signal to improve the signal/noise ratio. The correlation of noise in the two common-source signals is great and consequently by subtracting one from the other, it is possible to minimize the resulting noise in the combined signal.

The subtraction process also filters out non-cellular debris because the ultra-violet light and visible light are absorbed to approximately the same extent, resulting in a net cancellation. The subtraction of the visible light signal from the ultra-violet signal serves still a third function. Although the nuclear and cytoplasmic regions of a cell can be distinguished by their different ultra-violet light absorption characteristics, in some cases the difference may be too small to allow the differentiation. By subtracting the visible light signal from the ultra-violet light signal, a much greater difference is discernible in the portions of the resulting signal corresponding to nucleus and cytoplasm. this is due to the fact that the visible light absorption is only slightly greater in the nucleus than it is in the cytoplasm, so that the subtraction of an approximately constant signal from the ultra-violet light signal results in an enhanced nucleus-to-cytoplasm discernibility.

The visible light signal is also used to determine whether a particular cell is a histiocyte. Histiocytes contain a considerable amount of carbon and, therefore, absorb visible light much more than other types of cells. Depending on how much of the visible light is absorbed, a cell can be characterized as a histiocyte.

The signal resulting from each line scan through a cell is processed in real-time. After a cell has been completely scanned, the results of the various tests performed on the individual line scans are used to categorize the cell. The final decisions are tallied in counter banks, and may be displayed on television-type monitors as well as recorded for subsequent study.

Although the system of the invention is designed to cause cells to flow in a single file through a transparent capillary tube, it has been found that it is not always possible to prevent the clumping of groups of cells together. In the case of a cell clump, it is desirable to inhibit the categorization of the biological material as either a normal or non-normal cell. For this reason, in the illustrative embodiment of the invention, a separate count is maintained of ambiguous conditions, along with the counts of normal and non-normal cells. The ambiguity logic is predicated on too many line scans detecting cellular material in succession.

If too many line scans in succession all result in the detection of cellular material, it is an indication that a group of cells may be clumped together. In the normal case where individual cells flow through the capillary tube, many line scans take place between successive cells since the cells do not immediately follow each other. The line scans in succession which result in the detection of cellular material are counted, and if the number exceeds a predetermined value it is an indication that a clump of cells may be present. At the same time, howver, it is possible that what has been encountered is an abnormally large cell, which cell also results in a very large number of successive line scans verifying the presence of cellular material.

For this reason, the total ambiguous count at the end of the scanning of a sample may be indicative of an excessive number of abnormally large cells, or of inadequate cell processing which resulted in clumping. At the end of the scanning of each sample, the total non-normal and ambiguous counts are recorded, together with the total number of individual cells detected (where a cell clump is counted as an individual cell). If the total number of non-normal cells or the total number of ambiguous cells is too high for the particular total cell count, it is an indication that the sample requires further study.

The line scan signal, in addition to being operated upon by a data processor to determine cell characteristics, is also used to form a display on a TV monitor, the display actually showing the silhouette of cells flowing through the capillary tube. The display allows various adjustments to be made by the operator, e.g., the focusing of the light raster through the center of the capillary tube, as well as visual verification of air, intermittent flow, or clogging of the tube whenever such conditions are present.

The signal can also be recorded on video tape. The tape can subsequently be played back and the signal can be fed to the data processor in lieu of an actual cell scanning signal. In this manner, previously recorded cells can be observed at the same time that the data processor evaluates them again. Various threshold levels in the data processor can be adjusted at this time to change subsequent categorizations, or repeatability tests can be performed to see if the same input data produces the same category counts.

An "annotation" signal is developed which affords a visual presentation of the categorization of each cell in accordance with a pre-set code. The annotation signal is made to appear on the TV monitor display following each cell as it flows through the capillary tube. The annotation signal may also be recorded on the video tape so that a convenient record may be made not only of the silhouette of every cell, but of the decisions made by the data processor with respect to it.

An electronic cell simulator is provided for generating an artificial cell scanning signal. The simulated signal is useful, for example, in adjusting various threshold levels in the data processor and for tracing malfunctions in the system.

In the illustrative embodiment of the invention, five distinct tests can be performed on each cell. These tests relate to the size of the diameter of the cell nucleus, the size of the cytoplasm shoulders on either side of the nucleus, the ratio of the sizes of the nucleus and the overall cell, the symmetry of the cytoplasm shoulders on either side of the nucleus, and the produce (integral) of the size and density of the nucleus. Each of these tests may be selected to be operative or not, as the operator chooses. When active, each test is applicable to every line in every rastor.

Further objects, features and advantages of our invention will become apparent upon a consideration of the following detailed description in conjunction with the drawings, in which:

FIGS. 4 – 25 depict in detail the system of FIG. 1;

Figure 1:
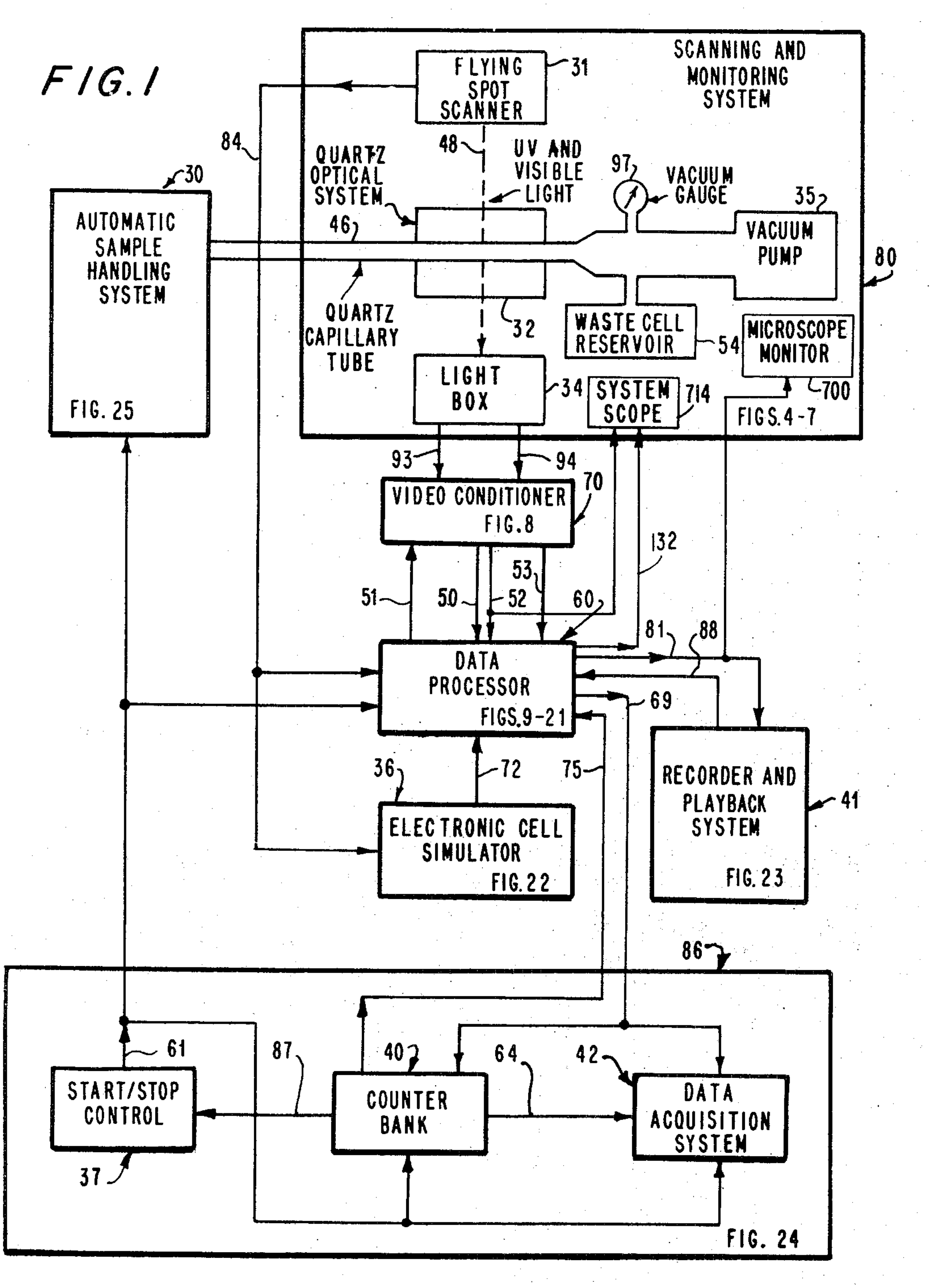
FIG. 1 depicts, in block diagram form, an illustrative embodiment of the invention.

The detailed description of the illustrative embodiment of the invention will be presented in accordance with the following index:

Block Diagram of the System — FIG. 1 Column 6

Figure 8:
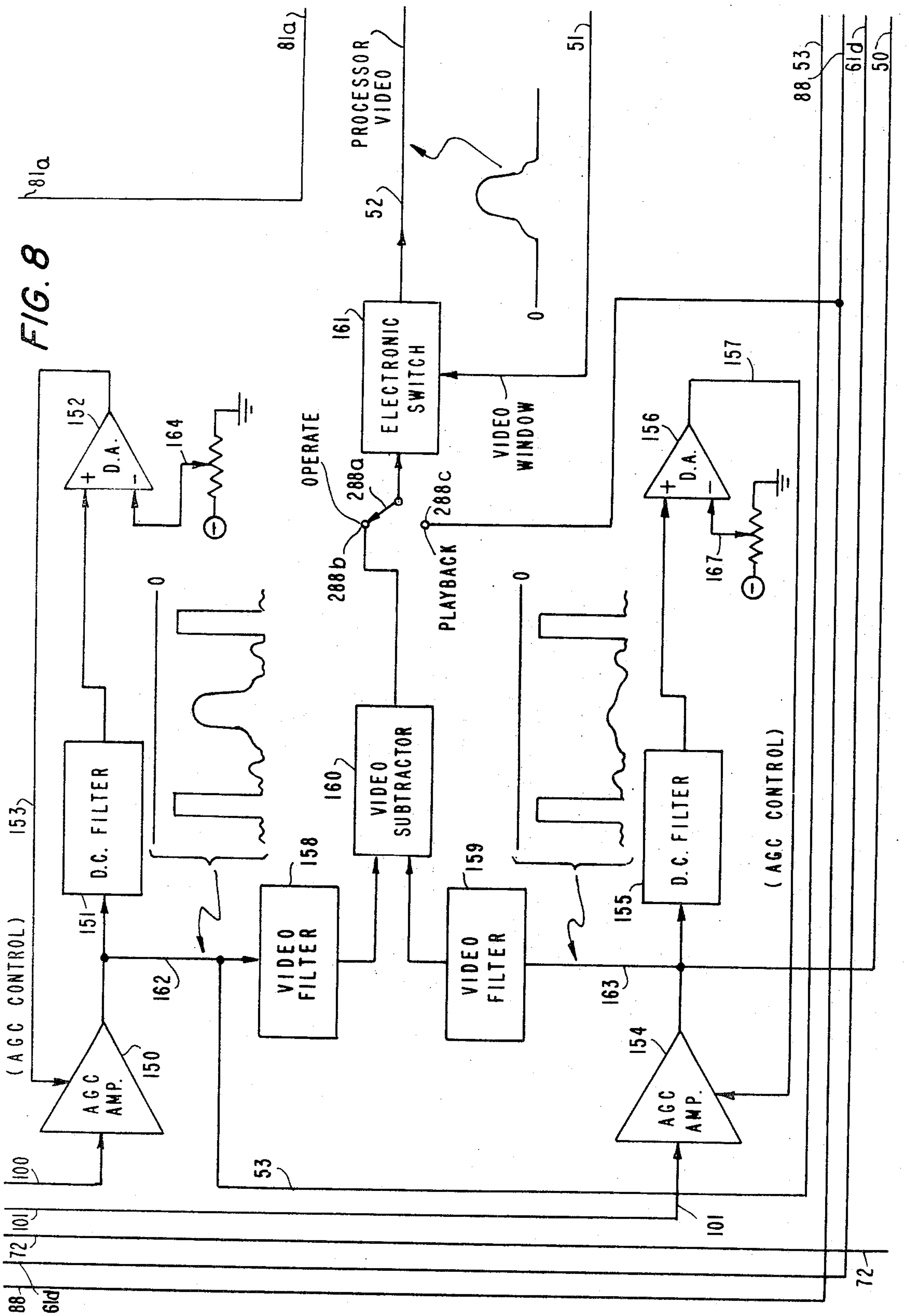
Figures 17, 17A:
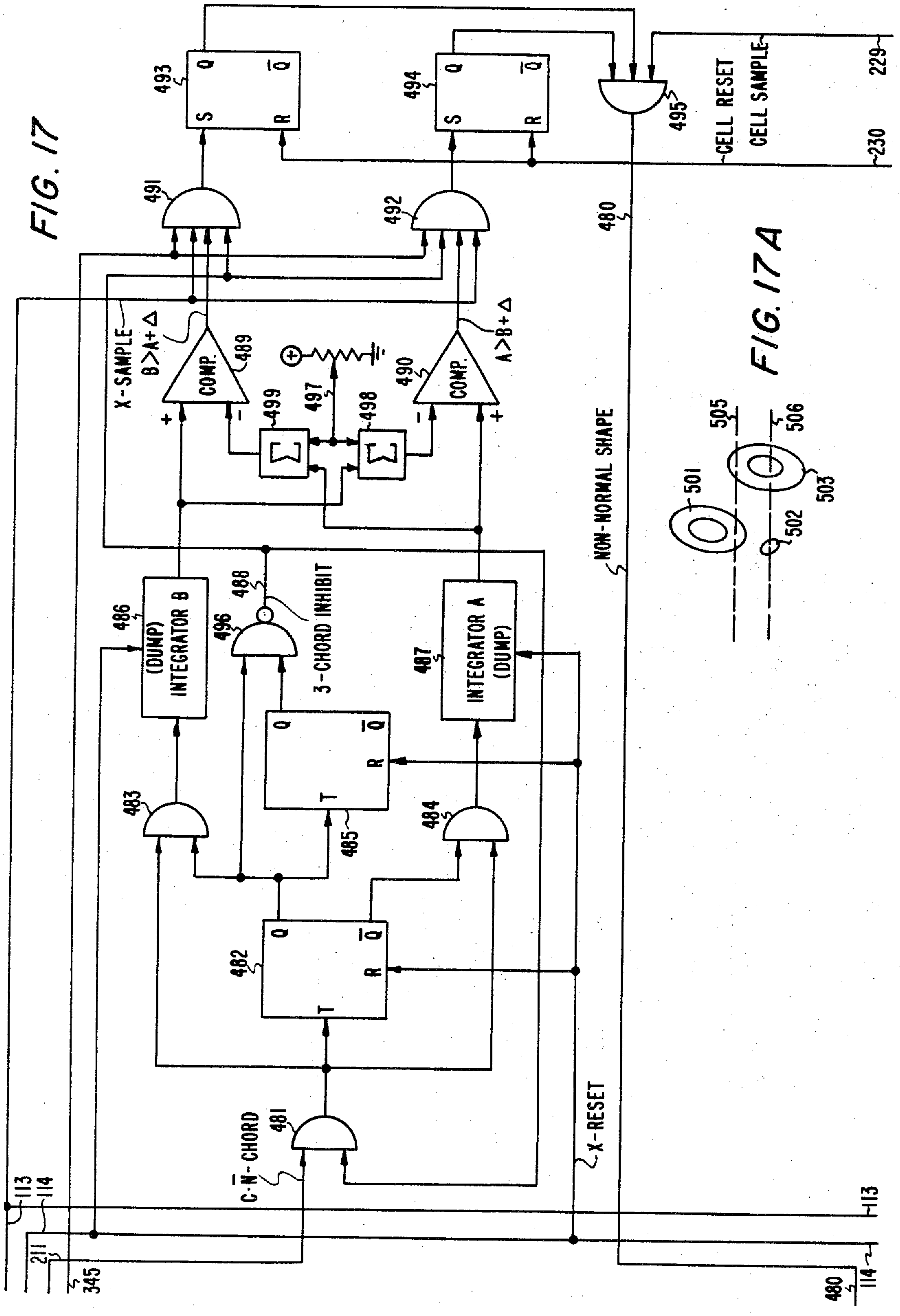
Figure 18:
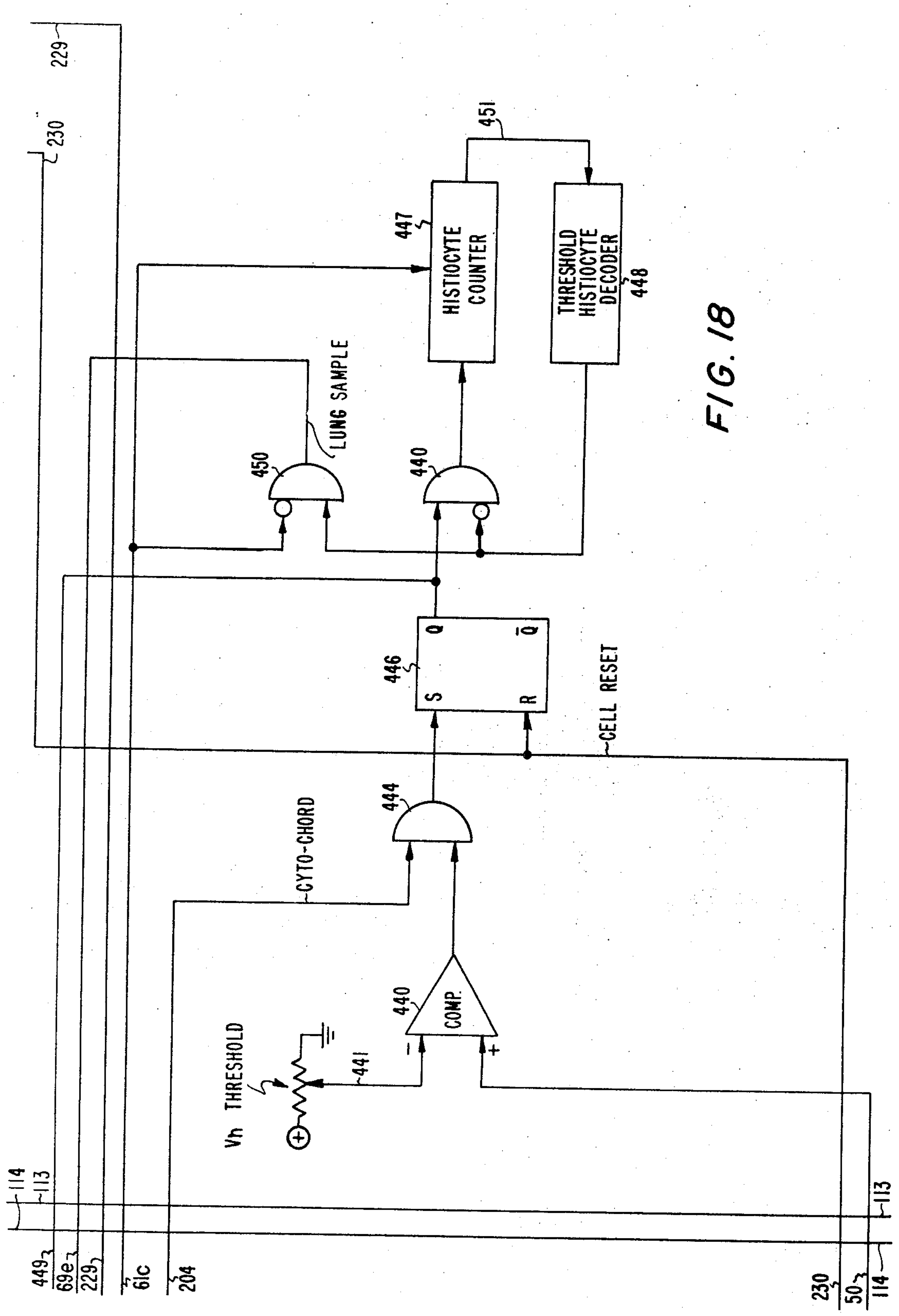
Figure 20:
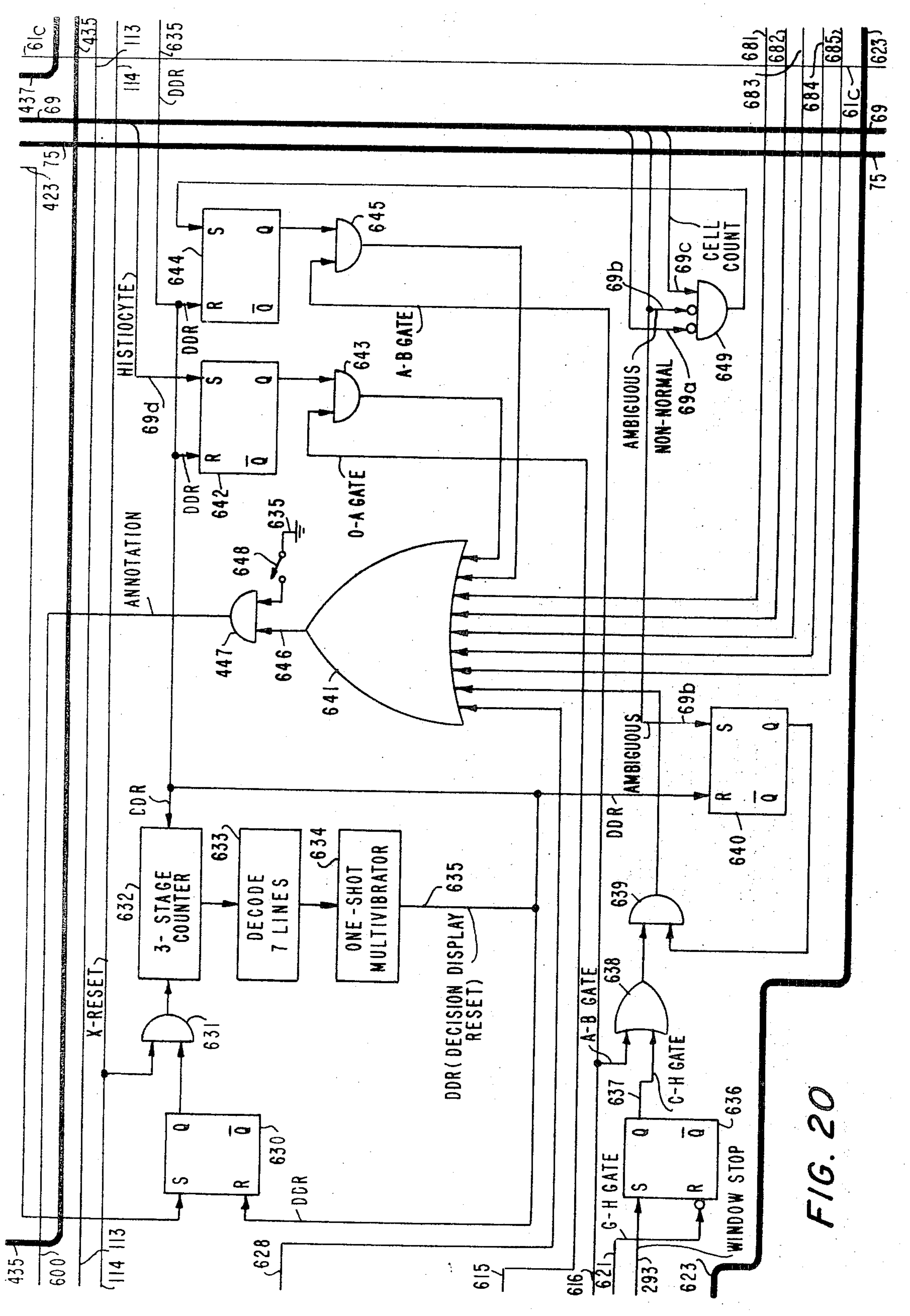
Figure 21:
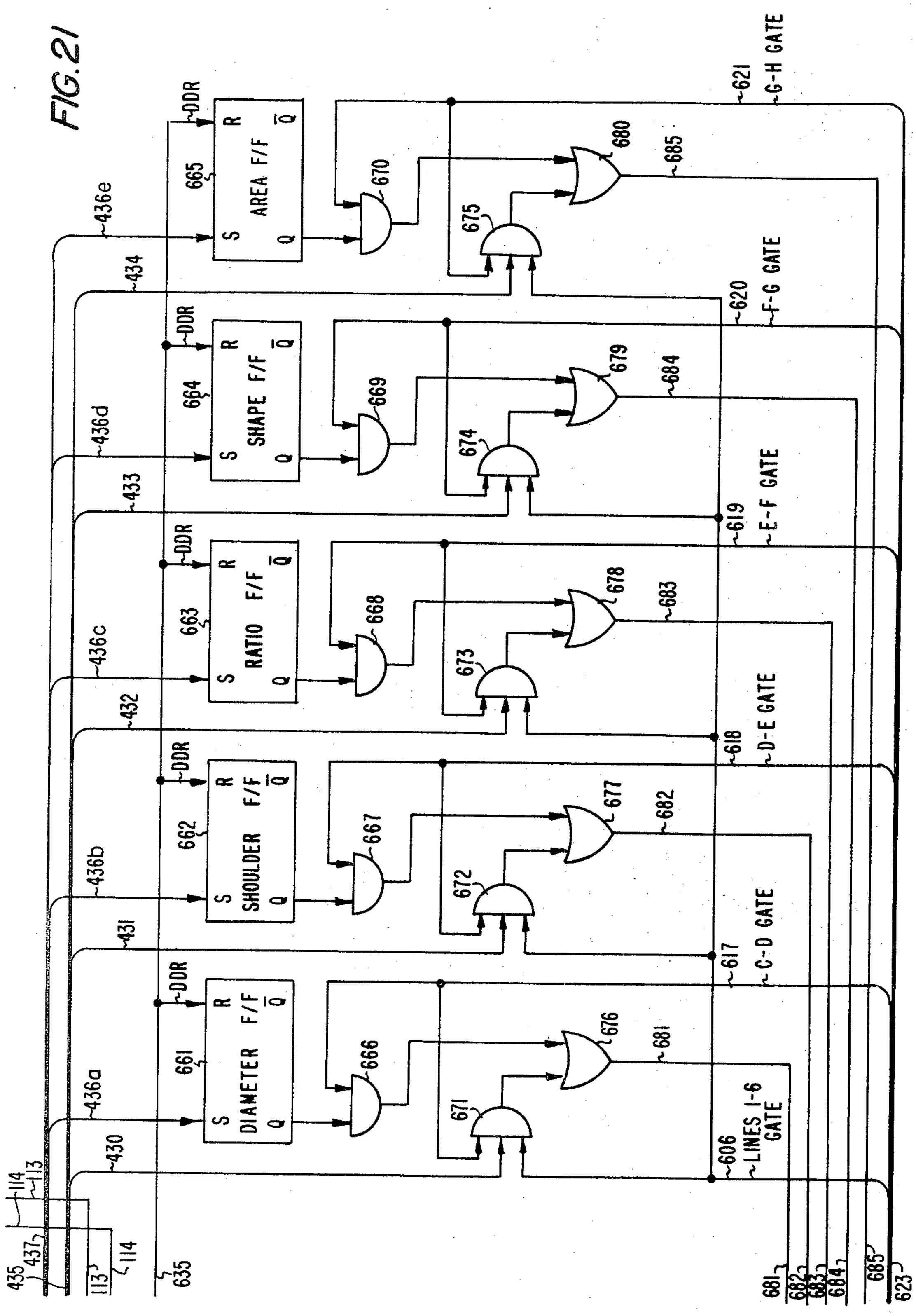
Figure 22:
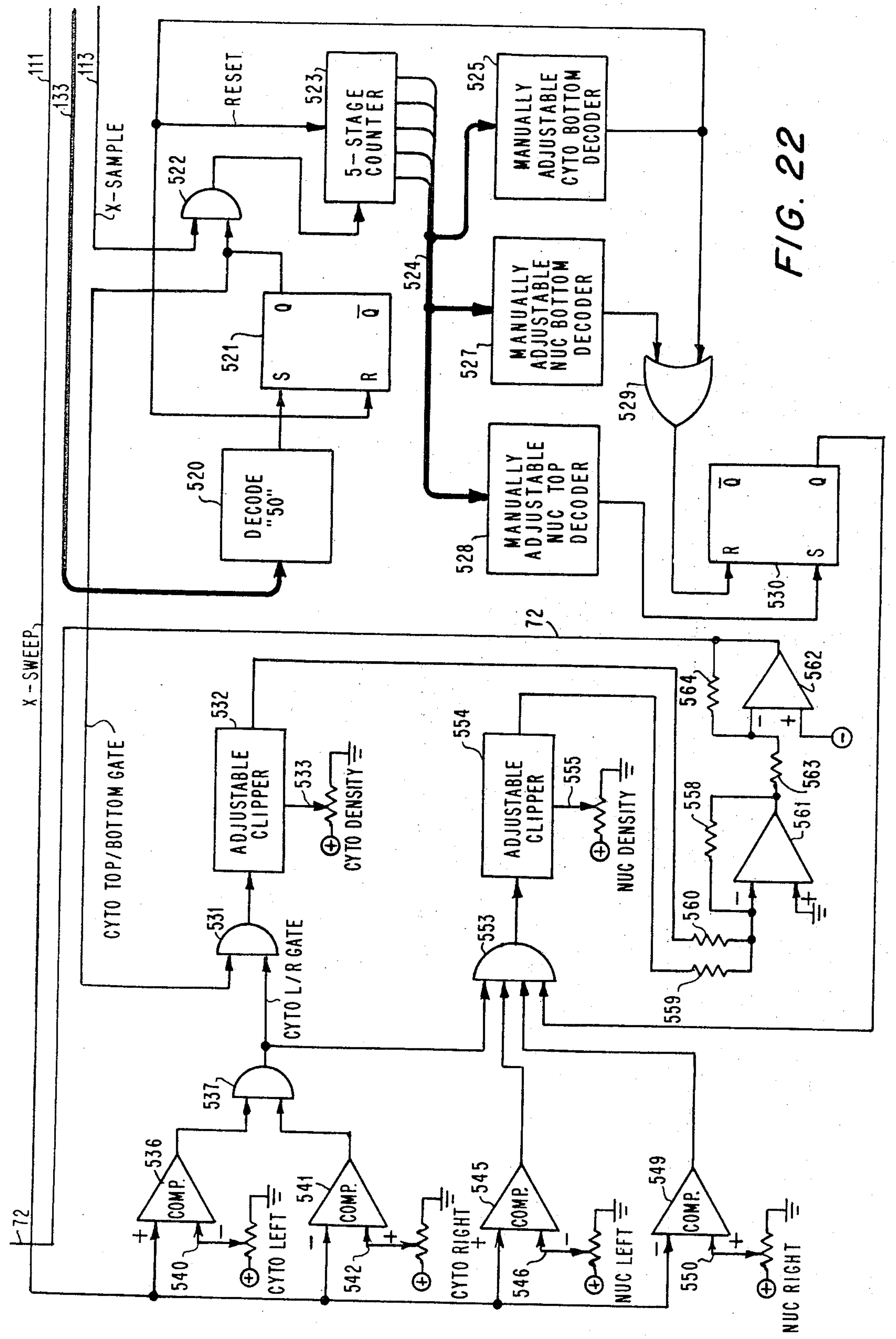
Figure 23:
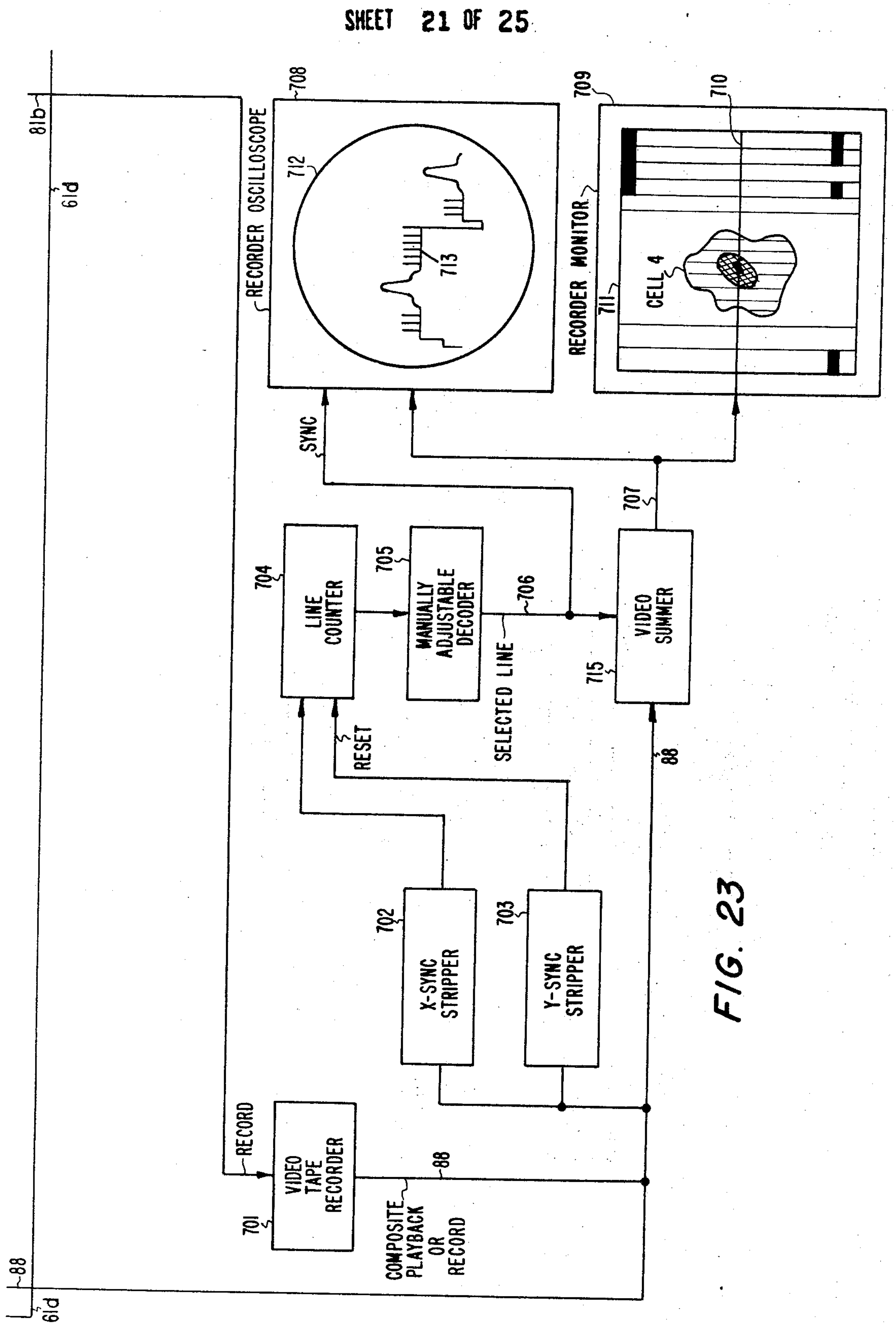
Figure 24:
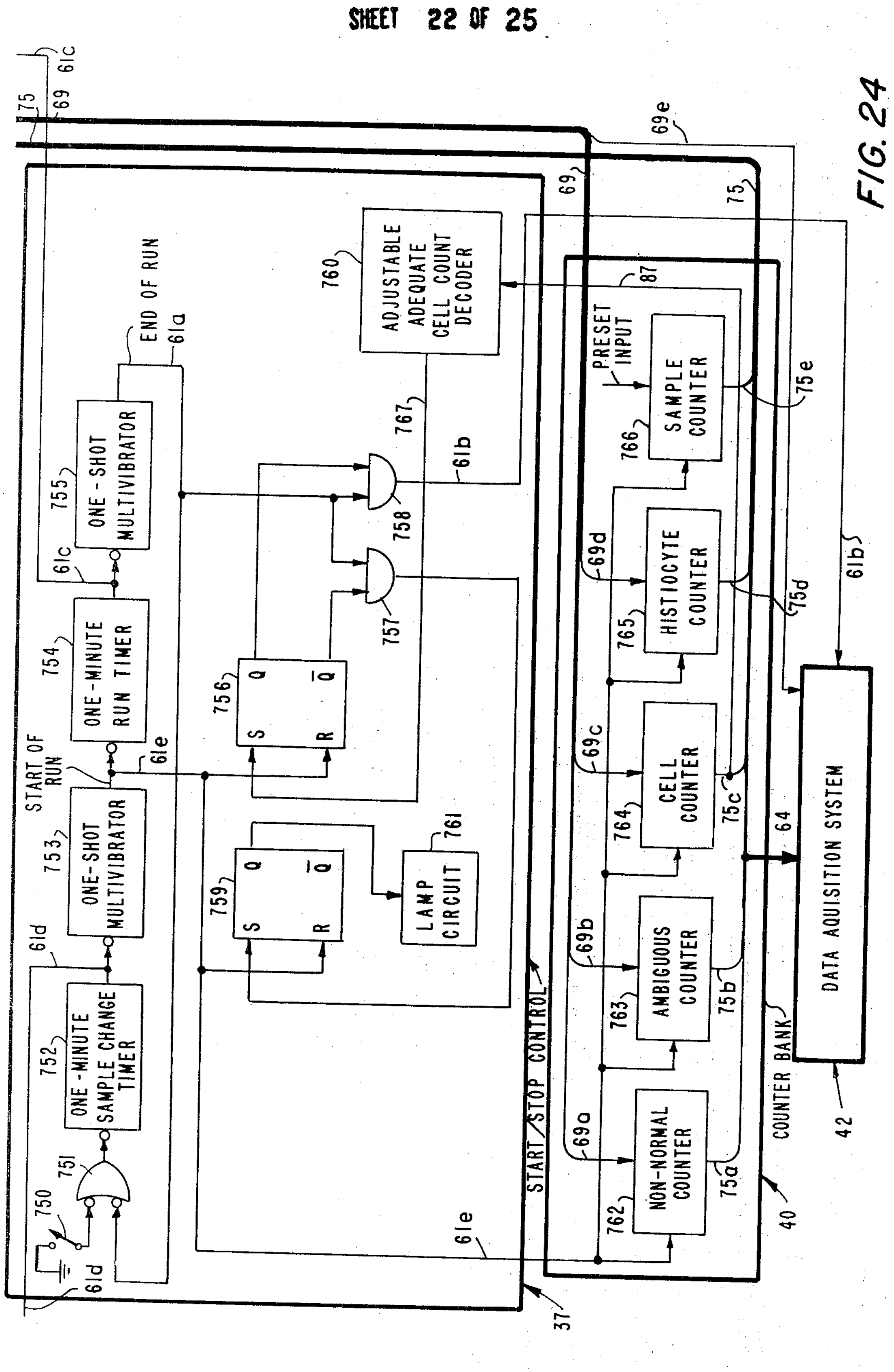
Figure 27:
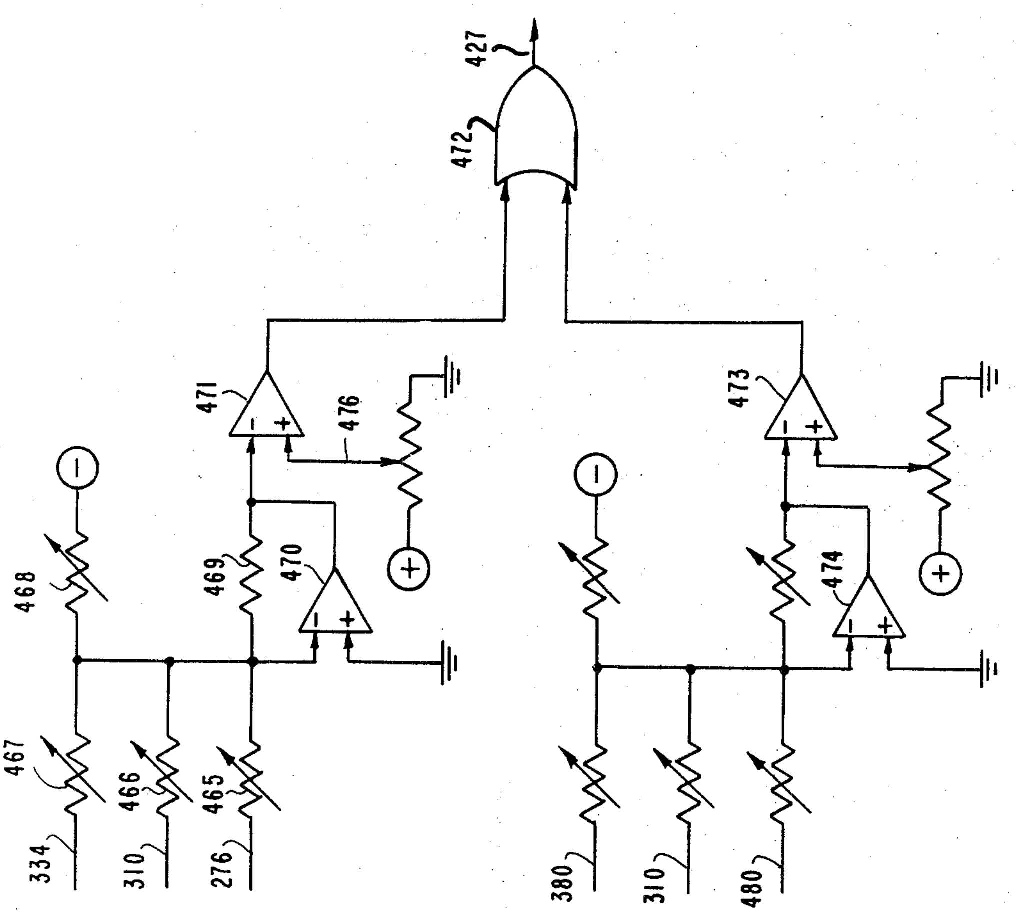
FIG. 27 depicts a circuit which can be used in the illustrative embodiment of the invention in lieu of some of the circuitry shown on FIG. 15.
Figure 28:
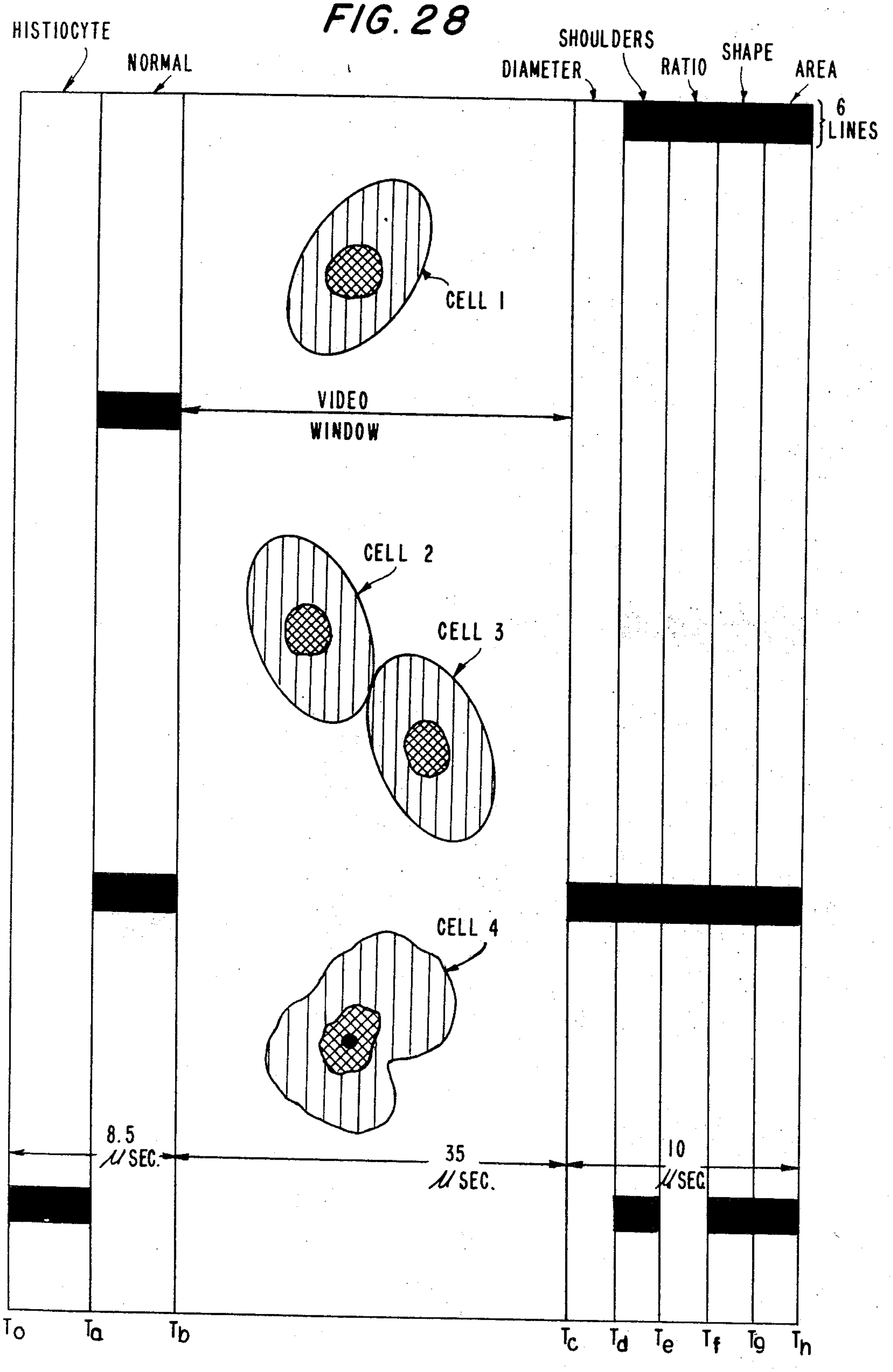
FIG. 28 depicts the form of the TV display of flowing cells which can be derived in the illustrative embodiment of the invention.

Scanning System — FIGS. 2 - 7 8
Video Conditioner — FIG. 8 18
Electronic Cell Simulator — FIG. 22 21
Recorder Monitor Display — FIG. 28 25
Data Processor — FIGS. 9 - 21 27
Recorder and Playback System — FIG. 23 56
Start/Stop Control, Counter Bank and Data Acquisition System — FIG. 24 58
Alternate Non-Normal Logic — FIG. 27 60
Automatic Sample Handling System — FIG. 25 61

Block Diagram of the System — FIG. 1

The individual blocks of equipment in the system will be described in detail below. FIG. 1 will facilitate an understanding of the way the individual blocks of equipment relate to each other. There are seven major blocks of equipment on FIG. 1, all interconnected by various cables. Each block of equipment is shown in detail on other figures. For example, video conditioner 70 is shown on FIG. 8, while the data processor is shown on FIGS. 9 – 21. The same numerals which are used for identifying the interconnecting cables of FIG. 1 are used in the remaining figures.

Automatic sample handling system 30 functions to mechanically convey prepared samples of different persons and to automatically cause cells from successive samples to flow through quartz capillary tube 46. Each sample requires a total time of 2 minutes for processing. Start/stop control 37 in block 86 (start/stop control 37, counter bank 40, and data acquisition system 42 are shown within one block because they are all shown in detail below on a single figure, FIG. 24) applies pulses over cable 61 at 2-minute intervals to the automatic cell handling system. The cell handling system requires 30 seconds for changing samples before cells from the new sample start to flow through the capillary tube. Once cells start to flow, 30 seconds are allowed so that the cells from the previous sample are swept or cleaned out of the capillary tube. During the next 60 seconds of the run, the cells flowing through the tube are scanned, evaluated, and the resultant data is stored in counter bank 40. At the end of the 60-second data collection run, the next pulse on cable 61 causes the automatic cell-handling system to change samples. At the same time, the pulse controls data acquisition system 42 to permanently record the pertinent data concerning the sample just run.

Scanning and monitoring system 80 includes flying spot scanner 31. This scanner generates a raster which is a mixture of ultra-violet and visible light, shown by dotted arrow 48. The light passes through quartz optical system 32 and quartz capillary tube 46 to two photo-multiplier tubes included in light box assembly 34. The photomultiplier tubes develop two signals on conductors 93 and 94. One signal is proportional to the intensity of the ultraviolet light after modulation by the flowing cells. The other signal is proportional to the intensity of the visible light after modulation by the flowing cells. The cells themselves are drawn through the quartz capillary tube by the vacuum created by pump 35. The vacuum can be measured by gauge 97, and the cell flow rate adjusted accordingly. After analysis, the cells are collected in waste cell reservoir 54 which is emptied periodically.

The two signals on conductors 93 and 94 are extended to video conditioner 70. The video conditioner processes the two signals to develop a "processor video" signal which is extended to the data processor over conductor 52. This signal is a combination of the ultra-violet and visible light signals, combined in such a way as to reduce the effects of noise. Amplified and normalized versions of the ultra-violet and visible signals are transmitted respectively over conductors 53 and 50 to the data processor because certain operations are performed on these signals alone. The data processor extends a signal over conductor 51 to the video conditioner which gates the signal on conductor 52 off at all times, except during the time that a line scan is within prescribed limits (72 microns) within the bore (90-micron diameter) of capillary tube 46.

The data processor analyzes each cell based on the signal transmitted over conductor 52. But in addition to having the data processor process a signal derived from the actual scanning of the cells, it is possible to simulate the signals obtained from cells. Electronic cell simulator 36 includes circuitry for deriving a signal on conductor 72 to simulate a cell for the data processor to analyze. Cell simulation is advantageous, for example, in setting various decision threshold levels in the data processor. A cell can be simulated to have certain characteristics which should control a certain logic decision by the data processor, and the appropriate threshold levels can then be set as the data processor operates on this signal. The timing of the electronic cell simulator and the data processor are keyed to the sync signals appearing on cable 84.

The data processor transmits signals over cable 81 to the recorder and playback system 41. The video tape recorder allows cell signals to be played back in the event it is desired to examine a particular cell in detail. The recorder and playback system is also capable of transmitting a recorded video signal over cable 88 back to the data processor input. It thus becomes possible for the data processor to categorize a cell whose characteristics have previously been recorded. This is advantageous for a number of reasons, for example, it facilitates the tracing of signal flow and malfunctions within the data processor while operating on system-derived signals.

The ultra-violet signal transmitted over cable 81 to the recorder and playback system is also transmitted to microscope monitor 700 in the scanning and monitoring system. This allows the operator to observe the cells flowing through the capillary tube.

The scanning and monitoring system also includes a system oscilloscope 714. The processor video signal on conductor 52 is extended to the signal input of the oscilloscope. The X and Y sync pulses are extended from the data processor to the sync input of the oscilloscope on conductor 132. The processor video signal is the principal input to the data processor; it is, therefore, desirable to provide an oscilloscope for the purpose of monitoring it.

As each cell is categorized by the data processor, appropriate pulses are transmitted over cable 69 to counter bank 40 and data acquisition system 42. The counter bank consists of a set of counters which are incremented depending upon how each cell is categorized. Cable 75 is extended from the counter bank back to the data processor to stop further pulsing of the conductors in cable 69 in the event any counter in the bank has reached its maximum count before the 1-minute run of the sample under test has been completed.

The counter bank data is extended over cabld 64 to data acquisition system 42. Similarly, certain information from the data processor is extended directly over cable 69 to the data acquisition system. When start/stop control 37 pulses cable 61 in the appropriate manner at the end of each run, the data acquisition system records all of the data pertinent to the sample whose run has just been completed. Thereafter, the start/stop control resets the counter bank prior to the data processor operating on the next sample. Conductor 87 is provided to allow the counter bank to inform the start/stop control mechanism in the event a run has been completed and an insufficient number of cells have been counted. In such a case, a lamp circuit is energized to inform the operator that either the capillary tube has become clogged, or the sample is too sparse of cells.

Scanning System — FIGS. 2 – 7

Figure 4:
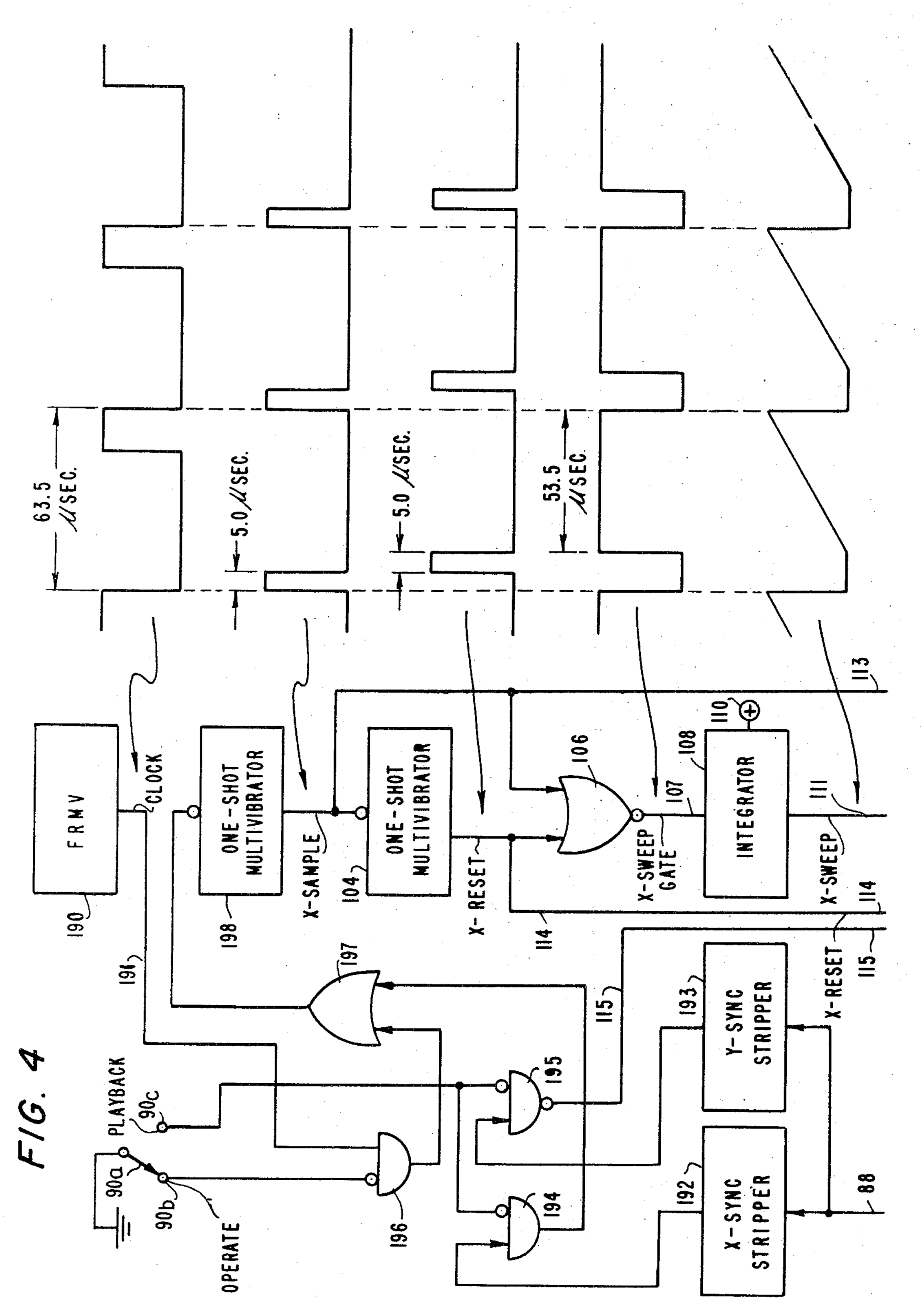

The timing signals which control the scanning of the cells flowing through quartz capillary tube 46 are generated by the circuit on FIG. 4. As will be described below, it is possible to record an image of the flowing cells on a video tape, and to thereafter play back the tape and feed into the data processor the video signal rather than a signal which is derived during actual scanning of the cells. It is also possible to electronically simulate the flowing of cells through the capillary tube, for example, in order to adjust various threshold levels in the data processor. During playback, switch **90*a* is connected to playback terminal 90*c*. During the scanning of actual cells, at which time the video signal is recorded and during the electronic simulation of flowing cells, the switch is connected to operate terminal 90*b* as shown in FIG. 4.**

The various gates shown in the drawing are of the type in which a logical 1 is represented by a positive potential, and a logical 0 is represented by ground potential. However, if any input to a gate is left floating, the gate operates as though a positive potential (logical 1) were applied to this input. It should also be noted that various inputs to individual gates or other circuits are provided with a little circle, and that similarly some of the gate outputs are provided with such a circle. This conventional notation is used to represent an inverting operation.

With switch **90*a* in the position shown in FIG. 4, ground potential appears on terminal 90*b*. This terminal is connected through an inverter to one input of AND gate 91. Thus, one input to the gate is energized. Free-running multivibrator 190 generates CLOCK pulses on conductor 191. As shown in FIG. 4, the multivibrator cycle is adjusted to a period of 63.5 microseconds. The width of each positive CLOCK pulse is not important insofar as the derivation of the timing signals is concerned. Each positive pulse on conductor 191 is transmitted through AND gate 196 to one input of OR gate 197.**

The output of the OR gate is extended to the input of one-shot multivibrator 198. This multivibrator is triggered by a negative step applied to its inverting input; therefore, at the termination of each CLOCK pulse, the multivibrator generates a pulse of its output. Each pulse on conductor 113 is 5 microseconds in width and is identified throughout the drawing as an X-SAMPLE pulse.

Each X-SAMPLE pulse is applied to the inverting input of one-shot multivibrator 104. This multivibrator is similarly triggered by a negative step and generates another 5-microsecond pulse. This pulse, as shown directly below the CLOCK and X-SAMPLE pulse waveforms in FIG. 4, is referred to as the X-RESET pulse.

The X-XAMPLE pulses are applied to one input of NOR gate 106, and the X-RESET pulses are applied to the other input of the NOR gate. The output of the NOR gate is an inverted OR function, and thus X-SWEEP GATE conductor 107 is ordinarily high when the two inputs to gate 106 are low. However, for the 10 microseconds that an X-SAMPLE pulse is generated followed by an X-RESET pulse, one of the two inputs to the NOR gate is high and thus conductor 107 is low. The resulting waveform on X-SWEEP GATE conductor 107 is as shown in FIG. 4. The conductor ordinarily is high in potential, but goes low for 10 microseconds in every 63.5-microsecond cycle.

The input to integrator 108 is a constant potential provided by source 110. The output of the integrator on conductor 111 is the integral of the input, that is, a ramp. However, the integrator functions to derive a ramp on X-SWEEP conductor 111 only when X-SWEEP GATE conductor 107 is high in potential. When the conductor is low in potential, the output of the integrator drops to ground potential. Thus as shown in the X-SWEEP waveform on FIG. 4, during the 10 microseconds that X-SWEEP GATE conductor 107 is low, the integrator output is at ground potential. As shown as X-SWEEP GATE conductor 107 goes high, the voltage on X-SWEEP conductor 111 rises in the form of a ramp. At the end of any cycle, when the X-SWEEP GATE conductor goes low, the voltage on conductor 111 drops to ground and remains at this level for the 10 microseconds that the X-SWEEP GATE signal is low.

The three signals on conductors 111, 113, and 114 are used throughout the system for controlling many functions. One of the primary functions of the X-SWEEP signal is to control scanning of the cells in the X direction (across the capillary tube). A complete line scan takes place during the generation of each ramp signal. The X-SAMPLE and X-RESET pulses which alternate with each line scan are used to control various logic operations.

In order to scan area, it is also desirable to generate a Y-SWEEP signal, as in a TV-type raster. The Y sweeps take place at a rate of 60 per second.

Figures 5, 7A, 7B, 7C:
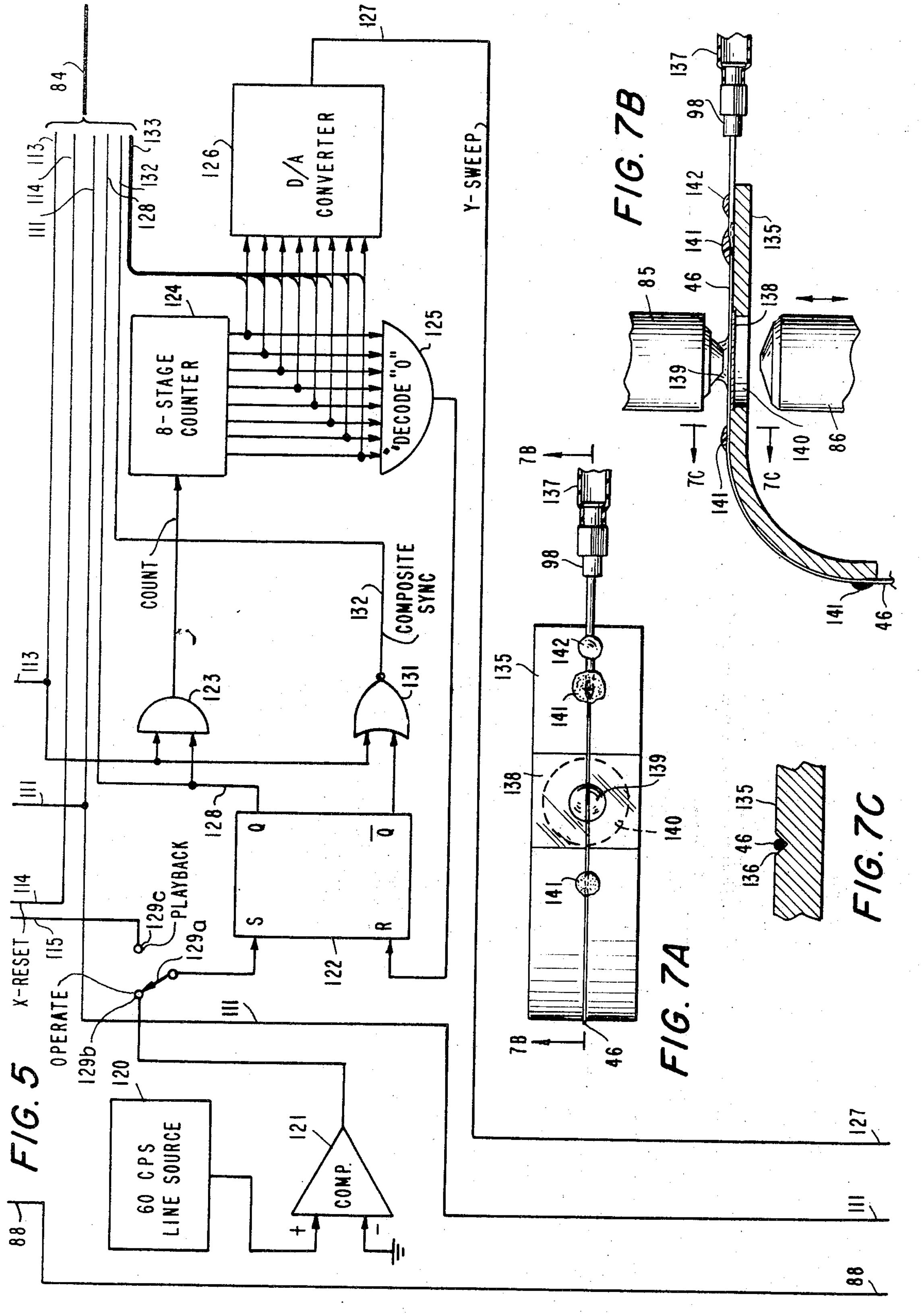

As shown in FIG. 5, line source 120 is connected to one input of comparator 121, the other input being grounded. The comparator operates to cause its output to go high whenever the line voltage is positive. Thus, the output of the comparator is a square wave whose frequency is the same as that of the line source. The square-wave signal is applied to operate terminal 129*b*, and when switch 129*a* is in the position shown, the signal is applied to the set input of flip-flop 122. (Switches 90*a*, 129*a*, and 288*a*, respectively on FIGS. 4, 5 and 8, can be ganged together for convenience.) Each positive step in the signal causes flip-flop 122 to be placed in the 1 state with output Q going high and output $\overline{Q}$ going low. With the flip-flop in the 1 state, conductor 128, connected to one input of AND gate 123, goes high. Conductor 113 is connected to the other input of the AND gate, and thus whenever flip-flop 122 is in the 1 state, the X-SAMPLE pulses on conductor 113 appear at the output of AND gate 123.

Eight-stage counter 124 is initially in the 0 state. Each X-SAMPLE pulse applied to its count input causes the count to be incremented. The counter cycles from 0 to a maximum count of $2^8-1$, or 255, and then back to 0. The eight outputs of the counter are extended to the inputs of digital/analog converter 126. The converter develops an analog signal on Y-SWEEP conductor 127 which is proportional to the binary count represented in counter 124. Thus, the Y-SWEEP signal is a staircase with 256 steps. It is this signal which is used to control the generation of the raster in the Y direction (along the capillary tube).

The eight outputs of counter 124 are also extended over cable 133 (included within cable 84) to other circuits which require the encoded counter states for identification of the particular raster line which is being generated at any given time.

The eight outputs of the counter are also coupled to the eight inputs of decode 0 circuit 125. This circuit detects a transition from the maximum count (255) in the counter to the minimum count of 0, and when the counter represents 0, the output of circuit 125 goes high. The output is extended to the reset input of flip-flop 122 and causes the flip-flop to be reset in the 0 state. At this time, conductor 128 goes low and no further X-SAMPLE pulses are transmitted to the count input of counter 124. Counter 124, flip-flop 122, end gate 123 all remain in the 0 state until the next high level output from comparator 121.

Flip-flop 122 is set in the 1 state by comparator 121 60 times each second. Since X-SAMPLE pulses are generated at 63.5-microsecond intervals, in any period of 1/60 seconds the number of X-SAMPLE pulses which are generated is $(1/60)/(63.5)(10^{-6})$. Thus, during any period of 1/60 seconds, 262 X-SAMPLE pulses are generated. Only 256 of these pulses are required to cause counter 124 to start incrementing from an initial count of 0 through the maximum count, and then back to 0. After these 256 pulses have been generated, the decode 0 circuit 125 operates to reset flip-flop 122. After flip-flop 122 is reset, six X-SAMPLE pulses are generated which have no effect on counter 124. Similarly, for the first 256 X-SAMPLE pulses which are generated in any group of 262, the signal on Y-SWEEP conductor 127 rises in 256 successive steps. As soon as the counter switches to a 0 count, the output of converter 126 drops to ground, and Y-SWEEP conductor 127 remains at ground potential until flip-flop 122 is once again set in the 1 state.

The X-SAMPLE conductor 113 is extended to one input of OR gate 131, and the $\overline{Q}$ output of flip-flop 122 is connected to the other input of this gate. During the Y-SWEEP flyback time, that is, while conductor 127 is low in potential, the $\overline{Q}$ output of flip-flop 122 is high, and thus conductor 132 is high in potential. During the generation of the Y-SWEEP signal, the $\overline{Q}$ output of the flip-flop is low in potential, and one input of OR gate 131 is de-energized. However, each time an X-SAMPLE pulse is generated, the other input of the OR gate is energized and conductor 132 goes high in potential. Thus, the signal on conductor 132 is a composite synchronizing signal. In each 1/60-second cycle, 256 X-SAMPLE pulses appear on conductor 132, followed by a much wider pulse which represents the Y flyback. Conductor 132 is extended over cable 84 to the data processor.

Actually, in the analysis above, it has been assumed that in each period of 1/60 seconds, 262 X-SAMPLE pulses are generated. This number was determined by dividing the Y-SWEEP period of 1/60 seconds by 63.5 microseconds. The division results in a number slightly in excess of 262. It will be apparent that in some cases 263 X-SAMPLE pulses are generated rather than 262 during one complete cycling of flip-flop 122. Whether 262 or 263 pulses are generated depends on how soon the first X-SAMPLE pulse occurs after flip-flop 122 switches to the 1 state. It makes no difference whether 262 or 263 pulses are generated. As will become apparent below, what is important is that the data processor be able to acknowledge the completion of any raster scan. The test to be described below is that at least five X-SAMPLE pulses be generated without the detection of any cellular material flowing through the quartz capillary tube. At the end of each Y-SWEEP, the scanning ceases for the Y flyback period and there is obviously no detection of cellular material during this interval. Since the scanning terminates at the end of 256 X-SAMPLE pulses in any period of 1/60 seconds, and there are either another six or seven X-SAMPLE pulses generated before the Y-SWEEP staircase signal once again begins, the data processor is capable of recognizing the completion of a complete raster scan.

Thus far the X-SAMPLE, X-RESET, X-SWEEP and Y-SWEEP signals have been described as being generated under control of free-running multivibrator 100. This is the case when cells are being scanned or electronically simulated. But when the video tape is being played back and the system is used to analyze the cells represented by the video signal, it is necessary to key the system operation to the recorded video sync signals. The composite video sync information (in the form of inverted X and Y sync pulses) which is initially recorded is developed on conductor 132, and to properly key the system operation to the video sync information, it is necessary to use this pulse train to control the generation of the X-SAMPLE, X-RESET, X-SWEEP and Y-SWEEP signals.

During playback of the video signal, switch 90*a* in FIG. 4 is connected to terminal 90*c*. Terminal 90*b* is left floating and while ordinarily a floating input is treated by a gate as a 1, because terminal 90*b* is connected through an inverter to an input of gate 91, the effective input is a 0 and the gate does not operate. Instead, the ground potential on terminal 90*c* is extended through two inverters to respective inputs of each of gates 94, 95. The video playback signal, as will be described below, is extended over conductor 88 to the input of X-sync stripper 96 and Y-sync stripper 97. Each of these units extracts the respective sync pulses. The X-sync information, namely, the originally recorded X-SAMPLE pulses, is extended to the other input of AND gate 194 whose output is coupled to the second input of OR gate 197. Thus, each inverted X-SAMPLE pulse recorded on the video tape triggers one-shot multivibrator 198 just as does each CLOCK pulse when switch 90*a* is in the OPERATE position. Each recovered inverted X-SAMPLE pulse causes a new 5-microsecond X-SAMPLE pulse to be generated, followed by a 5-microsecond X-RESET pulse.

The Y-sync pulses at the output of Y-sync stripper 97 are coupled to the second input of gate 95, and inverted Y-sync pulses thus appear on conductor 115. This conductor is extended to playback terminal 129*c*, to which switch 129*a* is connected in the playback mode. It is necessary to sync the Y-SWEEP signal on conductor 127 to the Y-sync information recorded on the video tape. At the termination of each Y-sync pulse, the positive step which appears at the set input of flip-flop 122 causes the flip-flop to switch to the 1 state. Gate 123 is once again enabled and the X-SAMPLE pulses on conductor 113 are transmitted through the gate to cycle the counter. Once again, when the counter cycles back to 0, decode 0 circuit 125 detects this condition and resets flip-flop 122 so that the counter remains in the 0 state and the Y-SWEEP signal is held at ground potential.

Figure 6:
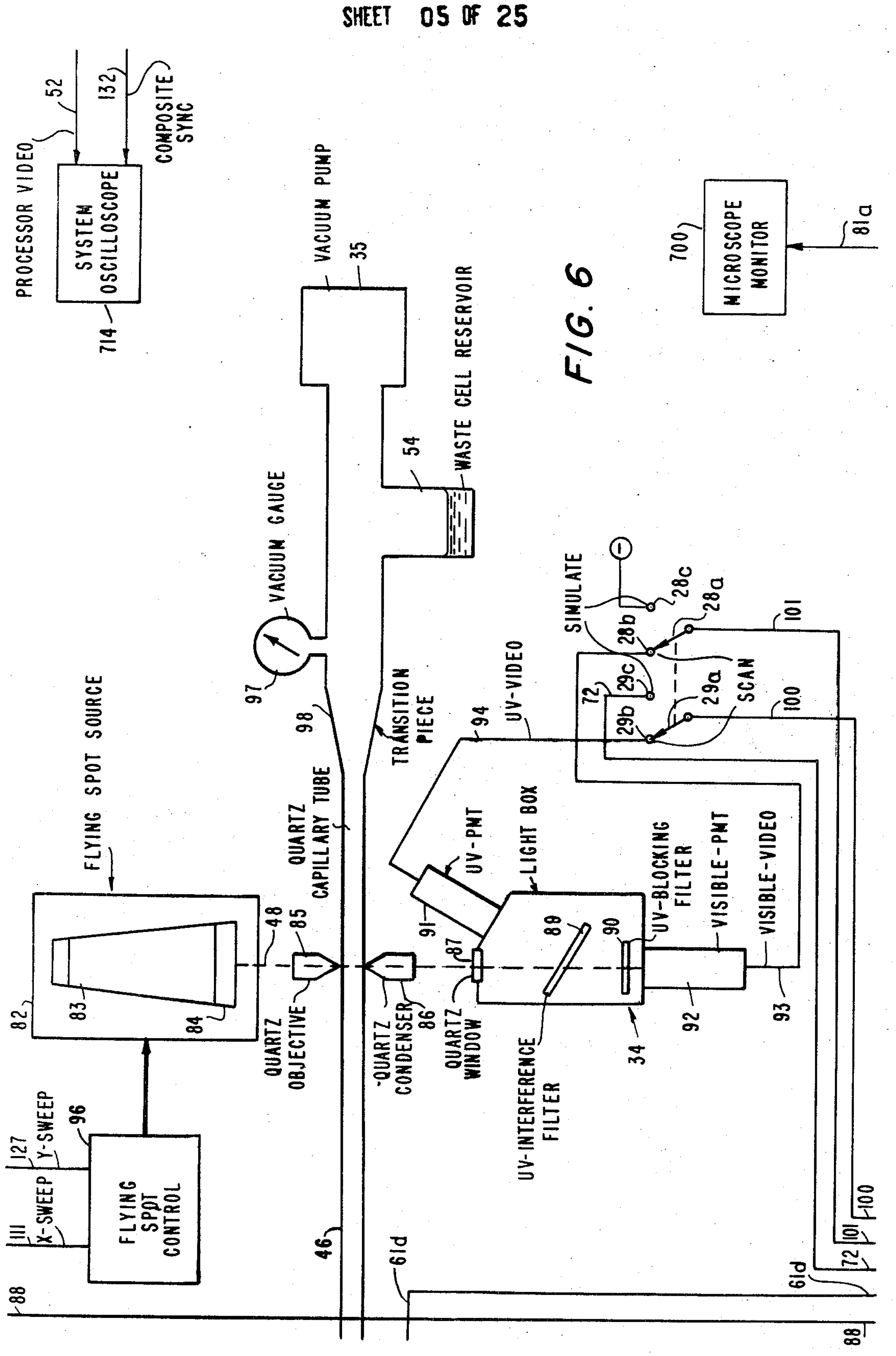

The X-SWEEP and Y-SWEEP signals on respective conductors 111 and 127 are extended to flying spot control circuit 96 on FIG. 6. This circuit develops the necessary signals to control the operation of flying spot source 82. The flying spot source incorporates a conventional flying spot scanner 83 which includes a cathode ray tube coated with a special phosphor which emits a substantial amount of light in the far ultra-violet (UV) region. Some visible light is also produced along with the ultra-violet light by this phosphor.

A number of different phosphors can be used, among them, aluminum oxide, beryllium silicate and calcium borate-lead. In the illustrative embodiment of the invention, the phosphor which is coated on the face of the cathode ray tube is a beryllium silicate. The light emission spectrum of this phosphor is of the form shown in FIG. 3.

Figure 2:
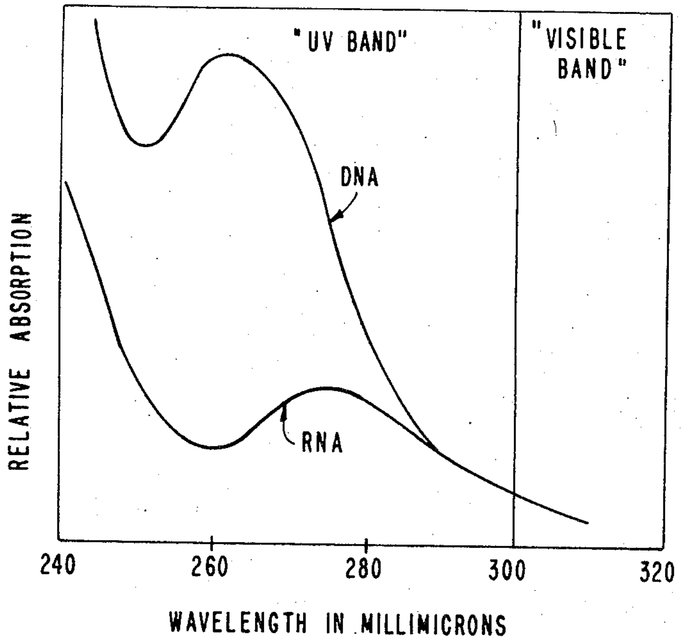
FIGS. 2 and 3 are curves representing relative cellular absorption as a function of wavelength and relative scanning light intensity as a function of wavelength.
Figure 3:
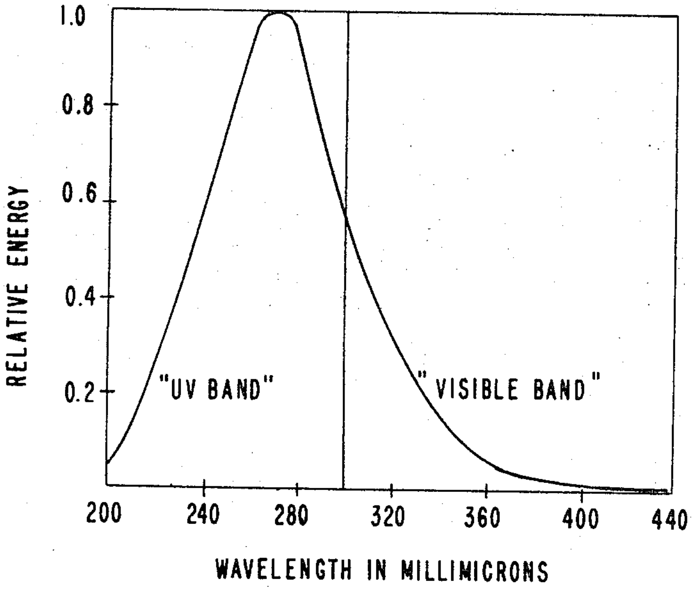

The curves of FIG. 2 show the relative absorption of DNA and RNA as a function of wavelength. As is known, most of the DNA of a cell is in its nucleus, while the RNA is distributed throughout the cell. The wavelengths are divided into two groups, "UV band" and "visible band", as shown in FIGS. 2 and 3, with the dividing line chosen at a wavelength of 300 millimicrons. Absorption by nuclear material (DNA and RNA) increases markedly at wavelengths below 300 millimicrons. Although the visible wavelengths of light are generally considered to begin at 400 millimicrons, throughout this specification the visible band will be considered to begin at 300 millimicrons. The terms UV band and visible band are used herein merely for convenience in defining the two wavelength bands of interest. The important characteristics of the two spectral bands insofar as the present invention is concerned is that the wavelengths in the UV band are absorbed to a very great extent by DNA and RNA in a cell nucleus; they are absorbed to a much lesser extent by the cytoplasm of a cell. Energy in the visible band is also absorbed more by the nucleus than the cytoplasm; but the difference in the degree of absorption is not as great, primarily because both cell regions absorb very little of the impinging visible light. (The exception to this general statement — histiocytes — will be discussed in detail below.)

The combined visible and ultra-violet light leaves the quartz face plate 84 of the cathode ray tube and is focused by quartz objective lens 85. The path of the light is shown by dotted line 48; it is to be understood that instead of a single ray of light a raster is generated. Quartz is used rather than glass throughout the optical system because it offers much less attenuation to ultra-violet light. The objective lens 85 images a microversion of the cathode ray tube raster in the quartz capillary tube 46 at the level of maximum cell flow. As the cells flow by in the capillary tube, they absorb some of the focused spot of ultra-violet and visible light. The focused spot of light has a diameter in the order of 0.5 microns.

The light which emerges below the capillary tube is gathered by quartz condenser lens 86 and is transmitted through quartz window 87 to light box 34. In this light box there is an ultra-violet interference filter 89 which reflects the ultra-violet light (wavelengths below 300 millimicrons) toward photomultiplier tube 91, and allows the visible light (wavelengths above 300 millimicrons) to be transmitted through it to photomultiplier tube 92. An additional filter 90 is provided to insure that any ultra-violet light which is transmitted through filter 89 is blocked from photomultiplier tube 92. The photomultiplier tubes provide electrical output signals which are proportional to the magnitudes of the respective incoming light signals. The electrical signal on UV-VIDEO conductor 94 is an indication of the amount of ultra-violet light absorbed by cells flowing through the capillary tube. The magnitude of the signal on VISIBLE-VIDEO conductor 93 is a measure of the amount of visible light absorbed by the cells.

In the case of both the UV-VIDEO and the VISIBLE-VIDEO signals, in the absence of any light input the output of the respective photomultiplier tube is at a near-ground potential known as the "dark current" PMT level. The output of either photomultiplier tube goes negative when light at the respective input is detected. The greater the light intensity, the more negative the output signal.

It should be noted that with cells moving through quartz capillary tube 46, it is possible to scan the cells simply by generating successive X sweeps. In order to scan the cells, it is not necessary to scan in the Y direction since the moving cells in effect provide a scan in this direction. However, if successive X scans are made along the same line on the phosphor coating of the cathode ray tube, the phosphor coating may be seriously damaged. In order to distribute the heat generated by the scanning, sweeps are generated in the Y direction as well as the X direction.

The cells are drawn in a carrier solution from the automatic cell handling system through capillary tube 46 in FIG. 6. They then flow through transition piece 98 and are collected in waste cell reservoir 54, which reservoir can be emptied periodically. The solution is drawn through the capillary tube by the operation of vacuum pump 35, and vacuum gauge 97 is provided to facilitate adjustment of the degree of vacuum inside the flow system so as to control the flow rate. The quartz capillary tube in the illustrative embodiment of the invention has an inner diameter in the order of 90 microns and an outer diameter somewhat close to 115 microns. The transition piece for coupling the capillary tube to the waste cell reservoir and the vacuum pump can be a hypodermic needle into which an end of the quartz capillary tube is inserted. At the other end of the hypodermic needle, a rubber hose can be attached for connecting the needle to the waste cell reservoir and the vacuum pump.

The flying spot control circuit 96 is adjusted such that the size of the imaged raster through the center of the quartz capillary tube is 110 microns in the X direction (the X direction being perpendicualr to the plane of the drawing) and 82.5 microns in the Y direction (the Y direction being along the capillary tube). The ratio of the two dimensions is 110:82.5 or 4:3, the aspect ratio in an ordinary television receiver. The cells move from left to right through capillary tube 46. The raster is similarly formed in this direction with the first X scan in each field being at the left-most sides of the objective and condenser lenses. A normal cell has a diameter of approximately 45 microns. The use of a capillary tube with an inner diameter of 90 microns insures that almost all of the cells will flow through the capillary tube in single file. It is this technique which permits the examination of individual cells. (Clumping of cells can still occur, however, and various circuits are provided to detect this condition and to prevent the cells in any clump from being categorized as either normal or non-normal.) The cells are contained in a carrier solution which is half water and half alcohol. The concentration of the cells in the carrier solution and the flow rate are such that anywhere from a few hundred to several thousand cells pass through the scanned region in the 60 seconds alloted to data gathering.

The velocity profile along a diameter of the capillary tube is parabolic. In accordance with well-known principles, the velocity $v$ of a particle in a plane perpendicular to the axis of the tube (starting a short distance along the tube from the intake end) is determined from the following equation: $v = (\Delta P/4Kl)\ (R^2 - r^2)$, where $R$ is the inner radius of the tube (45 microns, or $4.5 \times 10^{-3}$cm, in the illustrative embodiment of the invention), $r$ is the distance of the particle from the axis of the tube, $K$ is the dynamic viscosity of the carrier solution, $l$ is the length of the tube (12 inches, or 30.48cm, in the illustrative embodiment of the invention), and $\Delta P$ is the pressure difference between the ends of the tube. The parabolic flow tends to cause cellular particles to flow along the tube's central axis.

The maximum flow rate is along the axis where $r = 0$. In the case of a perfect vacuum at the right side of the tube, $\Delta P = 76$cm Hg, or $\Delta P = 10^6$ dynes/cm$^2$. The dynamic viscosity for water is 0.010 gm/cm-sec.; for alcohol it is 0.018 gm/cm-sec. For a mixture of the two in equal proportions, $K = 0.015$ gm/cm-sec. approximates the correct value. The maximum velocity is thus $(10^6/4(0.015)\ (30.48))\ (4.5 \times 10^{-3})^2$ or 11.2cm/sec.

A measure of the stability of any laminar flow is given by the value of the Reynold's number. The smaller the Reynold's number, the more stable is the flow and the more easily and quickly is any perturbation smoothed out. This is of particular importance in the illustrative embodiment of the invention where cells of diameters ranging from 10 to 70 microns may flow in the fluid through the tube. The extent to which the fluid flow is disturbed by such particles is determined by the Reynold's number. The maximum Reynold's number, $R_{max}$, is given by the following equation: $R_{max} = dv_{max}/k$, where $v_{max}$ is the maximum velocity of the flow, $d$ is the diameter of the tube, and $k$ is the kinematic viscosity. For a mixture of water and alcohol $k$ can be taken as 0.015cm$^2$/sec. (same numerical value as K). Since $v_{max}$ was calculated above to be 11.2 cm/sec., the maximum Reynold's number is $(9 \times 10^{-3})(11.2)/(0.015)$, or approximately 7. Reynold's numbers under 1,000 have been known to result in stable flows. Certainly a very conservative stability criterion could be taken to be a Reynold's number under 100. Since the maximum Reynold's number for the flow under consideration is 7, great stability and continued laminar flow in the presence of the cells is to be expected.

As will be described below, the capillary tube extends directly into each sample which is examined. To insure the stability of the flow, it has been found desirable to prevent the slowing down of the flow at any point prior to the scanning station. Such a slowing down would take place wherever the diameter of the capillary bore (or any other type of tube) increased. Thus, it is highly advantageous to extend the capillary tube directly into each sample — the constancy of the inner diameter assures a stable flow. After the cells pass the scanning station, they do slow down as they enter the hypodermic needle and rubber hose which have larger inner diameters. At this point, the cells may encounter turbulence and clump together, but this is of no concern for the cells simply enter the waste cell reservoir.

The size of the light raster is 110 microns in the X direction and 82.5 microns in the Y direction (a 4:3 aspect ratio). The X sweep velocity is 1 line/63.5 microseconds. If 10 sweeps are desired through a typical normal cell, the total scan time required is 635 microseconds per cell.

If the Y displacement of the sweeps is neglected (i.e., only the cell — and not the scan lines — are assumed to move in the Y direction), and if the typical normal cell has a diameter of 45 microns, the cell must move 45 microns within 635 microseconds. This is equivalent to a velocity of 7.1cm/sec., less than the maximum velocity of 11.2cm/sec. and obtainable by having only a partial vacuum at the exit end of the capillary tube. Since 256 line scans take place within 82.5 microns in the Y direction, the raster moves 82.5/256 or 0.322 microns per line in the Y direction. The cell moves at a velocity of 4.5 microns per line. The ratio of the cell velocity in the Y direction to the raster velocity in the same direction is 4.5/0.322 or approximately 14.4:1; thus, the original assumption that the Y displacement of the sweeps can be ignored in computing the required cell velocity for 10 line scans is verified. As far as each cell is concerned, it sees line scans which are approximately perpendicular to the direction of its movement. (The raster is moved in the Y direction only to avoid burns on the phosphor coating on the face of the cathode ray tube.)

The concentration of the cells in the carrier solution determines the number scanned per second. Actually, not all of the cells flowing by the scanning station are scanned. Many flow by above or below the plane of optimum focus and still others may be "hidden" by noise in the scan signal. As will be described below, the scan of such cells does not result in the collection of any significant data.

Assuming that only one of every three cells is properly scanned, and that 40 cells are properly scanned every second (2,400 per minute), the cell flow rate must be 120 per second. The cumulative length of these cells is 120(45) or 5,400 microns. Thus, 0.54cm of cellular material flows by the scanning station each second, while 7.1cm of the carrier solution flows by in the same time period. The spacing between cells is thus (7.1 − 0.54)/(0.54) or approximately 12 times greater than the cell dimension.

There are 60 fields (rasters) generated each second in the illustrative embodiment of the invention. If 40 cells are scanned each second, on the average there will be two cells scanned during every three fields.

It is apparent that it is necessary to support quartz capillary tube 46 in view of the fact that its outer diameter is only 115 microns. It is also important that there be minimum attenuation of the ultra-violet light and that there be minimum distortion of the raster between the objective and condenser lenses. The mounting for the quartz capillary tube, shown in FIG. 7, achieves all of these objectives.

Plate 135 is provided at its center with a recessed area in the middle of which is a hole 140. On top of the recessed area, there is placed a quartz cover slip 138, as shown in FIGS. 7A and 7B. Along the length of plate 135, on both sides of the recessed area, is a groove 136 into which capillary tube 46 is placed (see FIG. 7C). As shown in FIG. 7B, the capillary tube extends from the right side of plate 135, over the quartz cover slip, and around the curved end at the left side of the plate in the downward direction for immersion into a sample.

A syringe 98 is placed in groove 136 as shown in FIGS. 7A and 7B with its beveled tip facing upward. The syringe needle is fixed to plate 135 by silver solder 142 applied to it. The syringe serves as transition piece 98 shown in FIG. 6. Rubber tubing 137 can be coupled to the wide end of the syringe for extending the capillary bore to the vacuum system. After the syringe is mounted on the plate, the capillary tube is placed in groove 136 and its end is forced into the tip of the syringe. Liquid wax is then allowed to drip at the junction of the syringe needle and the capillary tube, as shown at 141, in order to form a good vacuum seal, and in order to secure the capillary tube to supporting plate 135. Wax is similarly applied on the other side of the quartz cover slip and on the bend of the supporting plate in order to secure the capillary tube in place.

A droplet of glycerine oil 139 is then placed on top of the capillary tube and quartz cover slip prior to the lowering of quartz objective lens system 85. The glycerine oil has an index of refraction close to that of the quartz cover slip and the quartz capillary tube. In this manner, there is a minimum of distortion of the ultraviolet light raster as it is transmitted to the center of the capillary tube. Quartz objective lens system 86 is then raised into hole 140 in the mounting plate.

The glycerine oil is quite viscous and, therefore, adheres to the quartz cover slip and the objective lens system without a need for providing a well for containing it. The oil can be replenished at weekly intervals if necessary.

The use of quartz throughout the optical assembly insures that there is minimum attentuation of the ultraviolet light. The use of the glycerine oil reduces the number of abrupt optical interfaces, thereby reducing light loss due to scattering and reflection, and also minimizes the distortion of the imaged raster. The overall assembly also provides a convenient mount for the quartz capillary tube as well as a transition piece for extension to the vacuum pump and waste cell reservoir.

The two lens systems can be moved relative to each other until the light raster is properly focused in the vicinity of the center of the quartz capillary tube, at the plane of maximum cell flow (the level at which the greatest number of flowing cells are in focus). As will be described below, the cells flowing through the capillary tube can be actually observed on a monitor display to facilitate the focusing.

What emerges from the bottom of the quartz capillary tube is a moving beam of light whose ultra-violet and visible component intensities are dynamically modulated by the absorbing cells flowing through the capillary tube, and whose instantaneous X-Y location in the capillary tube is synchronously related to the X-Y coordinates of the flying spot of light on the face of the cathode ray tube. One of the main reasons for separating the visible and ultra-violet wavelengths is that the signal/noise ratio can be improved to a considerable extent. There are two sources of noise whose effect can be reduced. The first, called "phosphor noise", arises from variations in the intensity of the output from the cathode ray tube. If the original light intensity varies, the resulting signals on conductors 93 and 94 will also vary and might otherwise be treated erroneously as representing cellular information. Although originating from the same spot of phosphor, the variations in the visible and ultra-violet light intensities as a result of the cathode ray tube phosphor noise are not identical. In other words, the ratio of the ultra-violet light intensity to the visible light intensity is not constant at all times. However, there is a close degree of correlation between the two. For this reason, as will be described with reference to FIG. 8, the two signals on conductors 93 and 94 are normalized such that their noise amplitudes (measured without cells, and with only the carrier solution, flowing through the quartz capillary tube) are the same. By thus normalizing the two signals, it is possible to subtract the VISIBLE-VIDEO signal from the UV-VIDEO signal with the result that the two common sourced noise components, which are closely correlated with each other, to a great degree cancel out.

The second source of noise consists of non-cellular particles flowing through the quartz capillary tube. These particles generally absorb both ultra-violet and visible light. By normalizing the two signals, when the VISIBLE-VIDEO signal is subtracted from the UV-VIDEO signal, the effects of any non-cellular particles on the system operation are minimized.

This video conditioning minimizes the effects of the two types of noise described above, and also enhances the nucleus-to-cytoplasm distinguishability. However, this technique itself introduces another source of noise. The visible light and ultra-violet light are detected by respective photomultiplier tubes. Each tube is in itself a source of noise (dark current noise, partition noise, shot noise, etc.). The noise components in the two photomultiplier tube signals are not correlated with each other, and subtracting one signal from the other does not diminish noise of this type. However, it has been found that the benefits of canceling the other sources of noise outweigh the disadvantage of having this additional noise source.

As will be described below, the signal which is operated on by the data processor consists of the UV-VIDEO signal on conductor 94, after the VISIBLE-VIDEO signal on conductor 93 has been subtracted from it. This signal is called the PROCESSOR VIDEO signal. But it is also possible, as will be described with reference to FIG. 22, to electronically simulate a cell, that is, to generate an artificial UV-VIDEO signal which represents a cell with predetermined characteristics. The simulated UV-VIDEO signal appears on conductor 72. Referring to switches 28*a*, 29*a* in FIG. 6, in the operate mode switch 29*a* is connected to terminal 29*b* and the UV-VIDEO signal which is transmitted over conductor 100 to the circuit of FIG. 8 is simply the output of photomultiplier tube 91. Similarly, with switch 28*a* connected to terminal 28*b* in the operate mode, the VISIBLE-VIDEO signal on conductor 95 is extended over conductor 101 to the circuit of FIG. 8. However, in the simulate mode, the two ganged switches are connected respectively to terminals 28*c*, 29*c*. In this case, the simulated signal on conductor 72 is transmitted over conductor 100 in lieu of the UV-VIDEO signal. The simulated signal has no noise in it since it does not arise from the actual scanning of cells. There is thus no need to subtract a VISIBLE-VIDEO signal from it to minimize the effect of noise; switch 28*a* is tied to a negative D.C. potential through terminal 28*c* in the simulate mode so that the signal on conductor 101 will simulate a perfectly quiet PMT output corresponding to a constant bright field level.

As will be described below, the simulated signal on conductor 72 is used to adjust various threshold levels in the data processor. It would be possible to introduce the simulated signal to the data processor after the subtraction circuit of FIG. 8 rather than before it as shown. However, the advantage of introducing the signal before the subtraction circuit is that the signal can be used to check the operation of this circuit as well as that of the data processor.

During playback of the recorded video information, the playback signal is used in lieu of the signal at the output of the subtraction circuit of FIG. 8 as controlled by switch 288*a*. It therefore makes no difference in this mode which signals are fed to the subtraction circuit and switches 28*a* and 29*a* can be placed in either position.

Video Conditioner — FIG. 8

The UV-VIDEO signal on conductor 100 (or the simulated cell signal on the same conductor) feeds into AGC amplifier 150. The output of the amplifier on conductor 162, for any line scan through the center of a typical normal cell, has a waveshape as shown adjacent to conductor 162. Recalling that the signal on conductor 94 increases in the negative direction with increasing ultra-violet light input to photomultiplier tube 91, in the absence of any cellular material in the quartz capillary tube the output of amplifier 150 is at a maximum (the negative bright-field level). On the bright-field level there is superimposed a noise signal, as seen most clearly to the left of the leftmost rectangular shaped pulse and to the right of the rightmost square-shaped pulse. The two pulses themselves represent the result of CAT blanking during X flybacks. During X flyback, the output from the flying spot source is at a minimum (it is not zero due to PMT dark current and afterglow of the phosphor), and the output of the ultra-violet photomultiplier tube is correspondingly at a minimum.

To the right of the leftmost X flyback pulse and to the left of the rightmost X flyback pulse are two small humps. These represent signals due to the walls of the quartz capillary tube; the ultra-violet light is absorbed and scattered to some extent by the walls of the capillary tube. At the center of the waveform is the output of the photomultiplier tube signal as the cell is scanned. As the waveform shown is for a reference line through the center of the cell, the signal rises slightly as the cytoplasm is first scanned due to the slight absorption by the cytoplasm of ultra-violet wavelengths. As soon as the light scan enters the nucleus, the absorption increases markedly. As the line scan proceeds past the nucleus and once again enters the cytoplasm, the signal again decreases in magnitude.

The output signal from amplifier 150 is fed into D.C. filter 151. The filter output is proportional to the average value of the UV-VIDEO signal on conductor 162, which is almost exclusively dependent on the bright-field level of the signal. The output of the filter is extneded to one input of difference amplifier 152, the other input of which is connected to potentiometer tap 164. Depending on the position of this tap, the output of the difference amplifier is a signal whose magnitude is an indication of the deviation of the amplitude of the signal on conductor 162 from a desired amplitude. The output of the difference amplifier is fed back along conductor 153 to the AGC control input of amplifier 150. This type of AGC control loop will be familiar to those skilled in the art. The function of the loop is to insure that the average signal amplitude at the output of amplifier 150 remains essentially constant at a level determined by the setting of potentiometer tap 164 and the loop gain.

The VISIBLE-VIDEO signal is extended over conductor 101 to the input of AGC amplifier 154. The output signal from this amplifier is of the form shown adjacent to conductor 163. During X flyback, the visible light is at a minimum level and this results in the two rectangular-shaped pulses at the two ends of the line scan. Similarly, two small humps can be observed as a result of the absorption of the visible light by the walls of the capillary tube, as in the case of the UV-VIDEO signal. When the cell itself is being scanned, the visible light is absorbed by both the cytoplasm and the nucleus of the cell, although the absorption difference between the two cell regions is far less than in the case of ultraviolet light. Also the VISIBLE-VIDEO signal as the cell is being scanned is of lesser magnitude than the UV-VIDEO signal (even when the bright-field signals are normalized) because very little of the visible light is absorbed by nuclear and cytoplasmic material.

The output of amplifier 154 is fed into D.C. filter 155 to derive a D.C. signal which is dependent on the average amplitude of the VISIBLE-VIDEO signal. The filtered D.C. signal is fed into one input of difference amplifier 156, the other input of which has a voltage which can be adjusted by the setting of the potentiometer tap 167. The output of the difference amplifier is fed over conductor 157 to the AGC control terminal of amplifier 154 to maintain the amplitude of the signal on conductor 163 essentially at a predetermined level.

In the initial set-up of the system, the signals on conductors 162 and 163 can be observed on an oscilloscope while only carrier solution flows through the capillary tube. The two potentiometer taps 164, 167 are adjusted until the two noise levels are at the same level. It is this normalizing adjustment which insures that when the two signals are subtracted from each other the noise components cancel to a significant extent.

The signal on conductor 162 is extended to video filter 158 which serves to attenuate the relatively high frequencies in the noise superimposed on the information of interest in the UV-VIDEO signal. Similarly, the signal on conductor 163 is extended to video filter 159. Video filters are used because the cathode ray tube phosphor noise is experienced as high-frequency random modulation. Each filter has a 12 db/octave roll-off with a 3 db corner at 450 khz. The outputs of the two video filters are extended to the two inputs of video subtractor 160. In this unit, the two signals are subtracted from each other. The new base line is zero and the resulting signal ideally is simply the filtered ultraviolet signal which results from the scan of a cell alone (less the much smaller visible signal which also results from the same scan of the cell.)

As will be described below, the UV-VIDEO signal on conductor 53 is extended to a TV type system monitor so that the operator of the machine can observe the flow of cells through the quartz capillary tube. The distinguishable pair of pulses in the signal on conductors 162 and 53 represent the signal due to the walls of the capillary tube, and consequently the operator can see the walls of the tube on the TV monitor and can observe the cells flowing between them. The presentation, for example, gives the operator visual assurance that the cathode ray tube raster image is centered within the capillary tube, that the cells are flowing and that the focus is optimized. However, there exist steep optical gradients at the walls of the capillary tube which make them absorb and/or reflect more visible light than ultraviolet light at some points, and more ultra-violet light than visible light at other points. To eliminate this boundary interface problem electronic switch 161 is provided to gate out the portions of the subtracted signal corresponding to the furthermost portions of the video presentation prior to entering the data processor on conductor 52. As will be described below in the description of the data processor, conductor 51 is ordinarily low in potential, but rises in potential as the central portion of the capillary tube is being scanned. The width of the video window pulse on conductor 51 is 35 microseconds as compared to an X sweep period of 53.5 microseconds. Since the dimension of the X light scan through the capillary tube is 110 microns, the physical dimension of the video window is (35/53.5) (110) or 72 microns as compared to the capillary inner diameter of 90 microns. Electronic switch 161 extends the output of video subtractor 160 to conductor 52 (with switch **288*a* in the position shown) only when the VIDEO WINDOW pulse is generated. Consequently, the PROCESSOR VIDEO signal, as shown adjacent to conductor 52,** does not contain any information outside the boundaries of the video window on any scan line. As for noise within the video window it is attenuated to an acceptable level as a result of the video conditioning decribed above.

During both actual cell scanning and cell simulation, switch **288*a* is connected to operate terminal 288*b* since both of the scanning and simulate signals are derived at the output of subtractor 160. But during playback of a previously recorded PROCESSOR VIDEO signal, the playback signal appears on conductor 88. Accordingly, switch 288*a* is connected to playback terminal 288*c*. The playback signal includes sync information (and annotation information as will be described below), as well as cell scanning information. This sync information is eliminated from the PROCESSOR VIDEO signal by the operation of electronic switch 161 so that the signal on conductor 52** is of the same form as that obtained during the actual scanning or simulation of cells.

Electronic Cell Simulator — FIG. 22

Before proceeding with a description of the data processor, it will be convenient to analyze the operation of the electronic cell simulator. The purpose of the simulator is to allow the operator to feed into the data processor repetitive information pertaining to selected cell shapes. This information allows various potentiometers in the data processor to be adjusted to control the triggering of associated circuits at different levels of input. The operator can simulate a particular type of cell and insure that the data processor will thereafter categorize it in the desired manner by adjusting the level-setting potentiometers in the data processor which determine the categorization of the cell. Of course, the electronic cell simulation also enables the machine operation to be checked; it is easier to trace many malfunctions with known repetitive input signals than it is to trace them with the non-periodic signals resulting from actual cells.

When viewing the TV-type monitor, it will appear that the simulated cell is rectangular in shape — both the border of the cytoplasm around the cell and the border of the nucleus inside the cell are rectangles. The left and right sides of the cell, and the left and right sides of the nucleus can be adjusted to any position within the range of the video window. Similarly, the top and bottom edges of the nucleus, and the bottom edge of the cytoplasm, can be adjusted in the Y direction. (The top of the cytoplasm cannot be adjusted — it always appears on line 50 of each frame. But since only the relative positions of the eight edges to each other affect the categorization of a simulated cell, there is no need to vary one of the edges; the vertical location of a cell within the video window is of no importance.) The signal amplitude (density) can be adjusted both within the simulated cytoplasm and the simulated nucleus. This is a desirable control inasmuch as the data processor includes threshold adjustments which determine when the PROCESSOR VIDEO signal has an amplitude sufficient to characterize a cytoplasm region and a higher amplitude level sufficient to characterize a nucleus region.

Referring back to FIG. 4, the X-SWEEP signal appears on conductor 111 and this signal is extended to one input of each of comparators 536, 541, 545 and 549 on FIG. 22. The setting of potentiometer tap 540 controls the leftmost boundary of the cytoplasm in the simulated cell. As long as the potential on tap 540 is greater than the postential on X-SWEEP conductor 111, the output of the comparator is low. However, when the X-SWEEP signal exceeds the potential at the minus input of the comparator, the output of the comparator goes high. Thus, depending on the setting of potentiometer tap 540 (the CYTO LEFT control), at the same selected point along each line scan the output of comparator 536 goes high to indicate the leftmost border of the cell.

The setting of the potentiometer 542 (the CYTO RIGHT control) determines the rightmost border of the cell. Comparator 541 functions such that its output is high as long as the potential at the plus input exceeds the potential at the minus input. It can be seen therefore that the output of comparator 536 is high from the time the X-SWEEP voltage exceeds the potential on tap 540 until the end of the sweep, and the output of comparator 541 is high from the start of the sweep until the X-SWEEP voltage exceeds the voltage on potentiometer tap 542. The outputs of the two comparators are extended to the two inputs of AND gate 537. The output of the AND gate is ordinarily low but goes high during each X-SWEEP while the X-SWEEP signal is within the bounds determined by the CYTO LEFT and CYTO RIGHT thresholds. The output of gate 537, the CYTO L/R GATE, thus represents the width of the cell during each X sweep. (The width of the pulse at the output of gate 537 is the same for all 256 X sweeps in each field.)

Comparators 545 and 549 serve in a capacity identical to that of comparators 536 and 541, except that they determine the width of the nucleus in the simulated cell. The output of comparator 545 is ordinarily low, but goes high when the X-SWEEP voltage exceeds the voltage on potentiometer tap 546, this voltage being the NUC LEFT threshold. The comparator output remains high until the end of the sweep. The output of comparator 549 is initially high — the comparator output is energized whenever the potential on potentiometer tap 550 is greater than that on X-SWEEP conductor 111. The potential is determined by the NUC RIGHT threshold adjustment. When the X-SWEEP voltage exceeds the potential corresponding to the rightmost border of the nucleus, the output of the comparator goes low.

The outputs of the two comparators are extended to two of the four inputs of AND gate 553. The gate can thus operate only when the line scan is within the bounds determined by the potentiometer settings for the left and right boundaries of the nucleus. The CYTO L/R GATE signal is extended to a third input of AND gate 553. Since, for a properly simulated cell, the left and right bounds of the nucleus must be within the left and right bounds of the cytoplasm, the output of gate 537 will be high whenever the outputs of both comparators 545 and 549 are high. The output of gate 537 is extended to the input of gate 553 to negate the effect of erroneous settings of the threshold potentiometers by the operator. As a result of gate 553, it is not possible to simulate a cell in which either the left or right edges of the nucleus extend outside the left and right edges of the cytoplasm.

The eight outputs of counter 124 on FIG. 5 are extended over cable 133 (a part of cable 84) to FIG. 22 where they are applied to the input of decode "50" circuit 520. This circuit energizes its output when the binary encoded information on the eight conductors in the cable represents the decimal number 50. In the simulation of a cell, the top border of the cell always begins on line 50 in each frame.

At the beginning of the scan of line 50 in each raster, the set input of flip-flop 521 is energized and the flip-flop output switches to the 1 state energizing one input of gate 522. The X-SAMPLE pulses on conductor 113 in FIG. 4 are extended to the other input of gate 522. Once flip-flop 521 is set in the 1 state at the beginning of the scan of line 50, successive X-SAMPLE pulses are extended through gate 522 to the count input of five-stage counter 523. In the simulation of a cell, a maximum of 31 ($2^5-1$) lines are generated. (If more lines are desired a larger counter can be used.) The five output conductors of the counter are extended over cable 524 to the inputs of the three decoders 525, 527 and 528. Each of these decoders can be manually adjusted so that its output is energized when the count represented in counter 523 exceeds a pre-set level (31 or less).

Decoder 528 is set so that its output is energized when the count in counter 523 represents the top of the nucleus. For example, if only five lines are desired to represent the height of the cytoplasm above the nucleus, decoder 528 can be set to energize its output when the count in counter 523 is 5. This would, of course, correspond to line number 55 of the raster. Decoder 527 is set to energize its output when the count in auxiliary counter 523 represents the bottom of the nucleus. For example, if the size from top to bottom desired for the nucleus represents 10 lines, and decoder 528 is set for 5, then decoder 527 would be adjusted to energize its output when the count is at 15. Finally, decoder 525 is set to energize its output when the count in counter 523 represents the number of lines of cytoplasm in the simulated cell. If the cell is to have a total top-to-bottom dimension equal to the spacing between 30 lines, for example, the decoder would be set to energize its output when the counter represents a count of 30. In such a case, the top-to-bottom dimension of cytoplasm below the nucleus would be 15 lines.

The output of decoder 525 is extended directly to the reset input of counter 523 and to the reset input of flip-flop 521. As soon as the line being generated corresponds to the bottom edge of the simulated cell, the counter is reset (in preparation for the next field) and flip-flop 521 is switched to the 0 state. The Q output of the flip-flop goes low so that gate 522 is no longer enabled.

The Q output of flip-flop 521 is extended to the second input of gate 531. The CYTO L/R GATE input of this gate is high during all 256 line scans in every field between the outermost horizontal limits of the simulated cell. The Q output of flip-flop 521 is high only when the lines being generated are those within the top-to-bottom bounds of the cell. Consequently, the output of gate 531 is high only during the scan of those lines representing the cell (the sequence always begins with line 50 and in the illustrative example ends with line 80); but even during the scan of the selected lines the output is low outside the left and right bounds of the cell. Thus, the output of gate 531 is high whenever any part of the desired cell is being simulated — this includes both the nucleus and the more inclusive cytoplasm.

The output of gate 531 is extended to the input of adjustable clipper 532. Depending on the setting of potentiometer tap 533, the CYTO DENSITY control, the output of the clipper can be adjusted to any level corresponding to the desired intensity of the PROCESSOR VIDEO signal during the simulation of the cytoplasm portion of the cell. The potentiometer input to the clipper determines the simulated density of the cytoplasm.

Flip-flop 530 is set in the 1 state when the output of decoder 528 goes high, that is, when the line being scanned corresponds to the selected top of the nucleus. When the output of decoder 527 goes high, that is, when the line representing the bottom of the nucleus is being scanned, a pulse is extended through OR gate 529 to the reset input of flip-flop 530. Thus, the flip-flop is in the 1 state only when the lines being scanned correspond to those desired for the simulated nucleus (lines 5–15 in the illustrative example). The OR gate 529 is provided so that the operation of decoder 525 can also reset flip-flop 530. The bottom of the nucleus should not extend past the bottom of the cytoplasm in a simulated cell. When decoder 525 operates, it is an indication that the bottom of the cell has been reached in the simulation, and even if the operator sets decoder 527 so that the bottom of the nucleus extends past the bottom of the cytoplasm, the pulse transmitted from decoder 525 through OR gate 529 to the reset input of flip-flop 530 prevents the simulated nucleus from having a bottom edge below the bottom edge of the cytoplasm.

While flip-flop 530 is in the 1 state, its Q output is high. This output is coupled to an input of gate 553. As described above, the other three inputs to the gate are high during every line scan during that portion of the sweep corresponding to the width of the desired nucleus. Although the other three inputs to gate 553 go high during each of the 256 line sweeps in each frame, the fourth input to gate 553 is high only during the period that the generated lines correspond to the desired height of the nucleus. Thus the output of gate 553 is high only when the X-SWEEP signal corresponds to the nucleus portion of the simulated cell.

The output of gate 553 is extended to the input of adjustable clipper 554. The setting of potentiometer tap 555, the NUC DENSITY control, adjusts the level of the output of the clipper. The output of the clipper is high only when the X-SWEEP signal corresponds to a portion of the nucleus, and the setting of potentiometer tap 555 is adjusted so that the output of clipper 554 represents the difference between the desired densities of the nucleus and the cytoplasm.

The output of clipper 532 is extended through resistor 560 to one input of operational amplifier 561 and the output of clipper 554 is extended through resistor 559 to the same input. The plus input of the operational amplifier is grounded and resistor 558 provides negative feedback from the output to the ungrounded input. As will be apparent to those skilled in the art, operational amplifier 561 functions as a summer. The output potential to resistor 563 is the simulated cell signal which is inverted by operational amplifier 562 and extended to terminal 29C on FIG. 6. During the first 49 line scans in each frame, neither of gates 531 and 553 operate and the potential on resistor 563 is zero. Starting with line 50 and until the line corresponding to the setting of decoder 528 is reached, only gate 531 operates. The signal across resistor 563 represents the desired cytoplasm density; during each line scan a pulse is generated whose width corresponds to the left and right bounds of the cell and whose amplitude corresponds to the simulated cytoplasm density.

Beginning with the line which corresponds to the top of the nucleus as determined by the setting of decoder 528, both of gates 531 and 553 are enabled. At the start of the generation of each X sweep, neither of gates 531 and 553 operates. Gate 531 first operates when the leftmost edge of the simulated cell is reached and the voltage at the output of clipper 532 rises, causing the voltage across resistor 563 to drop. As soon as gate 553 operates, corresponding to the left edge of the nucleus, the output of 554 rises, causing the voltage across resistor 563 to fall below the previous level. As soon as gate 553 turns off, at the rightmost nucleus edge in each line scan, the signal across resistor 563 returns to the level corresponding to that due to the output of clipper 532. When gate 531 turns off, corresponding to the rightmost edge of the cell, the signal across resistor 563 returns to ground potential.

The outputs of clippers 532 and 554 are positive, but the output of summer 561 is negative because of the inversion which is inherent in the summer operation. It is necessary to invert the signal at the output of the summer in order that the signal extended over conductor 72 can simulate the signal shown adjacent to conductor 162 on FIG. 8. It is also necessary to shift the base level of the simulated cell signal to correspond to the bright-field level of the signal on conductor 162. Both of these functions are accomplished by operational amplifier 562. The output of summer 561 is coupled through resistor 563 to the minus input of the amplifier. This configuration, together with the inclusion of feedback resistor 564, causes the signal on conductor 72 to be the inversion of the input signal. The plus input of the operational amplifier is held at a negative potential to shift the base level of the output to that level corresponding to the bright field.

After decoder 527 operates, gate 553 remains off. Thereafter, only gate 531 operates during each line scan and a single-level pulse is generated on conductor 72 during each line scan corresponding to the cytoplasm at the bottom of the cell. After decoder 525 operates, corresponding to the bottom of the cell, gate 531 remains off for the remainder of the frame since the cell simulation has been completed.

It will be apparent that considerable flexibility is provided in the electronic cell simulator. The size of each of the cell edges can be adjusted. Similarly, the size of each of the nucleus edges can be adjusted. Finally, the densities of both the cytoplasm and the nucleus can be varied independently.

Recorder Monitor Display — FIG. 28

The PROCESSOR VIDEO signal on conductor 52 is extended via video recorder summer to the video tape recorder. In the summer, the signal is combined with composite sync pulses. The signal can be recorded for subsequent playback. Depending on the setting of a switch to be described below, the signal which is extended to the video recorder can be digitized. The PROCESSOR VIDEO signal is an analog signal in that the instantaneous magnitude of the signal is dependent upon the density of the particular part of the cell being scanned. It is sometimes more advantageous to display the flowing cells with only three levels of contrast (apart from the white background on the TV display); the cytoplasm can be shown as gray, a typical nucleus can be shown as gray-black, and the center of a nucleus, if it is very dense, can be shown as black. The data processor is capable of digitizing the PROCESSOR VIDEO signal, and if it is desired to do so the digitized PROCESSOR VIDEO signal can be recorded rather than the analog signal itself.

The data processor, in addition to categorizing each cell, also generates various signals which are combined with either the analog or digitized PROCESSOR VIDEO signal so that each cell which appears on the recorder monitor display during playback is accompanied by indications of the decisions concerning it made by the data processor. By providing a permanent record of the decision made with respect to each cell, a pathologist can play back the video tape and determine whether the data processor categorized the cell properly.

The recorder monitor display is shown in FIG. 28. There are two data columns to the left of the video window and there are five data columns to the right of the video window. Four cells are shown in the video window. If played back at normal speed, the cells would appear to move up rapidly on the TV display. However, the video tape can be played back on commercially available machines such that the TV display can be slowed down or stopped so that a particular cell or pattern can be studied.

The display shown in FIG. 28 is of the type produced when the digitized PROCESSOR VIDEO signal is extended to the monitoring equipment. Cell 1 is a normal cell. The cytoplasm is gray and this is shown by vertical hatching. The nucleus is darker (gray-black) and this is indicated by the cross-hatching.

If two (or more) cells flow through the capillary tube in the form of a clump, they will be displayed as shown on FIG. 28 for cells 2 and 3. The two cells shown are normal, but as will be described below they are categorized as neither normal nor non-normal due to the fact that cells scanned in a clump may result in erroneous categorization.

Cell 4 is non-normal in a number of respects. For one thing, at the center of the nucleus the density is too high, and this results in a black spot at the center of the nucleus on the TV display. For another, the shape of the cytoplasm is clearly irregular as compared with the other cells.

As will be described in detail below, the data processor is arranged to perform up to five tests on each cell. Switches are available so that selected tests can be activated to allow the categorization of a cell as non-normal. The five columns to the right of the TV display represent the output decisions of these five tests. In the upper righthand corner of the display, a dark band appears at the top of those columns whose respective selector switches are operated so that failure of any of the activated tests will result in the categorization of a cell as non-normal. Each of the dark bands is actually formed by blanking gated portions of six successive lines in the TV scan as the lines pass through the respective column, at the start of each field. In the example shown in the drawing, the data processor has been set so that the "diameter" test is not active. The other four tests are made on every cell. By this coding of the five rightmost columns, anyone examining the video tape will know which tests were active during the displayed frame.

The two leftmost columns are labelled "histiocyte" and "normal". Blanking of six lines in the histiocyte column below any cell is an indication that the cell has been recognized as a histiocyte. The test for histiocytes is dependent upon the VISIBLE-VIDEO signal amplitude and will be described below.

Each line scan on the TV display requires 53.5 microseconds — the same time required for each X sweep across a cell flowing through the capillary tube. The video window corresponds to 35 nicroseconds of the total as described above. Each of the five columns on the right side of the display corresponds to 2 microseconds of each sweep, and each of the left-most columns correspond to 4.25 microseconds of the sweep. (Since the raster has an aspect ratio of 4:3, it will be apparent that the display of FIG. 28 is not drawn to scale. The actual display is wider than it is high by a ratio of 4:3.)

Cell 1 is a normal cell and accordingly six successive lines of the scan are blanked in the normal column below cell 1. In the case of a cell clump or any other condition which is ambiguous, a decision is not made as to whether the scanned cell (or cells) is normal or non-normal. An ambiguous condition is represented by blanking the normal column and all five non-normal columns, as shown below cells 2 and 3.

If a cell is categorized as non-normal, as is cell 4, the particular tests which the cell failed and which resulted in categorizing the cell as non-normal are indicated by blanking six lines in the respective non-normal column below the cell. In the illustrative example of cell 4, the "shoulder", "shape" and "area" tests were those failed. (The diameter test might also have been failed by cell 4 had the diameter test been in operation, but since the absence of blanking at the top of the diameter column indicates that the test was not in operation, no information can be obtained from the display in this regard.) As shown, cell 4 was also analyzed by the data processor as being a histiocyte. In such a case, six lines in the histiocyte column are blanked below the cell.

Many variations are possible, and the particular examples shown in the drawing have been selected for illustrative purposes only. The form of the display will be better understood following the discussion below of the five tests which are performed on each cell, as well as the method of generating the display.

Data Processor — FIGS. 9–21

Figure 9:
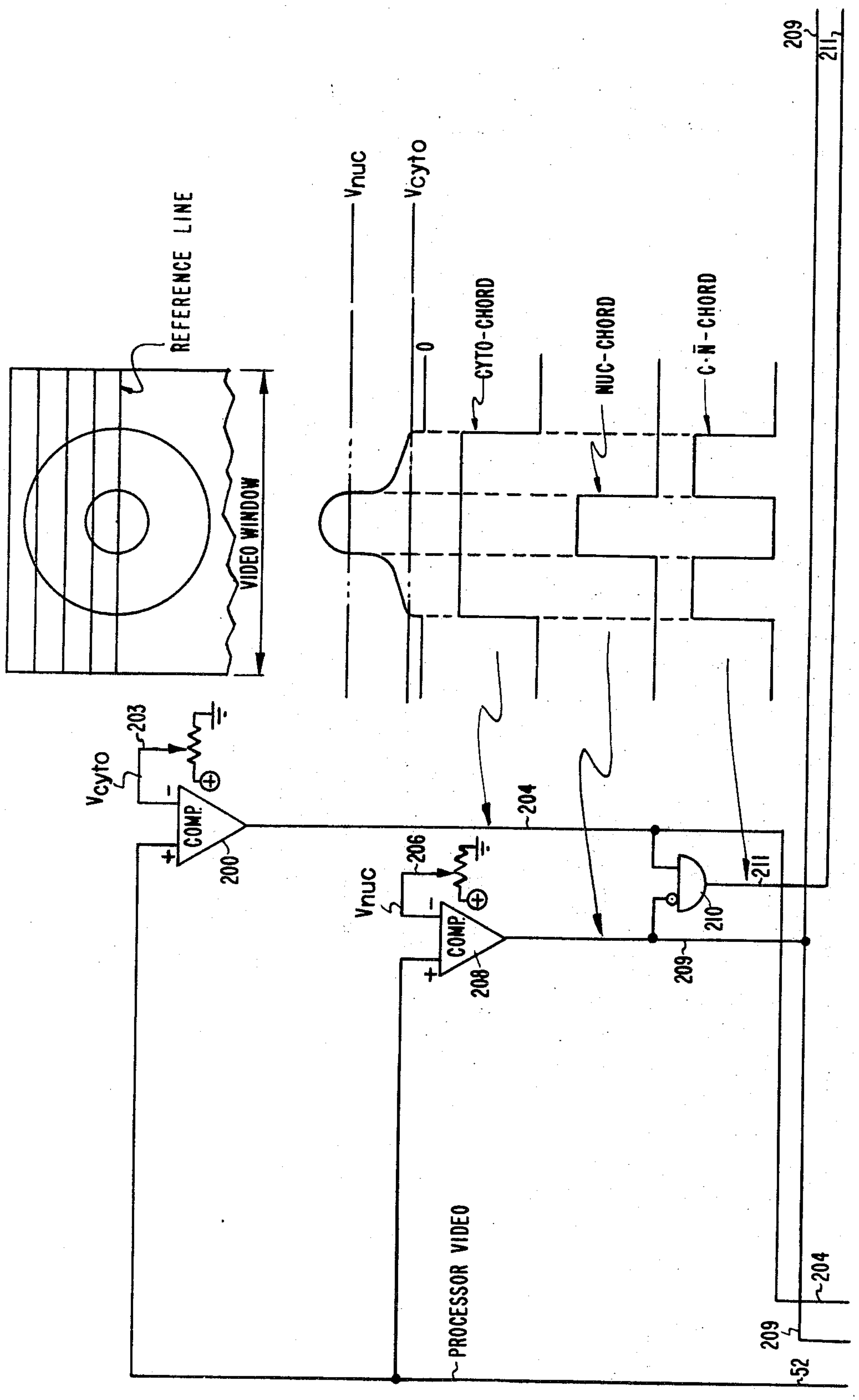

In the upper right-hand corner of FIG. 9, there is shown an idealized cell (circular, with a circular nucleus) within the video window. Five line scans are shown across the first half of the cell. Basic to the operation of the data processor is the initial determination as to whether the region of cellular material being examined at any particular time is cytoplasm or nucleus. The PROCESSOR VIDEO signal is of the form shown in the waveform adjacent to conductor 52 in FIG. 8. The signal is zero (except for any noise) when a cell does not flow between the objective and condenser lenses in the optical system. As the cell cytoplasm is being scanned, the PROCESSOR VIDEO signal increases. And as the nucleus of the cell is being scanned the PROCESSOR VIDEO signal increases still further.

In FIG. 9, directly below the idealized cell, there are shown the PROCESSOR VIDEO signal for line 5 of the scan, and three waveforms which are produced as a result of the scan. In the upper waveform, the PROCESSOR VIDEO signal is shown having a ground base voltage. Two thresholds, $V_{cyto}$ and $V_{nuc}$, are shown superimposed on the PROCESSOR VIDEO signal. If the signal exceeds the $V_{cyto}$ threshold but is below the $V_{nuc}$ threshold, it is an indication that cytoplasm is being scanned. The $V_{cyto}$ threshold is adjusted such that it is not exceeded by the quiescent background noise which is present in the PROCESSOR VIDEO signal. The $V_{nuc}$ threshold is adjusted such that it is exceeded by the PROCESSOR VIDEO signal when the signal is greater than the minimum ordinarily obtained when a nucleus is scanned. The PROCESSOR VIDEO signal is a maximum while the center of the cell is being scanned partly because of the greater absorption of ultra-violet wavelengths by the nuclear material, and partly because of the generally spherical geometry of the cell flowing through the capillary tube. Because of the spherical shape of the cell, the ultra-violet light must pass through more cellular material in the middle region of each cell.

The first waveform which is derived from the PROCESSOR VIDEO signal is that on conductor 204, identified throughout the drawing as CYTO-CHORD. This signal is ordinarily low, and goes high whenever the $V_{cyto}$ threshold is exceeded by the PROCESSOR VIDEO signal. The PROCESSOR VIDEO conductor 52 is connected to one input of comparator 200. The other input, the $V_{cyto}$ threshold, is connected to potentiometer tap 203 and the threshold can be varied by adjusting the position of the tap. The output of the comparator goes high whenever the PROCESSOR VIDEO signal exceeds the $V_{cyto}$ threshold. As shown in FIG. 9, the signal is high not only while the cytoplasm is being scanned, but also while the nucleus is being scanned since at this time the $V_{cyto}$ threshold is certainly exceeded.

The second waveform which is derived is that on conductor 209, identified throughout the drawing as NUC-CHORD. This signal is ordinarily low, but goes high whenever the PROCESSOR VIDEO signal exceeds the $V_{nuc}$ threshold. The PROCESSOR VIDEO conductor 52 is extended to one input of comparator 208. The other input, the $V_{nuc}$ threshold, is connected to potentiometer tap 206 and as the position of this tap is varied the $V_{nuc}$ threshold can be adjusted. The output of comparator 208 is ordinarily low, but goes high whenever the PROCESSOR VIDEO signal exceeds the $V_{nuc}$ threshold.

The third waveform which is generated is that on conductor 211, identified throughout the drawing as $C\cdot\overline{N}$-CHORD. The signal is ordinarily low, and goes high only when the CYTO-CHORD signal is high and the NUC-CHORD signal is low. The CYTO-CHORD signal on conductor 204 is connected to one input of gate 210 and thus the output of gate 210, the $C\cdot\overline{N}$-CHORD signal, can be high only when the CYTO-CHORD signal is high. The other input to gate 210 is the NUC-CHORD signal, but the signal is inverted at the input. Consequently, the output of gate 210 can go high only in the absence of the NUC-CHORD signal. For a scan through the center of a cell, the $C\cdot\overline{N}$-CHORD signal consists of two pulses representative of the two regions of the cytoplasm on either side of the nucleus. These regions are referred to herein as "cytoplasm shoulders".

For a line scan above or below the nucleus, the CYTO-CHORD signal would be similar to that shown in FIG. 9 but would have a smaller width, the NUC-CHORD signal would not be generated, and the $C\cdot\overline{N}$-CHORD signal would be identical to the CYTO-CHORD signal. The three signals are extended throughout the data processor to control various tests performed with respect to each cell. These digitized (yes-no) signals are used in those tests where cell dimensions (as opposed to cell densities) are the controlling criteria.

As each line scan proceeds, many digitized decisions regarding normalcy are made in real-time. However, these decisions are stored in "scratch-pad" type memories until the entire cell has been scanned. Since the digital decisions are made on a line-by-line basis, it is apparent that the X-SAMPLE and X-RESET pulses generated by the circuit of FIG. 4 can be used for the proper timing of the line-by-line decision logic circuits. However, additional signals are required to indicate the start of the scan of a cell and the end of the scan of the cell. The Y-SWEEP signal on conductor 127 (FIG. 5) which is used to control the Y scan is not sufficient for this purpose because a cell may have been scanned completely before the raster has been completed. Furthermore, the scan of a cell does not necessarily begin at the start of each Y sweep. In fact, during normal cell flow, it will be found that for many complete Y sweeps no cells are detected within the video window.

Figure 10:
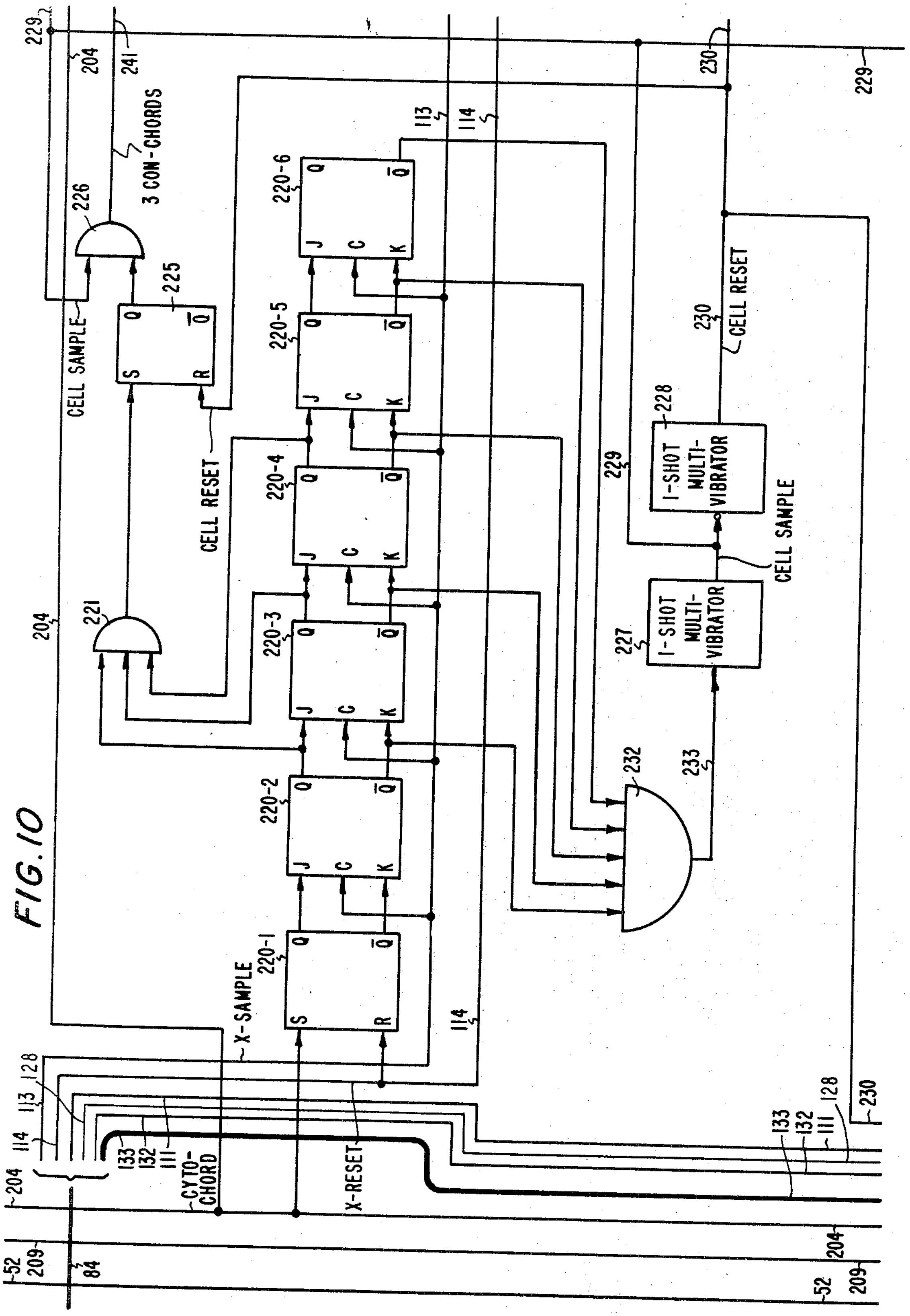

The circuitry on FIG. 10 is used to determine the start and end of the scanning of any cell. Each X-RESET pulse on conductor 114 resets flip-flop 220-1 in the 0 state. Each CYTO-CHORD pulse on conductor 204 sets the flip-flop in the 1 state. An X-SAMPLE pulse is generated at the start of each line scan. The X-SAMPLE pulse on conductor 113 is coupled to the C (clock) input of each stage of the five-stage shift register consisting of J-K flip-flops 220-2 through 220-6. The two outputs of each of the flip-flops are connected to the two inputs of the succeeding flip-flop in the chain.

It is apparent that the six flip-flops comprise a shift register, with each X-SAMPLE pulse shifting the data down the register, and each X-RESET pulse making a new CYTO-CHORD pulse a requisite for an entry of a 1 into the register.

The state of flip-flop 220-1 is determined by the presence of an X-RESET pulse on conductor 113, connected to the reset input, or the presence of a CYTO-CHORD pulse on conductor 204, connected to the set input. In the absence of CYTO-CHORD pulses for a number of line scans, 0's are continuously stored in flip-flop 220-1 and shifted down the chain. However, if successive CYTO-CHORD pulses are generated, 1's are continuously shifted down the chain. The net result of the arrangement is that the states of the six flip-flops represent the recent past history insofar as the generation of the CYTO-CHORD pulses during prior successive line scans is concerned.

The Q outputs of flip-flops 220-2, 220-3 and 220-4 are coupled to three inputs of gate 221. This gate can therefore operate only if the three flip-flops are all in the 1 state. This in turn requires that three CYTO-CHORD pulses were generated during three prior successive line scans. It is this criterion that is used to indicate the start of the scan of a cell. One or even two CYTO-CHORD pulses during successive line scans is not considered to be a sufficient indication of the start of a cell. For example, an isolated CYTO-CHORD pulse may sometimes be generated when the background noise exceeds the $V_{cyto}$ threshold level. With the operation of gate 221, flip-flop 225 is set in the 1 state. As long as this flip-flop is in the 1 state, it is an indication that the scan of a cell is in progress.

The end of the scan of a cell is determined by verifying the absence of the generation of the CYTO-CHORD pulse during five successive line scans. It is only after five line scans in succession have taken place without the generation of a single CYTO-CHORD pulse that an end-of-cell condition is indicated. To implement this criterion, the $\overline{Q}$ outputs of flip-flops 220-2 through 220-6 are each extended to a respective one of the five inputs of AND gate 232. As soon as all five flip-flops are in the 0 state, all $\overline{Q}$ levels will be high, and the gate operates. The signal on conductor 233 triggers monostable multivibrator 227. A positive 2-microsecond pulse is generated on CELL SAMPLE conductor 229. The CELL SAMPLE pulse is extended to one input of AND gate 226. The other input to the gate is connected to the Q output of flip-flop 225. With the generation of the CELL SAMPLE pulse, gate 226 operates to generate a pulse on conductor 241. This pulse is called the 3 CON-CHORDS pulse throughout the drawing and is an indication that three consecutive CYTO-CHORD pulses were detected to indicate the acknowledgement of the scan of a cell, and that the end of the scan of the cell has now taken place.

Although the detection of only three CYTO-CHORD pulses during three consecutive scans is the criterion for determining the start of the scan of a cell, the absence of five such pulses in consecutive scans is required before an end-of-cell condition is established. This is due to the fact that even during the scan of a cell a number of CYTO-CHORD pulses may be absent. As the cells flow through the capillary tube they may wander out of the focal plane of the light raster in which case several CYTO-CHORD pulses may not be generated. Or a cell may be folded, for example, in the shape of a U, in which case CYTO-CHORD pulses may not be generated while the middle part of the cell is being scanned. Furthermore, low-frequency noise of polarity opposite to that of the positive PROCESSOR VIDEO signal, may prevent CYTO-CHORD pulses from being generated during a number of successive line scans.

At the trailing edge of the CELL SAMPLE pulse monostable multivibrator 228 is triggered. A 2-microsecond positive CELL RESET pulse is generated on conductor 230. The pulse is applied to the reset input of flip-flop 225 to place the flip-flop in the 0 state, in which state it remains until three CYTO-CHORD pulses are detected during three successive line scans of a new cell.

It is possible for a raster to end before a cell has been completely scanned. In such a case, the tail part of the cell cannot be scanned. However, it is still desirable to make a logic decision as to normality at the end of each raster even if a cell has not been scanned completely. In general, it has been found that making logic decisions based on partial scans is better than dumping whatever data may be stored in the PROCESSOR.

As discussed above with reference to the circuit of FIG. 5, there are at least six X-SAMPLE pulses during the flyback blanking time of the Y-SWEEP signal. During the flyback time, the PROCESSOR VIDEO signal is at ground and the CYTO-CHORD pulses cannot be generated. But the X-SAMPLE and X-RESET pulses are still generated at 63.5-microsecond intervals. Thus the six or seven X-RESET pulses during each Y flyback period are applied to the reset input of flip-flop 220-1, and the X-SAMPLE pulses in the succeeding cycles shift the 0's stored in flip-flop 220-1 down the chain. Consequently, gate 232 must necessarily operate at the end of each Y flyback period. In the event flip-flop 225 has been set earlier by the generation of three CYTO-CHORD pulses in three successive cycles, the 3 CON-CHORDS pulse is generated to indicate that the scanning of a cell has been completed. In fact, scanning of the cell may not have been completed because the raster may have terminated within the cell. However, whatever information has already been stored in the remainder of the data processor is used at this time to generate a decision as to the morphology of the cell.

There are three possible categories into which any cell may fall — normal, non-normal or ambiguous. The non-normal criteria will be discussed below. A cell (or clump of cells) is considered to be ambiguous if data is produced which is so atypical that it cannot be considered to have been derived from a single cell at all. An ambiguous condition is detected by counting too many CYTO-CHORD or NUC-CHORD pulses during the scan of any supposedly single cell. Each CELL RESET pulse is applied to the reset terminal of the five flip-flops 250-1 through 250-5 and the six flip-flops 252-1 through 252-6, shown on FIG. 11. Initially, all of the flip-flops are placed in the 0 state and the Q output terminals are low. The NUC-CHORD pulses are applied to the T (toggle) input of flip-flop 250-1. It is apparent that the five flip-flops 250-1 through 250-5 serve as a binary counter for counting the total number of NUC-CHORD pulses which are generated following the generation of a CELL RESET pulse.

The CYTO-CHORD pulses are applied to the toggle input of flip-flop 252-1. The six flip-flops in the second level form a binary counter for counting the total number of CYTO-CHORD pulses which are generated following the generation of a previous CELL RESET pulse.

The Q outputs of the NUC-CHORD counter, conductors 251-1 through 251-5, are extended along cable 265 to decoder 254. This decoder can be manually adjusted and serves to energize output conductor 263 when the total count represented by flip-flops 250-1 through 250-5 exceeds the pre-set NUC-CHORD pulse count figure set in the decoder. When conductor 263 goes high it is an indication that too many NUC-CHORD pulses have been counted following a CELL RESET pulse for the particle being examined to be considered a cell at all. Instead, the cell (or cell clump) being examined should be categorized as ambiguous.

Similarly, conductors 253-1 through 253-6 extended from the Q outputs of flip-flops 252-1 through 252-6 are connected to the inputs of decoder 255. A pre-set maximum CYTO-CHORD pulse count can be set in this decoder, and output conductor 262 is energized when the number of CYTO-CHORD pulses which are counted is too large for the decision logic to categorize the cell (or cell clump) as normal or non-normal. The pre-set count for decoder 255 is larger than that for decoder 254 since more CYTO-CHORD pulses than NUC-CHORD pulses are generated for any sample. For the same reason, while only five flip-flops are required to count NUC-CHORD pulses (up to a maximum of 31) six flip-flops are used to count CYTO-CHORD pulses (up to a maximum of 63). In the illustrative example above in which a normal cell is scanned by 10 lines, decoder 255 is preferably pre-set with a count of 15 and decoder 254 is pre-set with a count of 8.

The CELL RESET pulse on conductor 230 is applied to the reset input of flip-flop 257. With the flip-flop in the 0 state, the Q output is low indicating that an ambiguous condition has not been detected. However, if following the generation of the CELL RESET pulse, either of decoders 254 or 255 operates, the resulting pulse on conductor 262 or 263 is transmitted through OR gate 256 to the set input of flip-flop 257. The flip-flop switches to the 1 state, and the AMBIGUOUS STATE conductor 260 goes high to indicate that when the CELL SAMPLE and CELL RESET pulses are eventually generated following the end of the scan of the cell (or cell clump) the ambiguous count should be incremented, not the non-normal count in the event the cell failed any of the various tests performed on it.

The VIDEO WINDOW signal is used to gate electronic switch 161 on FIG. 8 in order to eliminate noise in the PROCESSOR VIDEO signal outside the scanning area of interest. The window actually appears on the tv monitor presentation as two vertical lines, shown in FIG. 28 as occurring at times $T_b$ and $T_c$ in each line scan. (FIG. 28 depicts the form of the recorder monitor display. The microscope monitor display, which will be described below, also shows the walls of the capillary tube, and thus the video window can be accurately adjusted within the capillary tube.) The VIDEO WINDOW signal is derived by the circuitry on FIG. 12.

The X-SWEEP waveform on conductor 111 is applied to the plus input of comparator 282 and the minus input of comparator 281. Depending on the setting of potentiometer tap 279, the output of comparator 282 is low until the X-SWEEP voltage exceeds the potential on the tap. Thereafter, the output of comparator 282 remains high through the end of the sweep. The output of comparator 281 is high whenever the potential on tap 280 is greater than the magnitude of the X-SWEEP voltage. At the beginning of each sweep the output of the comparator is high, but as soon as the X-SWEEP voltage exceeds the potential on tap 280 the output of the comparator goes low.

The outputs of the two comparators are connected to two of the inputs of AND gate 283. The third input to the gate is coupled via conductor 128 to the Q output of flip-flop 122 on FIG. 5. The flip-flop is in the 1 state with its Q output high during the 256 line scan which occur in every complete raster. The Q output is low during the Y blanking time. Thus gate 283 is enabled only during the raster time. This insures that PROCESSOR VIDEO conductor 52 is held at ground potential by the action of electronic switch 161 between rasters. At the beginning of each X sweep only the output of comparator 281 is high, and at the end of each X sweep only the output of comparator 282 is high. But in the middle of each sweep both outputs go high and during active raster time the VIDEO WINDOW conductor 51 will accordingly be gated high. This signal is fed to the gate input of electronic switch 161 as described above.

It is also necessary to derive two short (0.2-microsecond) pulses at both ends of the VIDEO window. For example, these pulses are used to control the generation of the video window limit lines on the display of FIG. 28. The VIDEO WINDOW signal on conductor 51 is extended to the input of one-shot multivibrator 286. The positive step on the VIDEO WINDOW signal triggers the multivibrator which then energizes its output WINDOW START conductor 292 for 0.2 microseconds. Similarly, the VIDEO WINDOW signal is inverted by inverter 284 so that the signal on conductor 285 consists of an inverted VIDEO WINDOW pulse during each line scan. At the trailing edge of this pulse, the positive step triggers one-shot multivibrator 287. A 0.2-microsecond pulse is generated on WINDOW STOP conductor 293. The WINDOW START and WINDOW STOP pulses are identical and occur at the start and end limits of the VIDEO WINDOW portion of each X sweep.

Figure 12:
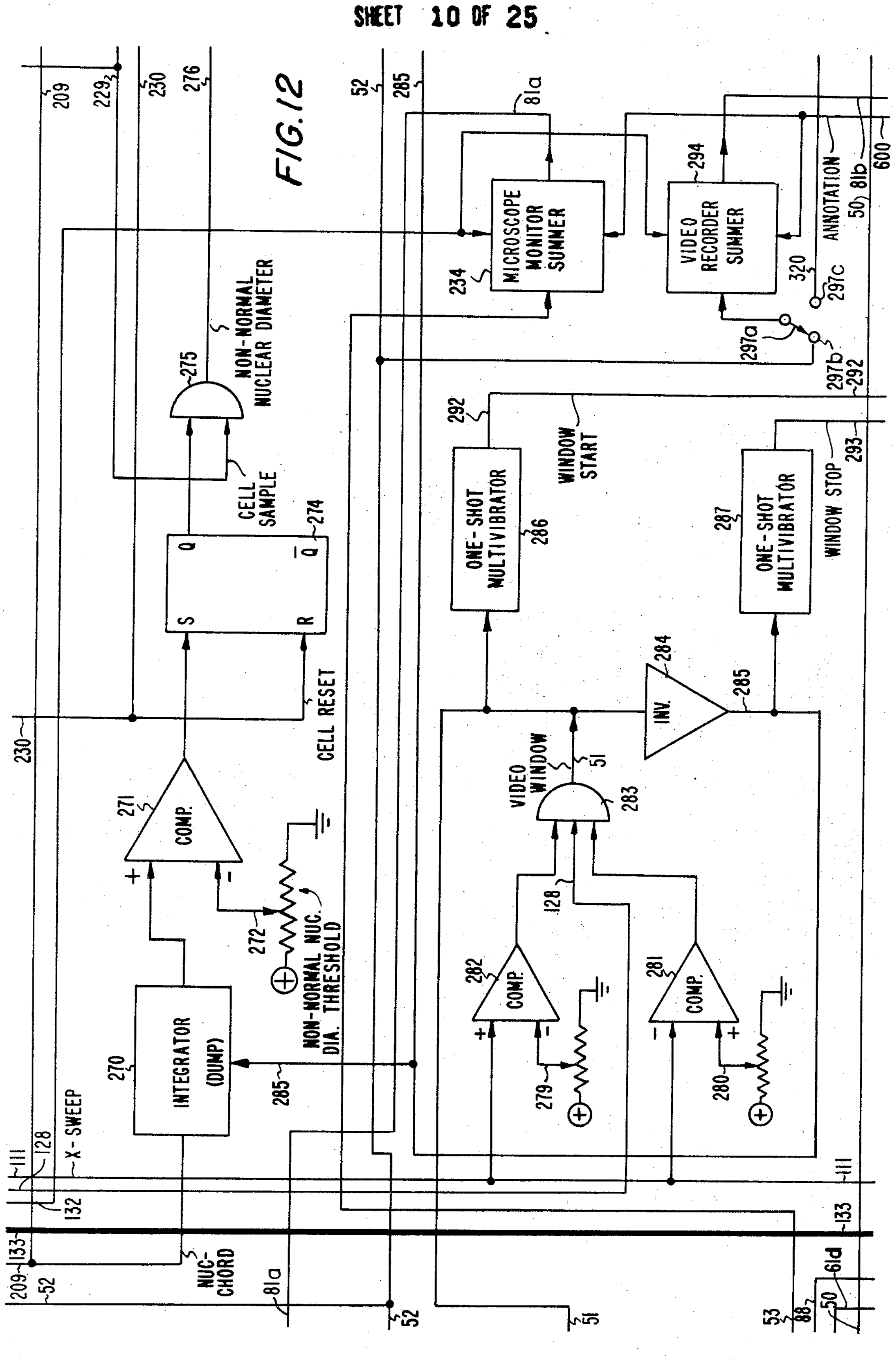

Two summers are provided on FIG. 12 — microscope monitor summer 234 and video recorder summer 294. These summers are used to combine various signals in the data processor for deriving the composite video signals necessary to operate the microscope monitor 700 and the video tape recorder 701 (FIG. 23). Microscope monitor summer 234 has three inputs. The first is conductor 132 which is extended from FIG. 5 and has on it the composite X and Y sync information necessary to produce a TV display synced to the operation of the data processor. The second input to summer 234 is connected to ANNOTATION conductor 600. As will be described below, this conductror is connected to the output of gate 447 on FIG. 20 and it is the signal on this conductor which controls the generation of the vertical lines in the display of FIG. 28 as well as the horizontal blanking segments. At this point, it should be noted that if switch 648 on FIG. 20 is closed, gate 447 cannot operate and there is no ANNOTATION signal on conductor 600. The third input to summer 234 is connected to conductor 53 on which the UV-VIDEO signal appears. This signal contains information on capillary location, cell flow, optical focus, raster uniformity, etc. (Alternatively, referring back to FIGS. 6 and 7, depending on the setting of switch 29*a*, the simulated cell signal may be selected to appear on the third input to summer 234.)

The output of the microscope monitor summer on conductor 81*a* is extended to a TV-type microscope monitor 700 on FIG. 6. The microscope monitor is provided so that the operator can continuously monitor conditions in the critical raster scan area. The following different TV presentations can appear on the microscope monitor:

1. With switch 29*a* in FIG. 6 in the operate position, the UV-VIDEO signal controls the display. The operator can observe the walls of the capillary tube together with the cells flowing through the tube. He can also determine optimum focus and clogged capillary conditions as they occur. If switch 648 on FIG. 20 is closed, the ANNOTATION signal is not presented on the monitor. The operator sees just the walls of the capillary tube and the stream of flowing cells.

2. If switch 29a is in the operate position but switch 648 is open, the ANNOTATION signal information is also extended to system monitor 700 through microscope monitor summer 234. The ANNOTATION data (the information in the histiocyte, normal and five non-normal columns of FIG. 28) appears on the display superimposed on the presentation of the walls of the capillary tube. The walls of the capillary, however, do not show up as very dark or well focused vertical columns and thus it is possible to extract all of the information from the display. More important, the video window appears on the microscope monitor within the walls of the capillary tube and the operator can adjust the video window dimension by changing the setting of the potentiometer taps 279 and 280 on FIG. 12, or, if necessary, he can re-position the capillary tube.

3. If switch 29*a* is in the simulate position, the simulated cell appears as a pair of stationary rectangles on the microscope monitor. The walls of the capillary tube are not displayed in this mode since they are not included in the simulated cell signal. However, when a cell is being simulated there is no need to see or simulate the capillary walls since they are gated out of the data processor by electronic switch 161 in any case. If switch 648 on FIG. 20 is closed, the simulated cell would appear on the microscope monitor with no annotation. If the switch is open, the ANNOTATION signal is allowed to pass through gate 447 and the data processor decisions appear on the microscope monitor to the left and right of the simulated cell. The characteristics of the cell can be adjusted by the operator and various threshold levels in the data processor can be changed so that desired decisions will thereafter be made for cells having pre-set characteristics. These threshold adjustments will be described below.

4. If switches 90*a* (FIG. 4), 129*a* (FIG. 5) and 288*a* (FIG. 8) are set for video playback, the microscope monitor display (either cells flowing through the capillary tube or simulated cells depending on the setting of switch 29*a*, (FIG. 6) would have no correspondence to the playback information being fed into the data processor. The microscope monitor display should be turned off or ignored in this mode. A display corresponding to the PROCESSOR VIDEO signal appears on recorder monitor 709.

Video recorder summer 294 also has three inputs. Two of these inputs are the same as two of the inputs to the microscope monitor summer. Conductor 132 is extended to the recorder summer to extend the composite sync information to the video tape recorder. The ANNOTATION signal on conductor 600 is also extended to an input of summer 294.

The third input to the video recorder summer depends on the setting of switch 297*a*. With the switch connected to terminal 297*c*, conductor 320 is connected to the third input of the summer. The signal on conductor 320, as will be described below, is the PROCESSOR VIDEO signal, but in a digitized form so as to produce a digitized display such as that shown in FIG. 28; it is accordingly referred to as digitized video. On the other hand, if switch 297*a* is connected to terminal 297*b*, conductor 52 is connected to the third input of the video recorder summer, and the analog form of the PROCESSOR VIDEO signal is available for recording. As for the PROCESSOR VIDEO signal itself, either one of two signals appears on conductor 52 depending on the setting of switch 288*a* in FIG. 8. If the switch is connected to OPERATE terminal 288*b*, the PROCESSOR VIDEO signal is either an actual scanning signal or a simulated cell signal (depending upon the settings of switch 29*a* on FIG. 6).

On the other hand, if switch 288*a* is connected to playback terminal 288*c*, conductor 88 is connected to the third input of the video recorder summer. As described above, when the video recorder is played back the signal extended to conductor 52 is the PROCESSOR VIDEO signal previously recorded. This signal is extended through the video recorder summer back to the video tape equipment. However, the signal so obtained is not ordinarily used for recording since it is already recorded and is in fact being played back at that time. The primary reason for extending the playback signal on conductor 88 to the conductor 52 when switch 288*a* is connected to playback terminal 288*c* is to allow the previously recorded video signal to be applied to the data processor so that system operation can be studied while decisions are being made on the cells represented by the playback signal. The video tape signal includes ANNOTATION information so that when it is used to form the recorder monitor display (FIG. 28), the operator can view the previously scanned cell together with the previously determined ANNOTATION at the same time that the cell signal is fed to the data processor. The video tape recorder is of the type in which the same field can be played continuously; therefore, a stationary display can be made to appear on the recorder monitor and the same cell scan information will be fed to the data processor for many repeated fields. In the event the data processor has malfunctioned, it is possible to check individual circuits in the data processor to determine the source of the malfunction.

As described above, with switch 297*a* connected to terminal 297*c* rather than to terminal 297*b*, a digitized PROCESSOR VIDEO signal is applied to the input of video recorder summer 294. This digitized signal corresponds to the PROCESSOR VIDEO signal, but at any instant in time has a discrete amplitude of only one of three possible values (in addition to the quiescent background value).

Three threshold levels are utilized to derive the digitized PROCESSOR VIDEO signal. Referring to FIG. 9, two of these levels, $V_{cyto}$ and $V_{nuc}$, have already been described. The third level, $V_{mid}$, is somewhere between the other two levels. The PROCESSOR VIDEO signal on conductor 52 is applied to the plus input of comparator 316 on FIG. 16. The minus input of the comparator is connected to potentiometer tap 315 whose potential is held at $V_{mid}$. The output of the comparator goes high to energize the MID-CHORD input of converter 319 whenever the PROCESSOR VIDEO signal exceeds the $V_{mid}$ threshold.

The other two inputs to the converter are CYTO-CHORD conductor 204 and NUC-CHORD conductor 209. The digital-to-analog converter energizes its output conductor 320 with one of four possible potentials. A ground potential corresponds to the $V_{cyto}$ level not being exceeded, i.e., the absence of a cell in the quartz capillary tube. The first non-zero level corresponds to only the $V_{cyto}$ level being exceeded and only the CYTO-CHORD conductor being energized. This level results in a gray display on the recorder monitor and is depicted by the vertical hatching on FIG. 28. The second level corresponds to the $V_{mid}$ threshold being exceeded as well as the $V_{cyto}$ threshold, and is generated by the converter when both the CYTO-CHORD and MID-CHORD inputs are high. This level results in a gray-black display and is symbolized on FIG. 28 by the cross-hatching. Finally, if all three thresholds are exceeded, all three inputs to the digital-to-analog converter will be energized, the converter output potential will be at a maximum and will cause a dark display on the monitor, as shown in the center of the nucleus of cell 4 on FIG. 28.

The data processor performs five tests for non-normality on each cell. The first of these is "nuclear diameter". A well-known morphological criterion for cellular non-normality is the examination for enlarged nuclei. Each NUC-CHORD pulse on conductor 209 is extended to the input of integrator 270 on FIG. 12. The inverted VIDEO WINDOW pulse on conductor 285 is extended to the "dump" input of the integrator. The positive step at the end of each inverted VIDEO WINDOW pulse resets the integrator and its output returns to ground. The output remains at ground level until the start of the next inverted VIDEO WINDOW pulse. At this time the dump input of the integrator is disabled, and the integrator output is allowed to rise linearly for as long as the NUC-CHORD pulse appears at the integrator input.

The NUC-CHORD pulse, referring back to FIG. 9, has a width dependent upon the size of the nucleus in each line scan, that is, the NUC-CHORD pulse is high during each line scan for as long as the PROCESSOR VIDEO signal exceeds the $V_{nuc}$ threshold. The output of the integrator is connected to the pulse input of comparator 271. The minus input of the comparator is connected to potentiometer tap 272 whose setting determines the non-normal nuclear diameter threshold. The output of the comparator is low as long as the potential at the plus input does not exceed the potential on potentiometer tap 272. During most line sweeps the output of the comparator remains low. However, if there is at least one NUC-CHORD pulse during the scan of a cell which causes the output of comparator 271 to go high, flip-flop 274 is set in the 1 state. Initially, the flip-flop is reset by the CELL RESET pulse on conductor 230 at the end of each cell scan. During the scan of the cell, the flip-flop can be set in the 1 state only if the nuclear diameter test is failed during any line scan. The Q output of flip-flop 274 is extended to one input of AND gate 275. The second input of the gate is connected to CELL SAMPLE conductor 229 which is energized at the end of the cell scan. Thus if any cell fails the nuclear diameter test, NON-NORMAL NUCLEAR DIAMETER conductor 276 goes high with the generation of the CELL SAMPLE pulse at the end of the cell scan.

A second indicator of possible cell non-normality lies in the fact that malignant cells often have less cytoplasm than normal cells. This shrinkage of cytoplasm is usually accompanied by an enlargement of the nucleus, but inasmuch as it is a distinct phenomenon it is deemed desirable to electronically detect this condition.

The widths of the two pulses in each C·$\overline{\text{N}}$-CHORD waveform (see FIG. 9) are a measure of the dimensions of the cytoplasm regions ("shoulders") on either side of the nucleus. The C·$\overline{\text{N}}$-CHORD signal is applied to the input of integrator 337 on FIG. 13. The X-RESET pulse on conductor 114 grounds the output of the integrator prior to the generation of each X-SWEEP waveform. The plus input of comparator 343 is connected to potentiometer tap 339. During each line scan, whenever the C·$\overline{\text{N}}$-CHORD conductor 211 is high, the integrator output increases in the form of a ramp. (During the first pulse in each C·$\overline{\text{N}}$-CHORD pair, the integrator output increases in the form of a ramp, the output voltage then remains constant while the nucleus of the cell is being scanned, and then the output continues to increase in the form of a ramp during the second pulse in the C·$\overline{\text{N}}$-CHORD pair.) As long as the plus input of the comparator has a potential applied to it which is greater than the potential at the output of the integrator, the output of the comparator is high. It is only if there is sufficient cytoplasm on the two sides of the nucleus that the output of the integrator rises high enough to the point where the comparator output is driven low.

There are two important considerations that must be borne in mind with regard to the "insufficient cyto shoulders" test. In the first place, it is the measurement of the cytoplasm thickness in the vicinity of the nucleus that is of interest, not the cytoplasm above or below the nucleus. On a scan which intercepts cytoplasmic material but no nuclear material, it is meaningless to speak of cytoplasm shoulders. Therefore, although integrations and comparisons are made on every line scan, the result of any comparison is inhibited from registering a non-normal cytoplasm shoulders condition unless a NUC-CHORD pulse is generated during the same line scan, indicating that the line scan is through the nucleus. Each X-RESET pulse on conductor 114 resets flip-flop 336. The Q output of the flip-flop goes low, and disables gate 340. It is the operation of this gate which results in an indication of insufficient cytoplasm shoulders. Thus ordinarily the condition is not indicated even if the output of comparator 343 remains high (to indicate that the integrator output did not grow sufficiently with the application of the C·N-CHORD waveform) when the test result is sampled. But if the line scan is through the nucleus of a cell, the NUC-CHORD pulse on conductor 209 sets flip-flop 336 in the 1 state. In this case the Q output of the flip-flop goes high to enable the test via AND gate 340.

The second consideration of importance in the shoulders test is that the output of comparator 343 is ordinarily high. The output of the comparator is initially high because with the generation of each X-RESET pulse the output of integrator 337 goes low. Thus at the very beginning of every line scan the output of comparator 343 is high. The output of the integrator increases during the line scan as the C·N̄-CHORD waveform is applied to its input. The cell is normal, insofar as this test is concerned, if the integrator output exceeds the "insufficient cyto shoulders threshold" potential on potentiometer tap 339 by the time the C·N̄-CHORD pulse pair has terminated. Thus it is not until towards the end of the scan that the output of comparator 343 goes low even for a normal cell. For this reason the output of the comparator should not be sampled until the end of each scan line.

The output of the comparator is sampled at the end of each scan line by utilizing the X-SAMPLE pulse which occurs at the beginning of the next scan. This pulse on conductor 113 is applied to the third input of AND gate 340. It is generated before the X-RESET pulse which is applied to the dump input of integrator 337. Thus at the beginning of each line scan, with the generation of the X-SAMPLE pulse, the output level of integrator 337 will still be at its maximum level and will be proportional to the combined width of the cytoplasmic material on either side of the nucleus during any line scan, and correspondingly the output of comparator 343 will still be high whenever the integrator output does not exceed the insufficient cytoplasm shoulders criterion. With the application of the X-SAMPLE pulse to one input of AND gate 340, together with the energization of the gate input connected to the Q output of flip-flop 336 verifying that a NUC-CHORD pulse was generated on that scan, the output of the gate goes high during X-SAMPLE pulse time, indicating that the cytoplasm shoulders test was failed by the cell.

At the end of the examination of each cell, the CELL RESET pulse on conductor 230 resets flip-flop 341. If after any line scan of the next cell, the output of AND gate 340 goes high, flip-flop 341 is set in the 1 state and the Q output goes high to energize one input of AND gate 342. At the end of the scan of the cell, the CELL SAMPLE pulse is generated on conductor 229 and is applied to the second input of gate 342. If at least one line scan through the cell resulted in a C·N̄-CHORD double-pulse with a total width less than the pre-set threshold level and a nucleus was detected on that line, NON-NORMAL CYTO SHOULDERS conductor 334 goes high during CELL SAMPLE time to indicate this particular non-normal characteristic of the cell.

As mentioned above, two indicators of cell non-normality lie in the fact that malignant cells manifest both an enlarged nucleus and shrunken cytoplasm. But it is possible that the nuclear diameter of a particular non-normal cell is just less than that which would result in the generation of a NON-NORMAL NUCLEAR DIAMETER pulse on conductor 276 and that the width of the cytoplasmic material on either side of the nucleus is just large enough to prevent the generation of a NON-NORMAL CYTO SHOULDERS pulse on conductor 334. For this reason an additional test is performed in which the ratio of the volume of the nucleus to the volume of the overall cell is formed and compared to a pre-set threshold. If this ratio exceeds the established threshold, it is taken as an indication that the cell is non-normal. The test is referred to as the N/C (nucleus/cell) ratio test, and the circuitry for performing it is shown on FIG. 14. (It is also possible to use a nucleus/cytoplasm ratio in this kind of test, the cytoplasm volume being the overall volume less the nucleus volume.)

Assuming sphericity, the volume of the nucleus is proportional to the cube of its diameter and can thus be determined by cubing the width of the longest NUC-CHORD pulse, the pulse arising from a line scan through the center of the nucleus. Similarly, the volume of the cell is proportional to the cube of the longest CYTO-CHORD pulse which is generated during the same line scan. The logarithm of the volume ratio is approximately equal to three times the logarithm of the largest nucleus diameter minus three times the logarithm of the largest cell diameter. A voltage proportional to this difference of logarithms is formed by the data processor and compared to a threshold level. The threshold level corresponds to the logarithm of the maximum acceptable nucleus/cell volume ratio for a normal cell.

The X-RESET pulse on conductor 114 is applied to the dump input of each of integrators 381 and 382, and the outputs of these integrators go to ground at the beginning of each line scan. The CYTO-CHORD pulse is applied to the input of integrator 381 and thus during each line scan the output of integrator 381 increases in the form of a ramp with the maximum potential reached during each scan being proportional to the width of the CYTO-CHORD pulse. Similarly, the NUC-CHORD pulse is applied to the input of integrator 382 whose output also increases in the form of a ramp; the maximum potential of the output of integrator 382 is a measure of the NUC-CHORD pulse width.

The output of integrator 381 is fed to the input of logarithmic amplifier 383. The output of logarithmic amplifier 383 is proportional to the logarith of the output of integrator 381. Similarly, the output of integrator 382 is fed to the input of logarithmic amplifier 384, whose output is proportional to the logarithm of the integrator signal. The two logarithmic amplifier outputs are extended to the two inputs of subtraction circuit 385, whose output is proportional to the voltage difference between the output of amplifier 383 and the output of amplifier 384. The output of subtraction circuit 385 is thus proportional to the logarithm of the ratio of the integrator outputs, which ratio is in turn the desired volume ratio.

The output of subtraction circuit 385 is connected to the plus input of comparator 386. The minus input of the comparator is connected to potentiometer tap 388 whose potential is set to the non-normal N/C ratio threshold. The output of the comparator is ordinarily low, and goes high only if the N/C ratio exceeds the pre-set threshold.

As in the case of the insufficient cytoplasm shoulders logic, concern must be given to the possibility of having a non-normal indication somewhere along the measurement, but not necessarily at the end of it. Consider a single line scan through the center of the cell. At the start of the scan only the CYTO-CHORD pulse is generated and consequently the output of subtraction circuit 385 will be below the threshold level. The output of integrator 382 rises in the form of a ramp. When the scan enters the nucleus and the NUC-CHORD pulse is generated, the output of integrator 381 starts to rise rapidly in the form of a voltage ramp, as the output of integrator 382 continues to rise in the same fashion. At the end of the scan of the nucleus, even in the case of a normal cell, the output of subtraction circuit 385 will very likely be greater than the threshold voltage because the second cytoplasm shoulder has not yet been scanned and the output of integrator 381 has not yet risen to its maximum value even though the output of integrator 382 has reached its final peak value. It is only at the end of the line scan of any cell that the ratio test should be performed, because it is only at the end of the line scan that the desired ratio has meaning. For this reason, the ratio test is not evaluated until the end of each line scan.

The output of comparator 386 is fed to one input of AND gate 389. The X-SAMPLE on conductor 113 is connected to a second input of the gate. The X-SAMPLE pulse is generated at the end of each line scan or, more precisely, at the beginning of the next line scan. The integrator outputs are still high at this point because the information they represent is not dumped until the generation of the X-RESET pulse which occurs after the X-SAMPLE pulse. Thus, at the beginning of each line scan with the generation of the X-SAMPLE pulse, AND gate 389 energizes its output if the output of comparator 386 is high, that is, if the N/C ratio analog voltage at the plus input of comparator 386 exceeds the pre-set threshold.

At the end of the scan of every cell, the pulse on CELL RESET conductor 230, connected to the reset input of flip-flop 391, sets the flip-flop in the 0 state. If during any line scan of the next cell AND gate 389 operates, the flip-flop switches to the 1 state and the Q output goes high. The Q output is coupled to one input of AND gate 392, the other input to which is connected to CELL SAMPLE conductor 229. At the end of the complete cell scan, with the generation of the CELL SAMPLE pulse, NON-NORMAL N/C RATIO conductor 380 goes high to indicate that the cell just scanned has a nucleus-cell volume ratio which exceeds the maximum ratio for a normal cell. As in the case of the first two tests described above, the non-normal condition is indicated during CELL SAMPLE pulse time if at least one line scan causes a non-normal condition to be registered. In the case of the ratio test, as in the diameter and shoulder tests, only scans through the nucleus can result in the registering of a non-normal condition; if a CYTO-CHORD pulse is generated without a NUC-CHORD pulse, the output of subtraction circuit 385 cannot possibly exceed the preset threshold (the volume ratio is 0 in this case).

The fourth test which is performed concerns the shape of a cell. Consider any line scan through the nucleus of the idealized cell shown on FIG. 9. The line results in the generation of a C.$\overline{N}$-CHORD signal which, if the nucleus is exactly centered in the cell, has two equal-width pulses. In an actual cell, the nucleus is rarely centered and one of the two pulses in the C.$\overline{N}$-CHORD waveform of even a normal cell will be wider than the other. What is not normal, however, is for one of the pulses to be wider than the other during one line scan, and the opposite condition to be true for another line scan. In such a case the cell has an irregular shape; this condition generally arises in the case of a non-normal cell whose outer contour is not smooth.

In the shape test, the widths of the two pulses in the C.$\overline{N}$-CHORD waveform generated during each line scan are designated A and B. Referring to FIG. 9, the A pulse corresponds to the cytoplasm shoulder to the left of the nucleus and the B pulse corresponds to the cytoplasm shoulder to the right of the nucleus. The cell is considered normal, insofar as the shape test is concerned, if for every line scan passing through the nucleus the A pulse is wider than the B pulse, or the B pulse is wider than the A pulse. However, if for at least one line scan through the nucleus of a cell, A is greater than B, and for at least one line scan through the nucleus of the same cell, B is greater than A, the cell is considered to have failed the shape test. Actually, some margin must be allowed; even in a normal cell there may be slightly variations and in some line scans A may be slightly greater than B and in others B may be slightly greater than A. In the implementation of the shape test, a record is made if $B > A + \Delta$ on at least one line scan, and another record is made if $A > B + \Delta$ on at least one other line scan. The "margin" factor $\Delta$ is sufficient to prevent the registering of both inequalities in a normal cell. In a non-normal cell whose shape if far from symmetrical, however, the test results in the registering of both inequalities during scans of the nuclear region, and the registering of both inequalities within the same cell results in the energization of NON-NORMAL SHAPE conductor 480 (FIG. 17) during CELL SAMPLE pulse time.

At the beginning of each line scan, the X-RESET pulse on conductor 114 resets flip-flops 482 and 485 on FIG. 17, and causes the outputs of integrators 486 and 487 to go to ground. In the usual case, integrator 487 is associated with the leftmost (A) shoulder pulse of each pair in the C.$\overline{N}$-CHORD waveform, and integrator 486 is associated with the right-most (B) shoulder pulse in each pair. With flip flop 482 in the 0 state, the $\overline{Q}$ output is high and enables one input of gate 484. The second input of the gate is connected to the output of gate 481. One input to gate 481 is connected to 3-CHORD INHIBIT conductor 488, which as will be described below is ordinarily high. The C.$\overline{N}$-CHORD signal on conductor 211 is applied to the second input of gate 481 and the output of the gate thus ordinarily follows the C.$\overline{N}$-CHORD signal.

As pulse A in each C.$\overline{N}$-CHORD waveform is being transmitted through gates 481 and 484, it is applied to the input of integrator 487. The output of the integrator increases in the form of a ramp and the peak output is achieved at the termination of the A pulse. The peak output is thus proportional to the width of the first cytoplasm shoulder (the A pulse).

At the termination of the pulse, the negative step at the output of AND gate 481, coupled to the toggle input of the flip-flop 482, causes the flip-flop to change state. The $\overline{Q}$ output goes low and gate 484 is no longer enabled. Instead, the Q output goes high to enable one input of AND gate 483. When the B pulse in the C.$\overline{N}$-CHORD waveform is transmitted through AND gate 481, it is now passed through gate 483 to the input of integrator 486. The output of this integrator now increases in the form of a ramp with the peak output being achieved at the termination of the second cytoplasm shoulder, or B pulse.

Potentiometer tap 497 is adjusted until its potential is equivalent to the margin factor $\Delta$ referred to above. This potential is applied to one input of each of summers 498 and 499. The second input to summer 498 is connected to the output of integrator 486, and consequently the output of summer 498 represents the quantity B + Δ. The signal is applied to the minus input of comparator 490. The plus input of this comparator is connected to the output of integrator 487. The output of comparator 490 goes high only if A > B + Δ. The output of the comparator is coupled to one input of AND gate 492. One of the other inputs is connected to X-SAMPLE conductor 113. Neglecting the other two inputs to the gate for a moment, it is seen that the output of gate 492 goes high at the end of each line scan (more precisely at the beginning of the next line scan with the generation of the X-SAMPLE pulse) if the inequality $A > B + \Delta$ is satisfied at this time.

The CELL RESET conductor 230 is coupled to the reset input of flip-flop 494. At the end of the scan of any cell the flip-flop is reset in the 0 state and the Q output goes low. If during any line scan of the next cell the inequality $A > B + \Delta$ is satisfied, the flip-flop is set in the 1 state and output Q goes high.

The output of integrator 487 is similarly extended to the second input of summer 499. Consequently, the output of summer 499 is a measure of the quantity $a +$ Δ. The output of summer 499 is connected to the minus input of comparator 489, the positive input of the comparator being connected to the output of integrator 486. The output of the comparator goes high only if the potential of the plus input exceeds the potential of the minus input, that is, if the inequality $B > A + \Delta$ is satisfied. The output of comparator 489 is coupled to one input of gate 491 and X-SAMPLE pulse conductor 113 is connected to a second input of the gate. Neglecting the other two inputs for the moment, the output of gate 491 goes high with the generation of each X-SAMPLE pulse following a line scan if the width of the B pulse in any C.N̄-CHORD waveform exceeds the width of the A pulse by the margin factor Δ. The CELL RESET pulse on conductor 230 at the end of the scan of the previous cell resets flip-flop 493 in the 0 state. If, at the end of any line scan of the present cell, AND gate 491 operates, flip-flop 493 is set in the 1 state with the Q output going high.

The Q outputs of both flip-flops 493 and 494 are coupled to two inputs of AND gate 495. The third input to the gate is connected to CELL SAMPLE conductor 229. When the CELL SAMPLE pulse is generated at the end of the scan of any cell, AND gate 495 operates only if both inequalities have been satisfied during the course of the cell scan. The NON-NORMAL SHAPE conductor 480 is thus energized during this time to indicate that the shape test has been failed by the cell. Immediately after the generation of the CELL SAMPLE pulse, the CELL RESET pulse is generated to reset flip-flops 493 and 494 in the 0 states preparatory to the scan of the next cell.

The other two inputs to each of gates 491 and 492 are provided to inhibit the operations of the gates in the event either of two conditions is detected, which conditions should not be registered as representative of either inequality. FIG. 17*a* shows two cells 501 and 503 following each other closely through the capillary tube. Line 505 represents a line scan. This line scan actually results in the generation of a C.N̄-CHORD signal of the type shown in FIG. 9. Even though the scan does not pass through the nucleus of either cell, a CYTO-CHORD pulse is generated as the scan proceeds through cell 501, the pulse then terminates as the region between the two cells is scanned, and another CYTO-CHORD pulse is generated as cell 503 is scanned. Even though a NUC-CHORD pulse is not generated, the resulting C.N̄-CHORD signal on conductor 211 is indistinguishable from that which would ordinarily result from a scan through the nucleus of a single cell. It is also apparent that with the cells moving in a direction toward the top of FIG. 17*a*, the widths of the CYTO-CHORD pulses at the tail end of cell 501 decrease in successive line scans, while the widths of the CYTO-CHORD pulses generated at the leading edge of cell 503 increases in successive line scans. Thus while both cells are being scanned together, during the first few scans the A pulses may be wider than the B pulses while in the last few scans the B pulses will be wider than the A pulses. This would result in the setting of both of flip-flops 493 and 494 in the 1 state with the generation of a NON-NORMAL SHAPE pulse on conductor 480, even though such a decision is not called for in view of the fact that tht line scans which control the registrations of both inequalities do not even pass through the nucleus of the cells (which is the only time the "shape" test has any significance).

Figure 13:
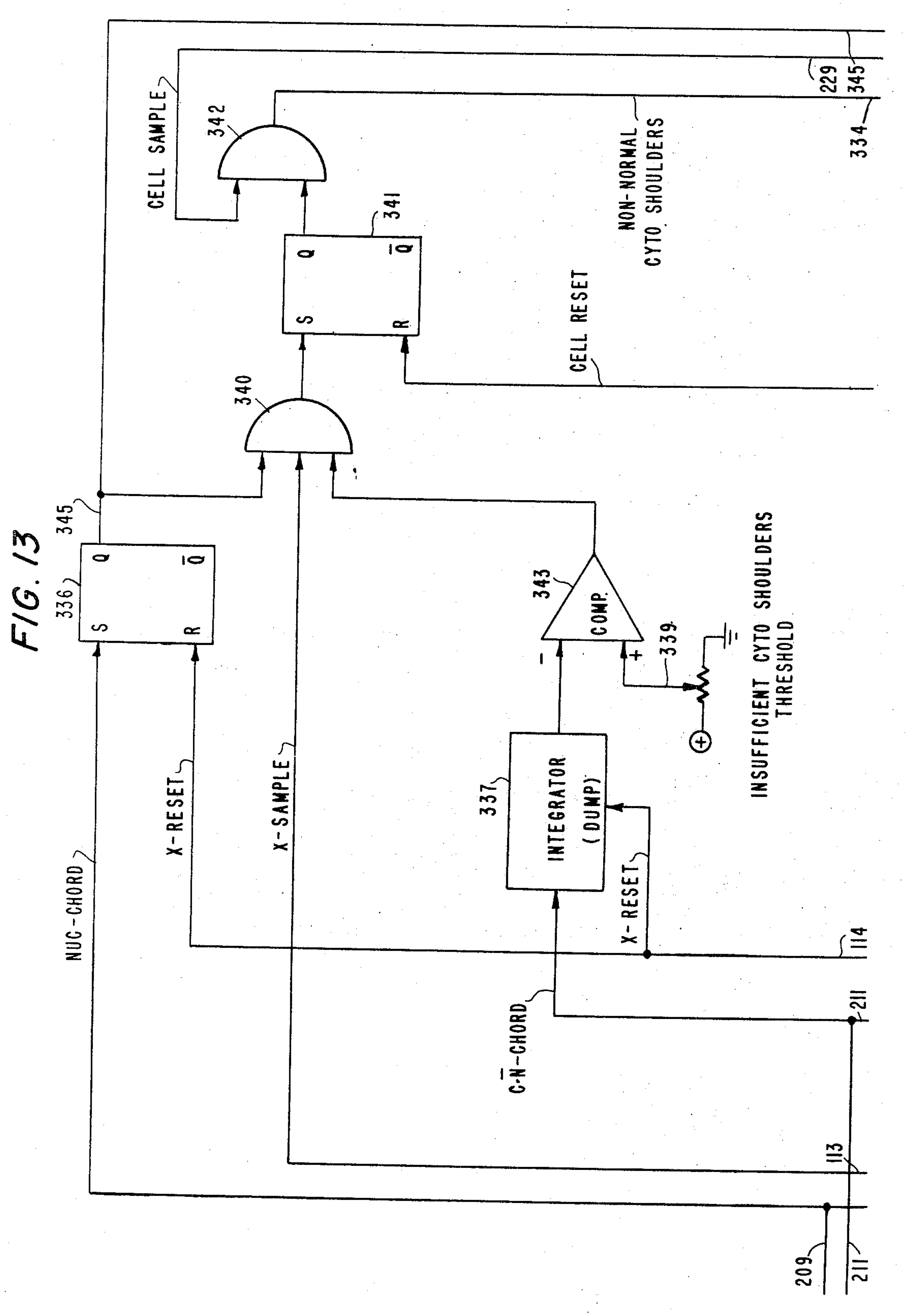
Figure 14:
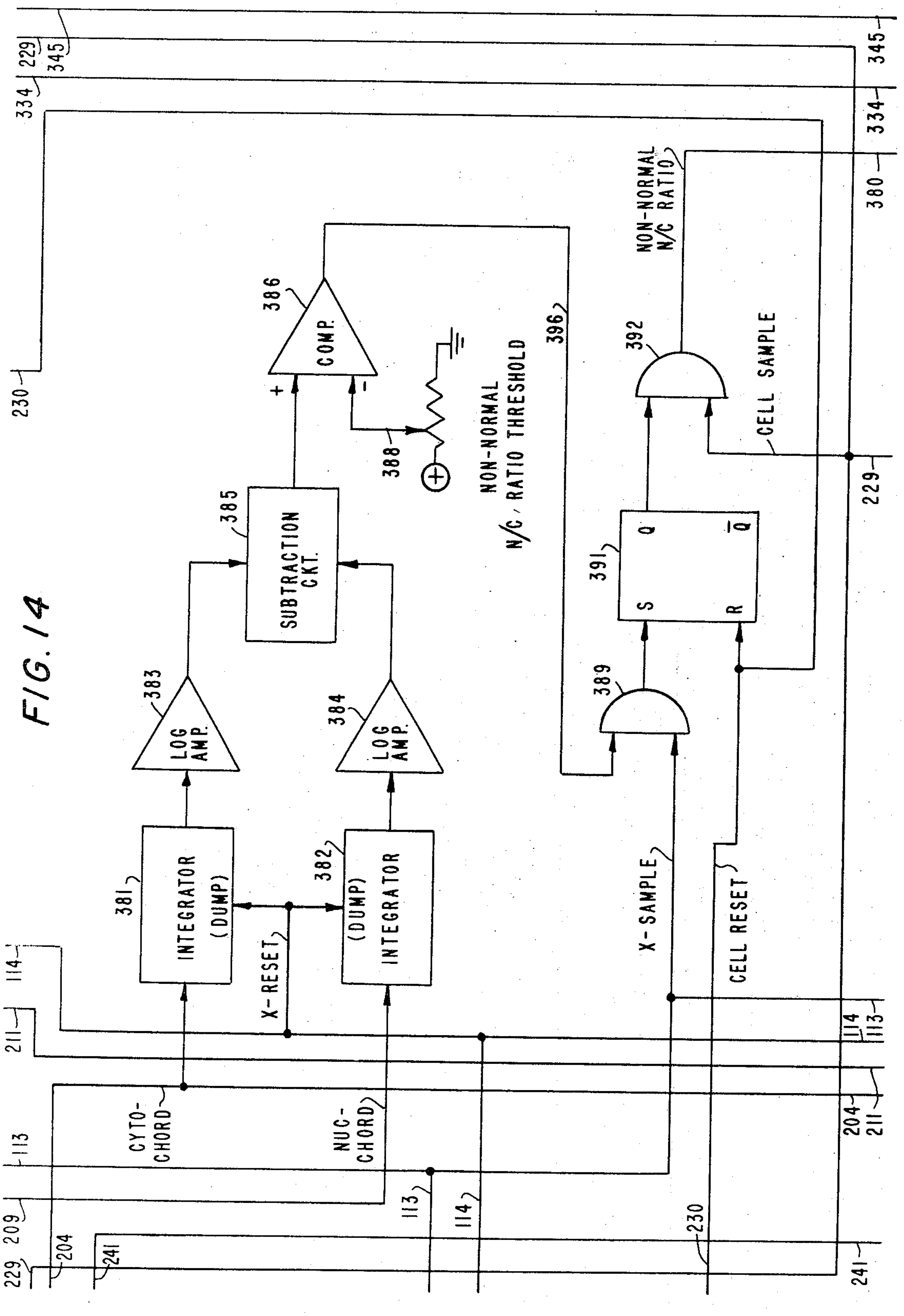

For this reason, one input of each of gates 491 and 492 is extended along conductor 345 to the Q output of flip-flop 336 on FIG. 13. It will be recalled that this flip-flop is set in the 0 state at the beginning of each line scan with the generation of the X-RESET pulse. The flip-flop is set in the 1 state with the Q output going high only if a NUC-CHORD pulse is generated. Consequently, at the end of each line scan, when the X-SAMPLE pulse is generated and applied to one input of each of gates 491 and 492, one of the gates may operate depending on which of comparators 489 and 490 has a high output — but only if conductor 345 is high at the same time. And this is possible only if the line scan included the nucleus of a cell because it is only in this case that the NUC-CHORD pulse was generated and the Q output of flip-flop 336 is high.

The fourth input to each of gates 491 and 492 is provided to prevent the setting of either of flip-flops 493 and 494 in the 1 state in the event another anomalous condition occurs. This condition is also shown in FIG. 17A by cellular material 502 flowing adjacent to cell 503. This cellular material may be a fragment of a cell or even a white blood cell. When a line scan is taken through the nucleus of normal cell 503, but toward the upper part of the nucleus where it does not also pass through fragment 502, it is possible that pulse B will be wider than pulse A, that is, there may be more cytoplasm to the right of the nucleus than to the left of the nucleus, and flip-flop 493 would be set in the 1 state. When a line scan is next taken through the lower part of the nucleus, where the scan also passes through fragment 502, the C.N̄-CHORD waveform actually consists of three pulses, one corresponding to fragment 502, and the second and third corresponding to the "true" C.N̄-CHORD signal for a scan through the cell.

Each negative step at the output of AND gate 481 toggles flip-flop 482. The first pulse in the C.N̄-CHORD waveform (corresponding to the fragment) is extended to the input of integrator 487, the second (A) pulse is extended to the input of integrator 486, and the third (B) pulse is extended to the input of integrator 487 once again. (This is an exception to the usual case where integrators A and B are associated with the left and right cytoplasm shoulders respectively.) The output of integrator 487 at the end of the line scan 506 is proportional to the width of the B pulse plus the width of the fragment, while the output of integrator 486 is proportional to the width of the A pulse. Since in the example under consideration the B pulse is wider than the A pulse, flip-flop 494 would be set in the 1 state. The effect of fragment 502 is to switch the applications of the A and B pulses to the two integrators. This would result in the energization of NON-NORMAL SHAPE conductor 480 with the generation of the CELL SAMPLE pulse, and should be inhibited so that a non-normal condition is not registered when it in fact does not exist.

Similarly, if fragment 502 is to the right of cell 503, even a normal cell might cause both of flip-flops 493 and 494 to be set. In this case, the A and B pulses are directed to the proper integrators, but the output of integrator 487 is boosted by the pulse due to the fragment. A line scan through the nucleus of cell 503 but above the fragment might set flip-flop 493, while a scan through both the nucleus and the fragment might set flip-flop 494.

For this reason, the second flip-flop 485 is incorporated in the design. If any three C.$\overline{N}$ pulses are generated during the course of a single line scan, the trailing edge of the first pulse toggles flip-flop 482 and the Q output goes high (a count of 1). The trailing edge of the second pulse again toggles flip-flop 482 and the Q output goes low. The negative step at the Q output of this flip-flop is applied to the toggle input of flip-flop 485 and consequently the Q output of flip-flop 485 goes high (a count of 2). The Q output of flip-flop 485 energizes one input of gate 496. Actually, this operation takes place even during the scan of a single cell without any associated cell fragments. However, when the Q output of flip-flop 485 goes high at the trailing edge of the second pulse in any two pulse C.$\overline{N}$-CHORD waveform, the Q output of flip-flop 482 goes low. Since this output is connected to the second input of gate 496, the inverted output of the gate in the ordinary case remains high. This conductor is extended to one input of AND gate 481 which is thus ordinarily energized so that the C.$\overline{N}$-CHORD signal can be extended through the gate. The 3 CHORD INHIBIT conductor is also extended to one input of each of gates 491 and 492 so that ordinarily these gates can operate when the X-SAMPLE pulse is generated.

However, if a third pulse occurs in the C.$\overline{N}$-CHORD signal during any line scan, the trailing edge of this pulse toggles flip-flop 482 for a third time. The Q output now goes high (a count of 3). Flip-flop 485 does not switch state because it does so only when the Q output of flip-flop 482 takes a negative step. Consequently, the Q outputs of both flip-flops 482 and 485 are high and both inputs of NAND gate 496 are thus energized. The 3-CHORD INHIBIT signal goes low to inhibit gates 481, 491 and 492. The latter two gates are disabled in order that neither of flip-flops 493 and 494 be set as a result of the line scan. Gate 481 is inhibited from further operation in order that both of flip-flops 482 and 485 remain "locked" in their 1 states until the start of the next X-RESET pulse. Were gate 481 allowed to continue to operate, it is possible that a noise spike or still another cell fragment might result in a fourth pulse which would toggle both flip-flops, cause the 3-CHORD INHIBIT conductor to go high once again, and permit the registering of information in one of flip-flops 493 or 494 which could readily result in the subsequent erroneous generation of a pulse on NON-NORMAL SHAPE conductor 480.

It should be noted that a similar safeguard is not provided for the three other tests described above (nor for the fifth test to be described next). With respect to the nuclear diameter test, the existence of (non-nuclear) cell fragments or white blood cells is of no concern because the test is based only on the width of each NUC-CHORD signal. With respect to the insufficient cytoplasm shoulders and ratio tests, the existence of cell fragments can result in erroneous logic decisions being made. However, this is unlikely because the cell fragments are generally small enough so as not to increase the effective cytoplasm dimensions of a non-normal cell enough to cause it to pass the shoulder and ratio tests. However, in the case of the shape test, a fragment, no matter how small, can cause the A and B pulses to be directed to the wrong integrators and thus cause the wrong one of flip-flops 493 and 494 to be set in the 1 state. The decision inhibiting circuitry has been added for this reason.

These remarks apply not only to cell fragments, but to noise as well. Noise in the C.$\overline{N}$-CHORD signal (arising originally from noise in the CYTO-CHORD or NUC-CHORD pulses) might result in an extra toggling of flip-flop 482 and a change in the relatively magnitudes of the outputs of comparators 489 and 490. The noise must be guarded against to a much greater extent in the case of the shape test than in the case of the other tests.

It should be noted that it would also be possible to generate a 3-pulse C.$\overline{N}$-CHORD waveform if cell 503 in FIG. 17A is moved up slightly relative to cell 501 such that line 505 passes through the nucleus of cell 500 rather than the upper part of the cytoplasm. In such a case, not only would the shape test be affected (without the provision of the 3CHORD INHIBIT circuit), but the other tests could be affected as well. For example, even if cell 503 has insufficient cytoplasm shoulders, the shoulders test might not result in the setting of flip-flop 341 on FIG. 13 with the generation of the X-SAMPLE pulse if the third pulse in the C.$\overline{N}$-CHORD waveform, arising from the scan of the tip of cell 501, causes the output of integrator 337 to increase beyond the shoulders threshold. However, it is extremely unlikely that two cells would overlap as they flow through the capillary tube to such an extent that the tip of the cytoplasm of one cell would be in line with the nucleus of the other. The bore of the capillary is small enough to restrain the flow of cells to a single file. In general, the worst case to be expected (with the exception of clumping—which is counted separately) is that in which two cells overlap as shown in FIG. 17A with a line extending through the tip of the cytoplasm of each cell, but not through the nucleus.

The fifth test which is performed by the data processor is based upon another morphological criterion frequently associated with non-normal cells and is a combination of two parameters. Cyto-technicians often characterize a cell as non-normal if it manifests both a somewhat darkened (when stained) nucleus and an enlarged nucleus. This combination of parameters quantitatively corresponds to the area of the PROCESSOR VIDEO signal on FIG. 9 above the $V_{nuc}$ level. The larger the nucleus, the wider and therefore larger the "peak nuclear area". The more dense the nucleus, the greater the amplitude of the PROCESSOR VIDEO signal and the larger the peak nuclear area.

Figure 16:
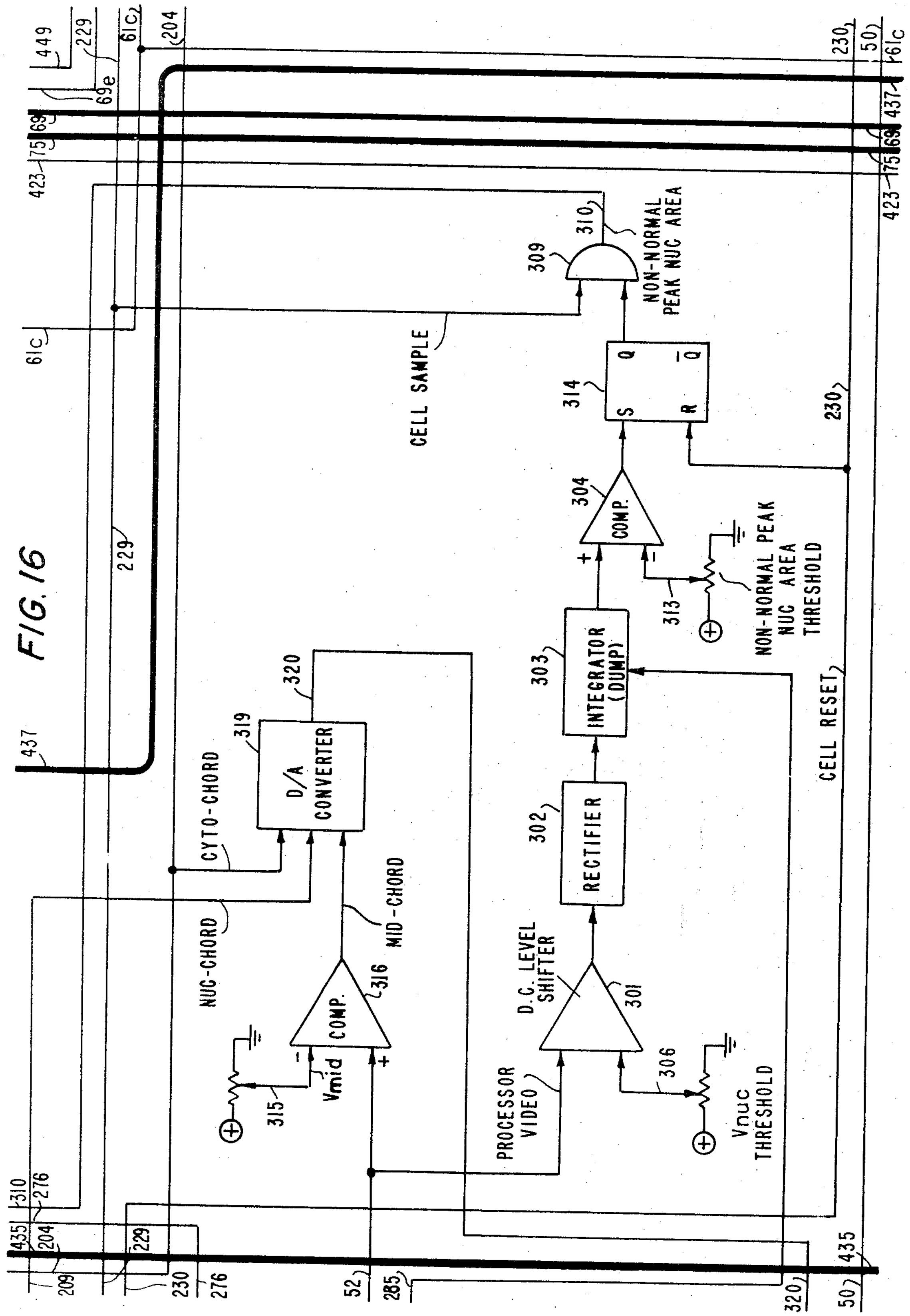

The PROCESSOR VIDEO signal is extended to one input of D.C. level shifter 301 on FIG. 16. The other input is connected to potentiometer tap 306 on which appears the $V_{nuc}$ threshold potential. The level shifter serves to derive an output signal which is the same as the PROCESSOR VIDEO signal but with the signal level shifted in the negative direction by $V_{nuc}$ volts. In effect, the $V_{nuc}$ line shown in FIG. 9 is shifted to ground potential, the $V_{cyto}$ level becomes negative and the original bright field level is shifted to a maximum negative potential. The output of the level shifter is extended to the input of rectifier 302. The rectifier passes only the positive part of the signal to the input of integrator 303. This positive signal corresponds to the signal above the $V_{nuc}$ threshold line in FIG. 9, with the $V_{nuc}$ line serving as the zero reference.

Referring back to FIG. 12, it will be recalled that the NUC-CHORD pulse on conductor 209 is applied to an input of integrator 170 with the inverted VIDEO WINDOW pulse being applied to the dump input of the integrator. Except during the VIDEO WINDOW pulse, the integrator output is at ground potential; during the VIDEO WINDOW interval the output of integrator 270 is allowed to rise linearly with a NUC-CHORD input. A similar arrangement is provided for the peak nuclear area test; the inverted VIDEO WINDOW pulse on conductor 285 is extended to the dump input of integrator 303. The output of the integrator is held at ground potential except during the VIDEO WINDOW pulse. However, in the case of integrator 303 the input is not a constant-level pulse. Consequently, the output does not rise linearly. Instead, the input is a signal which starts to rise from ground level, reaches a peak, and then returns to ground level. The output of the integrator is proportional to the area of the PROCESSOR VIDEO signal above the $V_{nuc}$ threshold.

The output of integrator 303 is coupled to the plus input of comparator 304. The minus input of the comparator is connected to potentiometer tap 313 whose potential is set to correspond to the non-normal peak nuclear area threshold. The output of the comparator is low unless the potential at the output of the integrator exceeds the threshold level.

With the generation of the CELL RESET pulse on conductor 230 at the end of the scan of any cell, flip-flop 314 is reset. During each line scan on which there is a nucleus detected, the output of integrator 303 increases to a maximum potential proportional to the area of the signal above the $V_{nuc}$ level. The output of the integrator then drops to ground prior to the next scan. If during any line scan the output of comparator 304 goes high to indicate that the peak nuclear area threshold has been exceeded, flip-flop 314 is set in the 1 state. The Q output goes high to energize one input of AND gate 309. The second input, connected to CELL SAMPLE conductor 229, is energized at the end of the scan of the cell. At this time, if flip-flop 314 is in the 1 state, NON-NORMAL PEAK NUC AREA conductor 310 goes high to indicate that the cell just scanned failed and fifth test. Immediately after the generation of the CELL SAMPLE pulse, the CELL RESET pulse is generated to reset flip-flop 314 prior to the scan of the next cell.

There are thus five separate conductors on which pulses may be generated at the CELL SAMPLE time to indicate respective non-normal characteristics of a cell. These conductors — 276 (excessive NUCLEAR DIAMETER), 334 (insufficient CYTO SHOULDERS), 380 (excessive N/C RATIO), 480 (irregular SHAPE), and 310 (excessive PEAK NUC AREA) — are extended to respective inputs of AND gates 410 through 414 on FIG. 15. As mentioned above, in some special cases it may not be desired to perform all five tests on the cells passing through the capillary tube. Instead, it may be desired to perform only a selected number of the tests. The second input to each of the AND gates is connected to one of switches 415 through 419. If any switch is open, as shown in the drawing, the second input of the respective gate is enabled and the gate operates to transmit a pulse to its output when pulsed by the respective data input conductor at CELL SAMPLE time. The output of each of the AND gates is extended to one of the inputs of OR gate 418. Consequently, the output of the OR gate on conductor 427 is energized at CELL SAMPLE time to indicate a non-normal cell if at least one of the operative tests has been failed by the cell.

Conductor 427 is connected to one input of AND gate 428. A second input to this gate, conductor 261, is connected to the $\overline{Q}$ output of flip-flop 257 on FIG. 11. As described above, this flip-flop is placed in the 0 state by each CELL RESET pulse with the $\overline{Q}$ output going high. The flip-flop is switched to the 1 state only if an ambiguous condition has been detected. In the absence of the detection of an ambiguous condition, the cell can be categorized as either normal or non-normal. The high potential on conductor 261 energizes the second input of gate 428. The third input to gate 428 is connected to the output of AND gate 422. As will be described below, the output of this gate is normally energized during CELL SAMPLE pulse time for any cell which has met the 3 CON-CHORD criterion. Thus during CELL SAMPLE pulse time AND gate 428 can operate to pulse conductor 69*a* and cause the non-normal cell count to be incremented whenever OR gate 418 operates.

Figure 11:
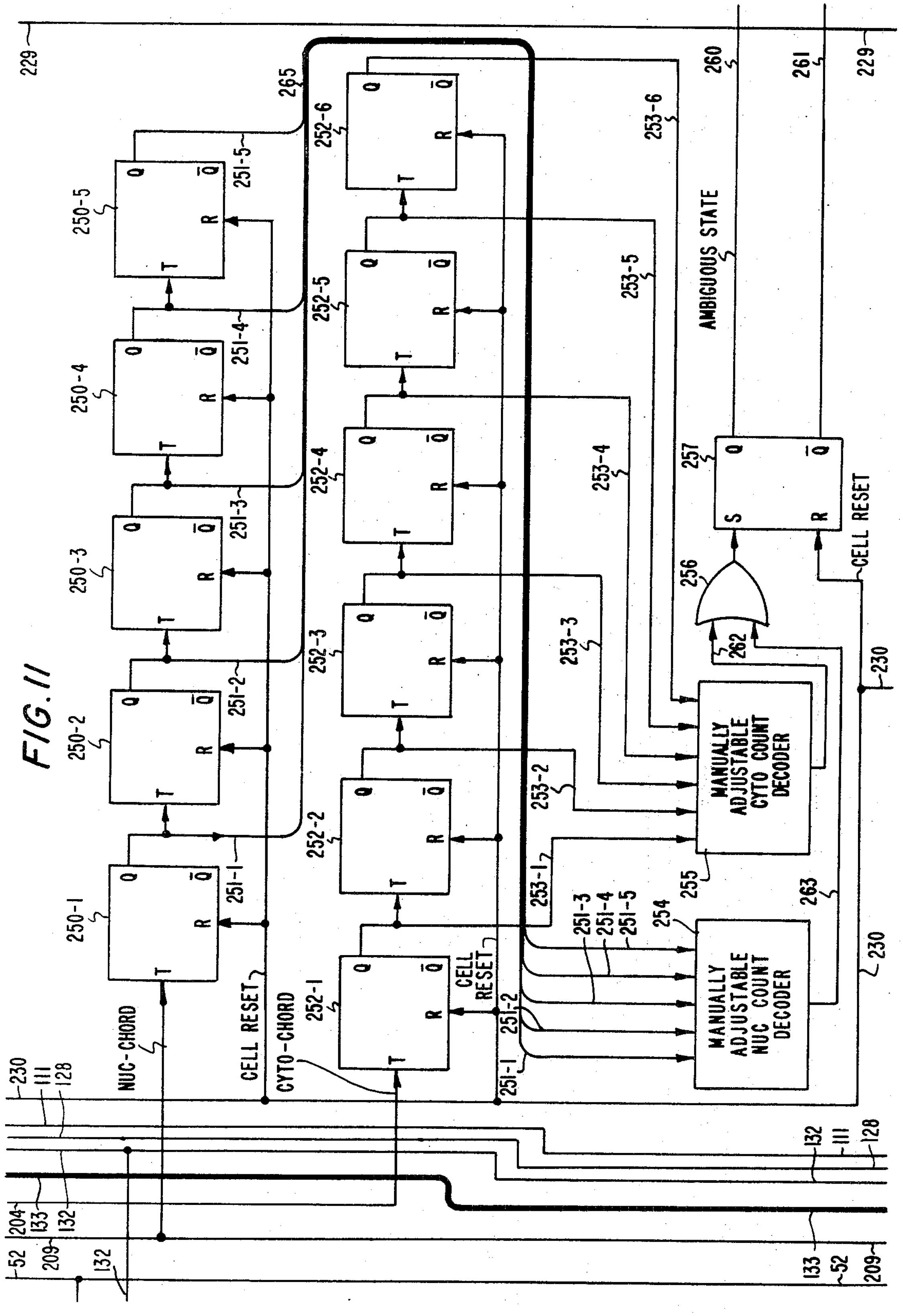

On the other hand, if flip-flop 257 on FIG. 11 is in the 1 state, AMBIGUOUS STATE conductor 260 is high to indicate that the cell cannot be categorized as normal or non-normal. Conductor 260 is connected to one input of AND gate 420 on FIG. 15. The other input of this gate is connected to the output of AND gate 422, and with the generation of the CELL SAMPLE pulse AMBIGUOUS conductor 69*b* will be pulsed to increment the ambiguous count whenever an ambiguous condition has been detected. It should be noted that at the same time the $\overline{Q}$ output of flip-flop 257 will be low, inhibiting a possible non-normal count to pass through gate 428.

The output of gate 422 is extended directly to CELL COUNT conductor 69*c*. The pulse on this conductor simply indicates that the counter which is keeping track of the total number of cells sampled should be incremented. The total number of normal cells equals the total cell count, less the ambiguous and non-normal counts.

When AND gate 422 operates, it does so during CELL SAMPLE pulse time. One input to gate 422 is connected to 3 CON-CHORDS conductor 241. Referring back to FIG. 10, it will be recalled that this conductor is pulsed when the CELL SAMPLE pulse is generated, provided that flip-flop 225 was previously set in the 1 state to indicate that three CYTO-CHORD pulses were detected on successive line scans during the scanning of the cell. The second input to gate 422 is conductor 61*c* which is connected to the output of 1-minute run timer 754 on FIG. 24. Samples from different persons are changed every 2 minutes; each sample is scanned and decisions are made and tallied during a 1-minute run interval. Conductor 61*c* is held at a high potential to enable the second input of gate 422 for only 1 minute out of every 2.

The third input to gate 422 is connected to the inverted output of OR gate 421. It is desired to stop the incrementing of the counters (FIG. 24) in the event the maximum count in any one of them has been reached before the 1-minute run interval has been concluded. Cables 75*a*, 75*b* and 75*c* are extended over cable 75 from non-normal counter 762, ambiguous counter 763 and cell counter 764. Each of these counters is incremented by a pulse on the respective one of conductors 69*a*, 69*b* and 69*c*. The total count in each of the counters is extended over a respective one of the cables 75 to an input of the respective one of decoders 424, 425, and 426 on FIG. 15. If the total number of cells represented in cell counter 764 equals the maximum permissible value as represented by the setting of maximum total cells decoder 426, the output of the decoder is energized to enable one input of NOR gate 421. Similar remarks apply to decoders 424 and 425. Normally all three inputs of the gate are disabled and the inverted output is high to energize gate 422. However, with the operation of decoder 424, 425 or 426, the output of the NOR gate goes low and gate 422 is disabled.

There are an additional two conductors extended over cable 69 to the circuits of FIG. 20 and FIG. 24. These conductors are HISTIOCYTE conductor 69*d* and LUNG SAMPLE conductor 69e. A pulse on conductor 69*d* indicates that the particular cell examined prior to the generation of the CELL SAMPLE pulse is a histiocyte. Conductor 69*d* can be pulsed only when a CELL SAMPLE pulse is generated, just as conductors 69*a*, 69*b* and 69*c* can be pulsed only when a CELL SAMPLE pulse is generated. Conductor 69*e*, although also relating to histiocytes, is not pulsed during the 1-minute run. However, if a minimum number of histiocytes are detected during the run — a sufficient number to indicate that the sample under test can be characterized as a lung sample — conductor 69*e* goes high at the end of the run and remains high until after the data acquisition system has recorded this fact.

The histiocyte detection circuit is shown on FIG. 18. The physiological function of histiocytes in the lungs is to trap the dirt in the air that gets through the nasal passages, and thus keep the lung sacs clear. As a result, histiocytes contain microscopic carbon particles in their cytoplasm. It is this feature which enables the data processor to detect the presence of histiocytes in cell samples. The output of AGC amplifier 154 on FIG. 8, the AGC-ed VISIBLE-VIDEO signal, is extended over conductor 50 to the plus input of comparator 440 on FIG. 18. The minus input of the comparator is connected to potentiometer tap 441, the potential on which represents the $V_h$ (histiocyte) threshold. The VISIBLE-VIDEO signal is ordinarily relatively small in magnitude since the visible wavelengths are absorbed only to a minor extent by cells flowing through the capillary tube. (The VISIBLE-VIDEOsignal is used, as described above, for noise cancellation purposes.) However, in the case of carbon-carrying histiocytes, the VISIBLE-VIDEO signal is large in magnitude and the plus input of comparator 440 exceeds the minus input in potential. Under these circumstances, the output of the comparator goes high to energize one input of AND gate 444.

The second input to the gate is connected to conductor 204 on which the CYTO-CHORD pulse appears. The AND gate operates only if a CYTO-CHORD pulse is generated while the output of comparator 440 is high. The reason for providing this second input to the gate is a safeguard — it is not enough that the VISIBLE-VIDEO signal exceed the $V_h$ threshold; it is also necessary that the CYTO-CHORD pulse be present to verify the presence of a cell before gate 444 operates.

Each CELL RESET pulse on conductor 230 resets flip-flop 446 in the 0 state. If AND gate 444 operates at any time during the scanning of the cell, the flip-flop switches to the 1 state. The Q output of the flip-flop goes high and is extended over conductor 449 to one input of gate 481 on FIG. 15. With the generation of the next CELL SAMPLE pulse on conductor 229, gate 481 operates to pulse HISTIOCYTE conductor 69*d.*

The Q output of flip-flop 446 is also extended to one input of gate 440. The other input to this gate is the inverted output of threshold histiocyte decoder 448. As long as the output of the decoder is low, the inverted input of gate 440 is high. Each time flip-flop 446 is set in the 1 state, the output of gate 440 goes high. Conductor 61*c* is connected to the reset input of counter 447. The positive step at the start of each 1-minute run resets the counter. Thereafter, each time the output of gate 440 goes high, the counter is incremented. The count in the counter is extended over cable 451 to decoder 448. The decoder is pre-set with the minimum number of histiocytes required before the sample can be characterized as a lung sample. As soon as the total count in the counter equals the threshold count, the output of decoder 448 goes high. The inverted input of gate 440 goes low and consequently gate 440 no longer operates to increment counter 447. The count remains at the maximum value and thus maintains the output of decoder 448 energized.

The output of the decoder is also extended to one input of gate 450. Conductor 61*c* is connected to the other input of gate 450 but the signal is inverted. The 1-minute run pulse on conductor 61*c* is positive and thus the inverted input is low. Consequently, the output of gate 450, conductor 61*e*, cannot be energized during the run. However, at the end of the run, the inverted input of gate 450 goes high. At this time, if the output of decoder 448 is high, both inputs of gate 450 are high and conductor 69*e* goes high to indicate to the data acquisition system of FIG. 24 that the sample can be characterized as a lung sample. Conductor 61*c* remains low in potential until the start of the next 1-minute run. At this time the positive step on conductor 61*c* resets histiocyte counter 447 and disables gate 450.

Figure 15:
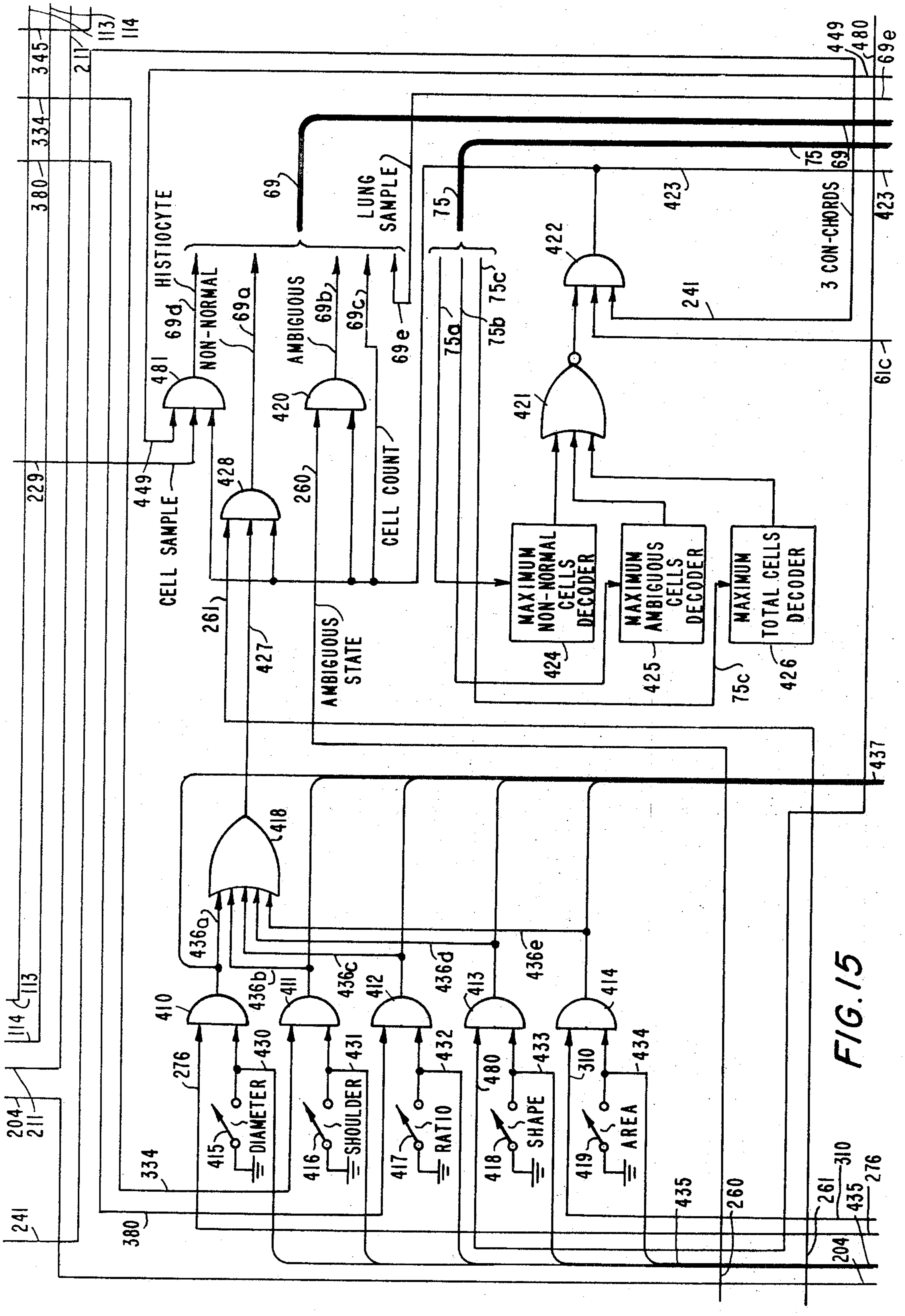

After a decision is made on each scanned cell — based upon the operation of the various gates on FIG. 15 — signals are formed on ANNOTATION conductor 600 which is connected to one input of each of microscope monitor summer 234 and video recorder summer 294 on FIG. 12. The purpose of the ANNOTATION signal is to produce the tabulated information in the display of FIG. 28. The circuitry for deriving the ANNOTATION signal is shown in FIGS. 19, 20 and 21.

Referring to FIG. 28, it will be seen that there are a number of vertical lines which are formed on the display. These lines are shown occuring at respective times $T_0$ and $T_a$–$T_h$. Each of time intervals $T_0$–$T_a$ and $T_a$–$T_b$ is 4.25 microseconds. The VIDEO WINDOW corresponds to 35 microseconds of each line scan, and each of the five intervals between times $T_c$ and $T_h$ is 2 microseconds. The total active time required to form each horizontal line of the display is 53.3 microseconds. This is equal to the width of each X-SWEEP ramp. The time $T_0$, the start of each sweep on the display, corresponds to the trailing edge of the X-RESET pulse, the start of active sweep time.

It will be recalled that the more positive the PROCESSOR VIDEO signal, the darker the corresponding display. Thus, positive signals correspond to dark regions of the display. In order to form the vertical lines shown in FIG. 28, it is necessary to generate narrow positive pulses during each line scan at the discrete times $T_0$ and $T_a$ through $T_h$.

Figure 19:
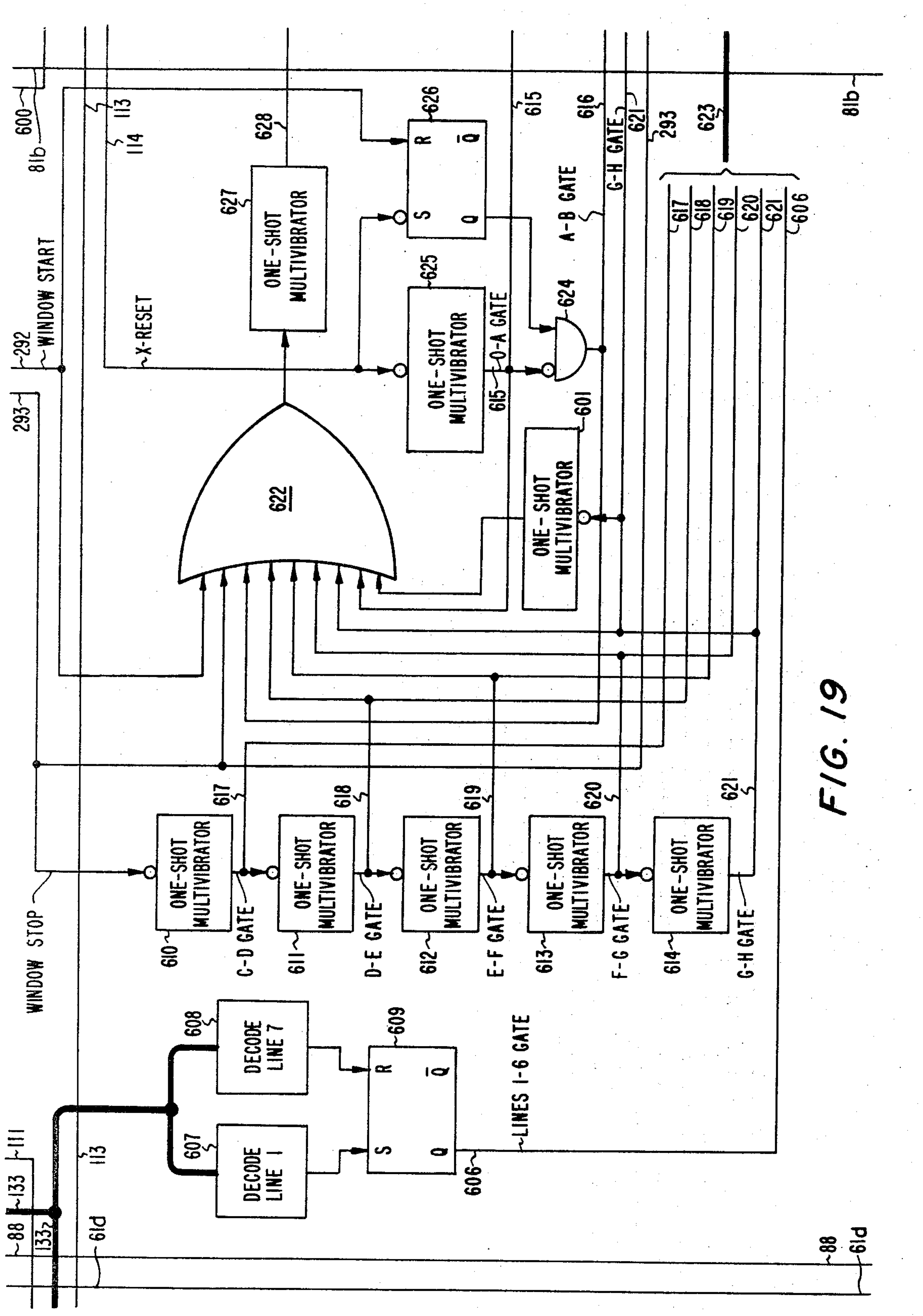

The X-RESET pulse on conductor 114 is applied to the set input of flip-flop 626 and the trigger input of one-shot multivibrator 625 on FIG. 19. Both the flip-flop and the multivibrator are triggered by positive steps but the X-RESET pulse is applied to each of their inputs through inverters. Consequently, it is at the termination of each X-RESET pulse that flip-flop 626 is switched to the 1 state and the O-A GATE conductor 615 goes high.

The positive step on conductor 615 is extended to one input of OR gate 622. The OR gate is provided with a plurality of A.C.- coupled inputs, each having a short time constant. Thus, any positive step at an input of the gate results in a positive spike at the output; in effect, each input is differentiated before application to the OR gate. Each spike at the output of the OR gate triggers one-shot multivibrator 627.

The reason for providing A.C.- coupled inputs to the OR gate is that it is necessary for each new pulse on an input of the OR gate to trigger multivibrator 627, and this requires that the OR gate output go low between the energizations of the different input conductors. By differentiating each input pulse, only a short positive spike appears at the output of the OR gate following each new pulse at one of its inputs.

The leading edge of the pulse on O-A GATE conductor 615 results in a positive spike at the output of OR gate 622 which thus triggers one-shot multivibrator 625 at time $T_0$. The period of multivibrator 627 is 0.2 microseconds, and thus at time $T_0$ a 0.2 microsecond pulse appears on conductor 628. The period of multivibrator 625 is 4.25 microseconds. At the end of this time interval the O-A GATE signal goes low. At this time both inputs of gate 624 become energized and the output of this gate, A-B GATE conductor 616, goes high. The output of the gate is coupled to a second input of OR gate 622, and the positive step applied to an input of the OR gate triggers multivibrator 627 so that a second 0.2 microsecond pulse corresponding to line $T_a$ in FIG. 28 is generated on conductor 628.

Referring back to FIG. 12, it will be recalled that the WINDOW START pulse on conductor 292 is generated at a time after the termination of the X-RESET pulse determined by the setting of potentiometer tap 279. The tap is adjusted to cause the pulse to be generated 8.50 microseconds after the X-RESET pulse terminates. The WINDOW START pulse is applied to the reset input of flip-flop 626 on FIG. 19 to cause the Q output of the flip-flop to go low. Gate 624 de-energizes, terminating the pulse on A-B GATE conductor 616. The vertical line in FIG. 28 at time $T_b$ corresponds to the WINDOW START pulse, and consequently this pulse on conductor 292 is applied to an input of OR gate 622 in order to directly trigger multivibrator 627 at the required time $T_b$.

The next pulse which must be generated on conductor 628 corresponds to the end of the VIDEO WINDOW, the pulse occurring at time $T_c$ as shown in FIG. 28. The WINDOW STOP pulse on conductor 293 occurs at this time (as determined by the setting of potentiometer tap 280 on FIG. 12) and is applied directly to one input of OR gate 622. The WINDOW STOP pulse is also applied to the input of one-shot multivibrator 610. Each of multivibrators 610–614 is triggered by a negative step applied to its inverting input and has a fixed output period of two microseconds. The output of multivibrator 610, C-D GATE conductor 617 thus goes high for 2 microseconds, starting at $T_c$. At the end of the 2-microsecond period, the negative trailing edge triggers multivibrator 611. The output of this multivibrator, D-E GATE conductor 618, goes high for 2 microseconds. The output conductor is connected to an input of OR gate 622, and the positive step at time $T_d$ triggers multivibrator 627 to generate a pulse on conductor 628. At the end of the 2-microsecond period, the D-E GATE conductor goes low and the trailing edge triggers multivibrator 612. Consequently conductor 619 goes high, allowing another positive step to be applied to OR gate 622 to trigger multivibrator 627 at time $T_e$.

In a similar manner multivibrators 613 and 614 generate F-G GATE and G-H GATE pulses on conductors 620 and 621, and the leading edge of each pulse causes a 0.2-microsecond pulse to be generated on conductor 628. It is still necessary to generate a pulse on conductor 628 corresponding to line $T_h$ on FIG. 28. At the trailing edge of the G-H GATE pulse, conductor 621 goes low. This conductor is applied to the inverting input of one-shot multivibrator 601 which is triggered by a negative step. The output of multivibrator 601 goes high and since it is connected to the last input of OR gate 622, the $T_h$ pulse is generated on conductor 628. The period of multivibrator 601 need not be 2 microseconds as in the case of multivibrators 610-614. Multivibrator 601 is used only to initiate the $T_h$ pulse after the G-H GATE pulse goes low.

The circuit just described serves to form nine 0.2-microsecond pulses during each line scan on conductor 628, which pulses, as will be described below, are inserted in the ANNOTATION signal on conductor 600 to control the generation of the vertical lines on the recorder and system monitor displays. Furthermore, various pulses derived by the circuit just described are used in connection with the circuits of FIGS. 20 and 21. These pulses are all positive and include the following: O-A GATE (on conductor 615), A-B GATE (on conductor 616), C-D GATE (on conductor 617), D-E GATE (on conductor 618), E-F GATE (on conductor 619), F-G GATE (on conductor 620) and G-H GATE (on conductor 621).

If switch 648, the annotation on-off switch, in FIG. 20 is open, as shown, one input to gate 447 is energized. All signals transmitted through OR gate 641 are then transmitted through AND gate 447 to ANNOTATION signal conductor 600. Conductor 628, the output of one-shot multivibrator 627, is extended to a first input of OR gate 641. Consequently, all nine of the 0.2-microsecond pulses whose derivation has just been described appear on the ANNOTATION signal conductor, 600.

Referring back to FIG. 28, it will be noted that in the upper right hand corner selected columns are blanked during the first six line scans in each raster in order to display the tests which have been put into effect. It is therefore necessary to identify the first six lines of each raster. Cable 133 in FIG. 5 is connected to the eight outputs of counter 124 and the information transmitted over the cable represents a binary encoding of the number of each line scan. Cable 133 is connected to the input of each of circuits 607 and 608 on FIG. 19. Circuit 607 functions to generate an output pulse whenever the line being scanned is line 1, that is the first line in each raster. The pulse at the output of circuit 607 sets flip-flop 609 in the 1 state and the Q output goes high. Circuit 608 functions to pulse its output and reset flip-flop 609 when the count represented by the information on cable 133 corresponds to the seventh line. Recalling that the count in counter 124 is incremented prior to the scan of each line (at the leading edge of X-SAMPLE time), it will be seen that circuit 608 resets flip-flop 609 prior to the generation of the seventh X-SWEEP signal. Consequently, LINES 1–6 GATE conductor 606 is high during the first six line scans in each raster.

Referring to FIG. 15, conductors 430–434 are connected to one input of respective AND gates 410–414. If the respective switch is open, the input to each gate is floating (a logical 1) as is the respective one of conductors 430–434. The conductors are extended along cable 435 to FIG. 21. Conductor 430 is connected to one input of AND gate 671, conductor 431 is connected to one input of AND gate 672, and similar remarks apply to conductors 432–434 and gates 673–675. Conductor 606 is connected to the second input of each of AND gates 671–675. If, for example, the diameter test is active, conductor 430 enables gate 671. During the first six lines of each raster, conductor 606 is high and energizes the second input of AND gate 671. However, the third input of the gate, connected to C-D GATE conductor 617, is high only between times $T_c$ and $T_d$ of each scan. Consequently, gate 671 operates only during the first six line scans while the first non-normal column of FIG. 28 is being scanned — provided the diameter test is in effect. The resulting pulse at the output of gate 671 is extended through OR gate 676 to conductor 681. This conductor is in turn connected to an input of OR gate 641. Consequently, if the diameter test is being performed, the top six lines of the diameter column in the display are darkened (not as shown in FIG. 28 since in the illustrative example the diameter test is not in effect).

Conductor 606, the LINES 1–6 GATE conductor, is connected to one input of each of gates 672–675. Another input to each of the gates is connected to a respective one of conductors 431–434 which enables the respective gate whenever the associated test is in effect. The third input to each gate is connected to one of conductors 618–621 to energize the gate only while the first six line scans of an active test are going through their respective column. The output of each of gates 672–675 is extended to one input of a respective one of OR gates 677–680. Respective output conductors 682–685 are extended to inputs of OR gate 641. It is apparent that this arrangement controls the coding at the top of each of the non-normal columns in accordance with the settings of switches 415–419 on FIG. 15, and the column assignments shown in the illustrative display of FIG. 28.

The rest of the information represented in the columns of the display also appears in bands having a height of six lines. The first line in any band can occur on any line of a raster after the first eight lines. The end-of-cell condition cannot be detected until after the first eight line scans in a raster because three line scans are necessary to acknowledge the presence of a cell and five additional line scans are required to acknowledge the CYTO-CHORD pulses are no longer being generated. This insures that there can be no overlap of the active test bands at the top of the display and the decision bands below them in the same columns. It is necessary to count six lines after any decision is made in order to generate the respective six-line decision ANNOTATION band or bands in the display. With the generation of the CELL SAMPLE pulse on conductor 229 at the end of the scan of any cell, gate 422 on FIG. 15 operates if uninhibited by the maximum count gate 421, and the 1-minute run has not yet been terminated so that conductor 61*c* is still high. Under these conditions, conductor 423 goes positive with each CELL SAMPLE pulse for which the 3 CON-CHORDS criterion has been met. This conductor is connected to the set input of flip-flop 630 on FIG. 20. The flip-flop is thus set in the 1 state at the acknowledged end of each cell, i.e., five lines after the last CYTO-CHORD pulse was detected for the cell. The Q output of flip-flop 630 is connected to one input of AND gate 631. The other input to the gate is connected to X-RESET conductor 114. At the start of each line scan following the setting of flip-flop 630 in the 1 state, the X-RESET pulse is extended through gate 631 to the increment input of three-stage counter 632. The count in the counter is thus incremented prior to each line scan. Just prior to the seventh line scan, the count in the counter is a binary encoded 7. Circuit 633 is pre-set to energize its output for such a condition. With the operation of circuit 633, one-shot multivibrator 634 is triggered to generate a DDR (DECISION DISPLAY RESET) pulse on conductor 635. The pulse is extended to the reset input of flip-flop 630 to reset the flip-flop to the 0 state. AND gate 631 is thereby disabled to inhibit subsequent X-RESET pulses from entering the input of counter 632. The DDR pulse also resets counter 632 to a count of zero, in preparation for the next cycle of operation.

Conductor 436*a* is connected to the output of gate 410 on FIG. 15. With the generation of the CELL SAMPLE pulse, the output of gate 410 goes high if the diameter test has been failed by the cell whose scan has just been completed. The pulse appears on conductor 436*a* at the same time that gate 422 operates and flip-flop 630 is set in the 1 state. Conductor 436*a* is extended to the set input of diameter flip-flop 661 on FIG. 21. The flip-flop is set in the 1 state to enable one input of AND gate 666. The second input to the gate is connected to conductor 617 which is high during each scan between times $T_c$ and $T_d$. Consequently, the output of gate 666 goes high during each subsequent line scan while the scan is passing through the diameter column of the display. The output of the gate is connected to one input of OR gate 676 so that the resulting pulse is extended to ANNOTATION conductor 600. Flip-flop 661 is set at the same time that flip-flop 630 is set, i.e., during CELL SAMPLE pulse time. The DDR pulse on conductor 635 is applied to the reset input of flip-flop 661. Consequently, flip-flop 661 if energized, remains in the 1 state only as long as flip-flop 630 remains in the 1 state, that is, during six line scans following the generation of a pulse on conductor 436*a*. Thus, if the diameter test has been failed by a cell, six lines in succession are blanked in the diameter column of the display.

In a similar manner, each of conductors 436*b*–436*e* is extended to the set input of a different one of shoulder, ratio, shape and area flip-flops 662–665. The Q output of each flip-flop is connected to one input of a respective one of gates 667–670, and the second input of each gate is connected to a respective one of the D-E GATE, E-F GATE, F-G GATE and G-H GATE conductors 618-621. The output of each of gates 667-670 is connected to an input of a respective one of OR gates 677–680. Finally, the DDR conductor 635 is connected to the reset input of each of the flip-flops. It is apparent that if any one of the active tests has been failed, the respective one of conductors 436*a*–436*e* is pulsed and a six-line band appears below the level of the cell in the respective column of the display.

It will be noted that the WINDOW STOP pulse on conductor 293 is applied to the set input of flip-flop 636 in FIG. 20. The WINDOW STOP pulse occurs at time $T_c$ during each scan and consequently it is at this time that the Q output of flip-flop 636 goes high. The G-H GATE conductor 621 is connected to the inverted reset input of flip-flop 636. When the conductor goes low at the termination of the G-H GATE pulse, the negative step at the reset input of flip-flop 636 causes the Q output of the flip-flop to go low. Consequently C-H GATE conductor 637 is held high only between $T_c$ and $T_h$.

The C-H GATE conductor is extended to one input of OR gate 638. The other input to the OR gate is the A-B GATE conductor 616. Consequently, the output of OR gate 638 is energized during each X-SWEEP, between times $T_a$ and $T_b$, and times $T_c$ and $T_h$.

If an ambiguous condition has been detected, conductor 69b in FIG. 15 is energized during CELL SAMPLE pulse time. This conductor is extended to the set input of flip-flop 640 on FIG. 20. The Q output of the flip-flop goes high to energize the other input of gate 639. Consequently, gate 639 operates between times $T_a$ and $T_b$, and between times $T_c$ and $T_n$, for as long as flip-flop 640 remains in the 1 state following an ambiguous decision. The output of gate 639 is extended to one input of OR gate 641 and controls the generation of the necessary bands on the display to indicate an ambiguous condition. Referring to cells 2 and 3 of FIG. 28, it will be recalled that the ambiguous decision is represented on the display by a dark band in the normal column (from $T_a$ to $T_b$) and across all of the non-normal columns (from $T_c$ to $T_h$). The band extends over only six lines on the display because the DDR pulse on conductor 635 is extended to the reset input of flip-flop 640 to de-energize the Q output of the flip-flop and thus disable gate 639 six lines after CELL SAMPLE pulse time.

It should be noted that during the generation of the ambiguous bands on the display, certain ones of OR gates 676–680 on FIG. 21 can still operate since the operations of these gates is controlled by pulses on conductors 436*a*–436*e* and these pulses are generated when respective tests have been failed — even in the presence of an ambiguous situation. However, it is apparent that the outputs of gates 676–680 simply overlap the output of gate 639 in the non-normal columns and consequently there is no need to inhibit the operation of these gates.

If a cell has been categorized as normal, NON-NORMAL conductor 69*a* is low in potential and AMBIGUOUS conductor 69*b* is similarly low in potential when CELL COUNT conductor 69*c* goes high. All three of these conductors are extended to respective inputs of gate 649 on FIG. 20, the signal on conductors 69*a* and 69*b* being inverted before they are applied to respective inputs of the gate. Consequently, in the case of a normal cell the output of gate 649 goes high to set flip-flop 644 in the 1 state for energizing one input of gate 645. The second input to gate 645 is connected to A-B GATE conductor 616. Consequently, the output of gate 645, connected to an input of OR gate 641, goes high during each of the line scans following the generation of the CELL SAMPLE pulse while the scan goes through the normal column of the display. After six line scans have taken place, the DDR pulse is applied to reset input of flip-flop 644 to disable gate 645. Consequently, a band such as that shown for cell 1 in FIG. 28 is generated in the normal column.

The only remaining ANNOTATION band which must be generated is that in the histiocyte column in the case of a lung cell. In the case of a histiocyte, conductor 69*d* is pulsed when the CELL SAMPLE pulse is generated. This conductor is connected to one input of flip-flop 642 in FIG. 20 and the flip-flop is set in the 1 state to energize one input of AND gate 643. The other input to the gate is connected to O-A GATE conductor 615. The output of gate 643 is extended to an input of OR gate 641. Consequently, following the generation of a pulse on HISTIOCYTE conductor 69*d*, a band is generated in the histiocyte column such as that shown for cell 4 in FIG. 28. The band extends over only six lines because only six lines are generated between the time the HISTIOCYTE decision is made and the time the DDR pulse resets flip-flop 642.

Recorded and Playback System — FIG. 23

The output signal of Video recorder summer 294 on FIG. 12 is similar to the output signal of microscope monitor summer 234 except that instead of containing a UV-VIDEO or simulated cell component it contains a PROCESSOR VIDEO or simulated cell component in analog or digitized form. The output of the summer on conductor 81*b* is extended to the RECORD input of video tape recorder 701.

The signal recorded on the video tape is a composite signal including cell scan information, X and Y sync information and annotation information. When the data processor is switched to the playback mode, and the video tape is played back, the composite playback signal appears on conductor 88. Conductor 88 is extended to the circuit of FIG. 4, so that the sync information recorded on the video tape can be used to sync the action of the data processor to the recorded signal. In the playback mode, switch 288*a* of FIG. 8 is connected to terminal 288*c* and the tape signal is extended through the synchronized electronic switch to PROCESSOR VIDEO conductor 52. The electronic switch eliminates the sync and annotation signals which were present in the composite playback signal so that the resulting PROCESSOR VIDEO signal is of the same form as that fed to the data processor in the operate mode.

The composite playback signal on conductor 88 is extended through video summer 715 on FIG. 23 to the input of recorder monitor 709. The playback signal — with its annotation — appears on the recorder monitor. One of the main reasons for providing the recorder monitor is to allow a single cell to be examined in detail. This is easily accomplished with a conventional video tape recorder which can be adjusted to play the same field over and over again. In such a case the display on the recorder monitor will be stationary as shown in FIG. 23. It should be noted that in such a case the same cell would be analyzed over and over again by the data processor. In the event it is determined that a decision previously made by the data processor is incorrect (by studying the cell on the display and noting the annotation below it on the recorder monitor), it is possible to trace the source of the mistake since the same cell information is being inserted into the data processor over and over again.

As described above, system oscilloscope 714 can be used to observe the output of Video recorder summer 294 on a real-time basis. However, it is very difficult to extract much useful information from the display because the display consists of many pulses close together. Even if the annotation pulses are removed from the trace by closing switch 648 on FIG. 20, the line scan information essentially appears as a series of spikes. It would be highly desirable to be able to examine the profile of a single line scan, that is, a signal of the form shown adjacent to conductor 52 in FIG. 8. This can be accomplished on the recorder oscilloscope 708 of FIG. 23 if the same field is played back over and over again.

The composite playback signal includes X and Y sync information. The signal is extended to the input of X-sync stripper 702 and Y-sync stripper 703. At the end of each playback of the field, Y-sync stripper 703 pulses the reset input of line counter 704. Thereafter, in the next playback of the same field, each X sync pulse increments the line counter. Manually adjustable decoder 705 can be set so that its output, SELECTED LINE conductor 706, goes high when the count in counter 704 equals the manually selected value. Conductor 706 goes high only as long as this count is maintained in the counter. Consequently, conductor 706 remains high only while a single line is being played back. Conductor 706 is extended to the sync input of the recorder oscilloscope. The positive step at the start of the line scan is used to sync the oscilloscope. Since the start of the same line scan always triggers the oscilloscope, it is possible to adjust the time base such that only the selected line scan (or two, etc.) appears on the scope.

The pulse on conductor 706 is also extended to an input of video summer 715. The output of the summer on conductor 707 is extended to the input of each of recorder oscilloscope 708 and recorder monitor 709. The input to the video summer on conductor 88 is the composite playback signal, and includes the line scan information, the sync information and the annotation information. Added to this composite signal is a step corresponding to the selected line. In terms of the display on the recorder oscilloscope, this step is seen as a pedestal on which the selected line information appears. The main function of the pulse on conductor 707, however, is to generate a dark line on the recorder monitor while the line of interest is being formed. This line is shown as line 710 on the display of the recorder monitor. As the decoder setting is manually adjusted, line 710 may be observed to move up and down on the display. In this way any line through the cell can be selected simply by changing the setting of the decoder while at the same time observing the selected line on the recorder monitor. This allows any line through the cell to be selected with a minimum of effort in order to view the profile of the line information in detail.

The pulses on pedestal 713 on the recorder oscilloscope display correspond to the nine vertical lines which appear on the recorder monitor display since these vertical lines are generated by the generation of nine 0.2- microsecond pulses during each line scan. The negative going pulse at the trailing edge of the pedestal corresponds to an inverted X-SAMPLE pulse. Similarly, the reduced level at the leading edge of the pedestal corresponds to an X-SAMPLE pulse at the start of the line scan.

Once a display such as that shown in FIG. 23 is achieved, it is possible to check the operation of the data processor in the following manner. It is often desirable to determine which line scan through a cell causes a particular decision to be made. The input to the oscilloscope can be moved from conductor 707 to a number of points in the data processor. For example, the display on the recorder monitor indicates that the shoulders test was failed. Suppose it is desired to determine which line scan (or scans) resulted in the test failure. The signal input to the oscilloscope can be connected to the Q output of flip-flop 341 on FIG. 13. It will be recalled that this flip-flop is set in the 1 state at the end of any line scan during which the shoulders test fails. Line 710 on the recorder monitor display indicates the line which is controlling the triggering of the trace on oscilloscope 708. Decoder 705 is manually changed until the trace, instead of being at the ground level, includes a positive-level (1) pulse. This is an indication that the particular line to which the oscilloscope is synced is that during which flip-flop 341 is set in the 1 state. This, in turn, implies that it is the previous line during which the shoulders test was failed, Similarly, many test points throughout the data processor can be checked in this way.

Start/Stop Control, Counter Bank And Data Acquisition System — FIG. 24

Start/stop control 37, counter bank 40 and data acquisition system 42, all shown within box 86 on FIG. 1, are shown in further detail on FIG. 24. The system standby-off switch 750 is connected to one of the inverting inputs of OR gate 751. This input of the OR gate is thus ordinarily low. To start the system, operation switch 750 is closed momentarily to extend a pulse through OR gate 751 to the inverting input of one-minute sample change timer 752. This timer is triggered by a negative step as soon as switch 750 is released.

With the triggering of the one-minute sample change timer, a one-minute positive pulse appears on conductor 61d. This conductor is extended to the automatic cell handling system. The pulse notifies the cell handling system to change the sample under test. This requires approximately 30 seconds. After the sample is changed, the next solution with new cell samples start to flow through the capillary tube. The first 30 seconds of the cell flow is alloted for cleaning the tube of cells from the previous sample. It is only after a flow of cells has occurred for approximately 30 seconds that the data processor is triggered into operation.

The negative step at the output of timer 752 at the end of the 1-minute pulse triggers one-shot multivibrator 753. A short pulse appears on START OF RUN conductor 61*e*. This pulse resets flip-flops 756 and 759, and all of counters 762–765. The flip-flops and counters must be cleared prior to the acquisition of data concerning the new sample. At the termination of the short pulse on conductor 61*e*, 1-minute run timer 754 is triggered. The positive one-minute pulse on conductor 61*c* is extended to an input of gate 422 on FIG. 15, and as described above enables this gate for a 1-minute run interval. Until this gate is enabled none of the counter inputs, conductors 69*a*, 69*b*, 69*c* and 69*d*, can be pulsed by the data processor even though the circuitry within the data processor functions whenever cells flow through the capillary tube. Similarly, conductor 61*c* is extended to the circuit of FIG. 18 where it controls the resetting of counter 447 and the inhibiting of gate 450.

At the end of the 1-minute run, a negative step appears on conductor 61*c* and triggers one-shot multivibrator 755. A short positive pulse is generated on END OF RUN conductor 61*a*. This pulse is extended to an input of OR gate 751. At the termination of the pulse, the negative step causes gate 751 to apply to a negative step to the inverting input of one-minute sample change timer 752, and the cycle begins all over again with the pulse on conductor 61*d* causing the automatic cell handling system to change samples.

Counter bank 40 includes the four counters 762–765 described above (the non-normal counter, the ambiguous counter, the cell counter and the histiocyte counter). It also includes a fifth counter 766, the sample counter. Each of the samples fed into the automatic cell handling system includes an identifying number, with all of the samples fed into the system in sequence having successive numbers. The preset input of sample counter 766 is adjusted such that the count in the counter represents the identifying number of the first sample in any sequence, less unity. The first START OF RUN pulse on conductor 61*e*, applied to the increment input of counter 766, increments the count in counter 766 so that the stored number corresponds to the identifying number of the first sample. Thereafter, each START OF RUN pulse on conductor 61*e* increments the counter so that the count in the counter will correspond to the identifying number of the sample under test. This procedure can be facilitated by having a preset input dial which is internally offset by a count of one so that the operator is not required to mentally subtract each time he feeds a preset number into the system.

Before the data acquisition system 42 is set into operation at the end of any run, it is necessary to verify that a sufficient number of cells have been processed for the results to be meaningful. The output of cell counter 764 on cable 75*c* is extended over cable 87 to the input of adjustable adequate cell count decoder 760. The pre-set value stored in this counter represents the predetermined cell count which, if exceeded, is an indication that a sufficient number of cells have been examined. If a sufficient number of cells have been examined, decoder 760 energizes output conductor 767 which sets flip-flop 756 in the 1 state. At the start of any run flip-flop 756 is reset, and the $\overline{Q}$ output goes high to enable one input of gate 757 and the Q output goes low to de-energize one input of gate 758. However, if during the run a sufficient number of cells are examined, gate 758 is enabled and gate 757 is disabled.

At the end of the run, the pulse on conductor 61a is extended to one input of each of the two gates. If a sufficient number of cells have been examined, conductor 61b is pulsed through gate 758. This conductor is extended to the trigger input of the data acquisition system. A pulse on this conductor instructs the data acquisition system to store all of the data contained in counters 762–766 All of the data on cables 75*a*–75*e* is extended over cable 64 to the data acquisition system. The identifying number of the sample just tested is recorded, together with the individual counts stored in counters 762–765. Also, as described above, it is of interest to verify that a particular sample was a lung sample if this was the case. In such a case, conductor 69*e* is high and this information is recorded as well. Although not shown in the drawing, it is also possible to record the $V_{cyto}$ and $V_{nuc}$ or any other threshold levels used during the test of each sample via a digital voltmeter and a programmable stepping switch.

On the other hand, if an insufficient number of cells have been examined, gate 757 extends the END OF RUN pulse from conductor 61*a* to the set input of flip-flop 759. The flip-flop is originally reset by the START OF RUN pulse on conductor 61*e*. However, at the end of the run, it switches to the 1 state and the Q output goes high. The Q output causes lamp circuit 761 to energize to inform the operator that the capillary tube must be cleaned, or that the sample is too sparse of cells.

Alternate Non-Normal Logic — FIG. 27

Referring to FIG. 15, the five conductors on which non-normal pulses can appear are all coupled to five respective inputs of OR gate 418. These conductors represent respectively enlarged nuclear diameter (276), insufficient cytoplasm shoulders (334), enlarged N/C ratio (380), non-normal cell shape (480) and excessive peak nuclear area (310). Each of the five conditions is treated equally in that any one of them can control the categorization of a cell as non-normal. However, it is sometimes preferred to perform combinational weighting of the non-normal criteria in the decision-making process. It may even be desirable to provide proportional weighting as well so that certain decisions are given more signifigance than others in the categorization of a cell. The circuit of FIG. 27 outlines a scheme of this type as an alternate method for deriving a non-normal signal on conductor 427 of FIG. 15.

The five conductors just described are shown tied to six resistors to the left of FIG. 27. There are only two effective inputs to OR gate 472, the energization of either of which causes a cell to be categorized as non-normal. Operational amplifier 470, with feedback resistor 469, serves as a summer. Potentiometer 468 controls the D.C. bias at the input of the summer. Three of the non-normal conductors (276, 310 and 334) are connected through respective potentiometers 465, 466 and 467 to the input of the summer. The potentiometers may be set so that each input is given a different weight. The output of the summer is extended to one input of comparator 471, the other input to which is connected to potentiometer tap 476. The output of comparator 471 is ordinarily low. The output goes high only if the summer input to the comparator exceeds the threshold voltage determined by the setting of potentiometer 476. The setting of potentiometers 465–468 determine which combinations of the three inputs cause the output of the comparator to go high. For example, the potentiometer settings can be adjusted such that pulses on any two of the three input conductors, or pulses on all three, trigger OR gate 472, whereas a pulse on only one input conductor cannot trigger the OR gate.

Similarly, the other input to OR gate 472 is connected to the output of another comparator 473. The three data inputs to summer 474, whose output is connected to one input of comparator 473, are another combination of three of the non-normal conductors (310, 380 and 480). Different weightings can be assigned to the pulses on these three conductors for controlling the final energization of conductor 427 which is used to categorize the cell as non-normal. These weightings can clearly be completely different from those associated with the inputs of summer 470. Moreover, there can be a large number of these combinatorial weightings made, all feeding into OR gate 472.

Atomatic Sample Handling System — FIG. 25

Figures 25A, 25B, 25C, 25D:
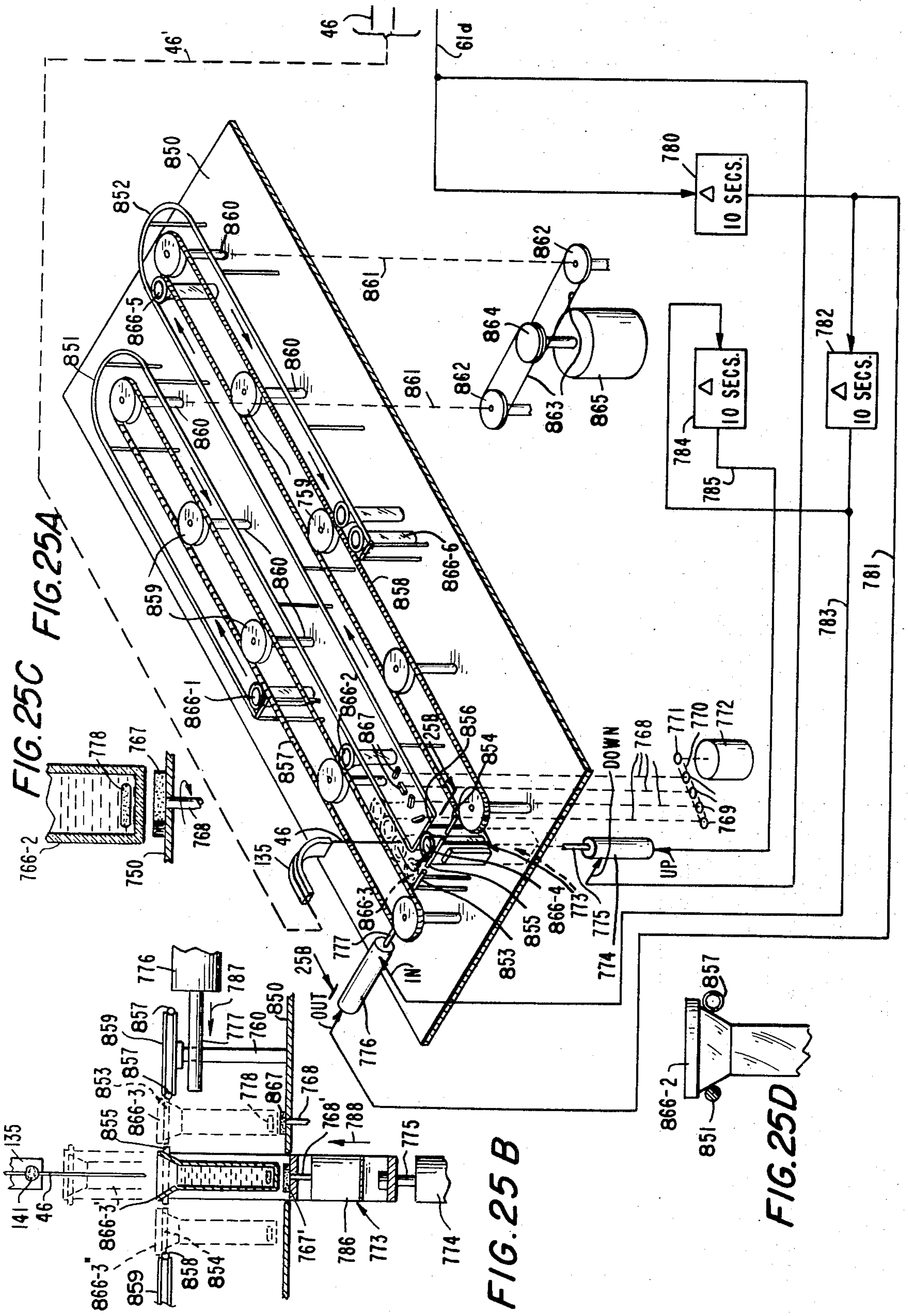
Figure 26:
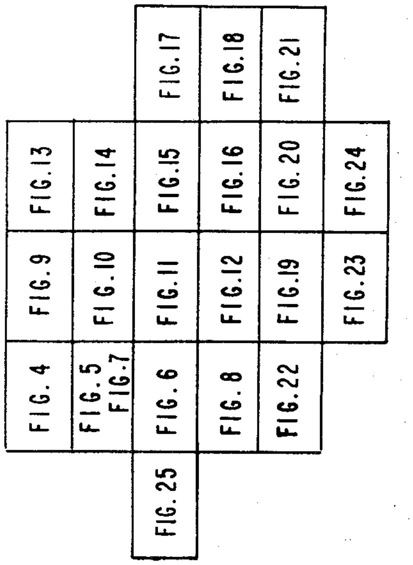
FIG. 26 shows the arrangement of FIGS. 4 – 25.

The automatic sample handling system is shown in FIG. 25. Capillary tube 46 is shown to the right of the drawing. The tube (shown greatly enlarged in FIG. 6) is shown simply by dotted line 46' as extending to mounting plate 135. The capillary tube then extends downward below the mounting plate as shown in FIG. 25A.

The various samples are contained in individual containers or tubes 766 which are open at the top. The upper end of each tube flares outward as shown most clearly for tube 766-2 in FIG. 25D to enable the tube to be transported on guides such as 751 and 757. The guides are of two types — stationary rails and conveyor belts. There are two conveyor belts (757 and 758) and they are preferably coiled springs connected to form two closed loops.

There are six guide rail segments 751–756. All of the rail segments are stationary except rails 755 and 756. These are fixed on elevator 773 which can be moved up and down as will be described below. The conveyor belts are extended around two sets of five pulleys 759, each mounted on a shaft 760 extending to support surface 750. The two pulley shafts at the far right end of the support surface are extended, as shown by dotted lines 761, to respective pulleys 762. These pulleys are connected by respective belts 763 to drive pulley 764, which latter pulley is driven by motor 765. The two conveyor belts 757 and 758 thus rotate continuously.

The sample tubes are placed at the start of the automatic transport system, tube 766-1 in FIG. 25A being shown in this position. As belt 757 rotates, the tubes are moved in the direction shown by the arrows. Tube 766-2 is shown in a position nearing the working station. Tube 766-3 is shown in phantom outline adjacent stop rail 753 just prior to elevator 773. As more and more sample tubes are placed at the starting end of the automatic transport system, they are conveyed toward the working station. They simply line up in back of tube 766-4 with conveyor belt 757 slipping past the queued tubes. The conveyor belt system is capable of moving a tube only if it is not blocked by a tube or rail in front of it.

Tube 76604 is shown on guide rails 755, 756 on elevator 773. A tube is transferred from the waiting position of tube 766-3 to the working position of tube 766-4 by the energization of actuator 776. Piston 777 is forced out of the actuator, below belt 757, to push the tube in the waiting position to the working position. This is shown most clearly in FIG. 25B, a view from the right side of FIG. 25A. Tube 766-3 (shown in dotted lines) is in the waiting position up against guide rail 753. When piston 777 is pulsed outward in the direction shown by arrow 787, tube 766-3 is forced to the position shown by tube 766-3', the latter tube shown in section. Thereafter, piston 777 is withdrawn so that the next sample tube can be conveyed into the waiting position.

Actuator 774 is then energized and piston 775, attached to the bottom of elevator 773, is forced upward. The entire elevator, including the pair of guide rails 755 and 756, moves upward as shown by arrow 788, such that capillary tube 46 extends down into the sample solution contained in the tube. Tube 766-3' is shown in the raised position by the dotted lines in FIG. 25B.

Following the run of the sample, actuator 774 is deenergized and piston 775 moves downward. The entire elevator drops and the tube just processed is moved to the position shown for tube 766-4 in FIG. 25A. When actuator 776 is energized once again and piston 777 moves in the direction of arrow 787, the next sample tube is pushed from the waiting position to the working position. This tube, in turn, pushes the tube then in the working position to the position shown by tube 766-3'' in FIG. 25B. The latter tube is immediately transported by belt 758, in the direction of the arrows shown in FIG. 25A, to the final position shown by tube 766-6. As successive tubes are moved to the final position, they are taken away in order to allow processing of additional samples.

It is desirable to maintain the solution in each sample tube in a state of agitation in order to obtain a uniform dispersion of cells immediately prior to, and during, their aspiration through the capillary tube. A series of small magnets 767 are shown on top of supporting surface 750, underneath the sample tubes, just before they enter the working station. Each of these magnets is connected by a respective shaft, shown only by dotted lines 768, to a respective one of pulleys 769. The pulleys are in turn coupled by belt 770 to pulley 771 which is driven by motor 772. Magnets 767 rotate continuously. Inside each sample tube, such as tube 766-2, there is a Teflon-coated magnet 778, as detailed in FIG. 25C. As each of magnets 767 rotates, it forces the magnet 778 in the tube above it to similarly rotate and agitate the cell solution. Thus immediately before each sample tube arrives at the working station, the solution it contains has been continuously agitated for at least 10 minutes. An exception to this would be the first set of tubes for the day or run. In this case, the tubes may be kept in a standby condition by use of switch 750 in FIG. 24 to insure good cell dispersion.

Another rotating magnet 767' is contained on the elevator itself, as shown in FIG. 25B, immediately below the sample being processed. The magnet is connected by shaft 768' to motor 786 contained in the elevator. The motor moves up and down with the elevator and insures that the solution which is being drawn through the capillary tube is continuously agitated.

It will be recalled that the signal on conductor 61d in FIG. 24 from start/stop control 37 consists of 1-minute positive pulses at 2-minute intervals. Conductor 61d is extended directly to the "down" control of actuator 774. The positive step on conductor 61*d* at the start of each run causes elevator 773 to be pulled down, immediately following the processing of the previous sample. Conductor 61*d* is also extended to the input of delay unit 780. After 10 seconds, the positive step at the output of the delay unit is extended over conductor 781 to the "out" input of actuator 776. After 10 seconds have elapsed, the elevator is in the down position, and piston 777 is forced out of the actuator to change the sample in the working position.

The output of delay unit 780 is also extended to the input of delay unit 872. After an additional 10 seconds have elapsed, the positive step at the output of delay unit 782 is extended over conductor 783 to the "in" input of actuator 776. Piston 777 is pulled into the actuator inasmuch as the sample on the elevator rails has by this time been changed and the piston should be withdrawn prior to lifting the elevator.

The output of delay unit 782 is also extended to the input of delay unit 784. The delay of this unit is also 10 seconds, and consequently after 30 seconds have elapsed following the initial positive step on conductor 61d the positive step appears on conductor 785 extended to the "up" input of actuator 774. When the positive step is applied to the up input of the actuator, the elevator is raised. The elevator thus starts to rise 30 seconds after the positive step at the start of each run appears on conductor 61*d*. It requires only a few seconds for the elevator to rise to a height sufficient for cells to be drawn through capillary tube 46. The cells in the carrier solution are drawn through the capillary tube for approximately 30 seconds before processing begins, as described above, in order to clear the capillary tube of the previous sample. Elevator 773 remains in the up position for approximately 1.5 minutes, during the last 1 minute of which the data obtained by the data processor is registered. After a total of 2 minutes have elapsed, the next positive step on conductor 61*d* starts the cycle all over again with the relowering of the elevator.

The automatic sample handling system greatly facilitates the rapid processing of successive samples. It will be apparent to those skilled in the art that other types of automatic transport systems can be utilized.

Similar remarks apply to the other blocks of equipment in the illustrative embodiment of the invention. For example, the line scans through a cell are generated by a moving spot of light in the illustrative embodiment of the invention. However, it is also possible to generate an entire line of light without distinguishing between different points on the line in real time. A line profile through a cell could be determined by providing many photodetectors to detect the light transmitted through the capillary tube corresponding to different points on the line. Alternatively, a single photodetector could be provided in which case its output at any instant of time would represent the total cellular information along the line being examined. Successive outputs of such a photodetector would correspond to successive lines through the cell, and only a single waveform of the type shown in FIG. 9 would be generated for each cell. For such an arrangement, it can be shown that, although each line of light impinges upon a cell in a direction transverse to the direction of flow, the photodetector output in real time corresponds to a line scan through the center of the cell in the direction of the flow. Similarly, instead of generating the ultraviolet and visible light with an electron beam impinging upon the phosphor-coated face of a cathode-ray tube, it is contemplated that a laser source or sources should be adequate for the same purpose. It will also be apparent to those skilled in the art that the ultra-violet and visible light signals can be combined, other than by subtracting one from the other, in order to enhance the distinguishability between nucleus and cytoplasm. Also, staining many be practiced to enhance discernability in those cases where non-uniformity of staining is not a problem. (In such cases, ultra-violet light may be necessary for scanning.) Thus it is to be understood that numerous modifications may be made in the illustrative embodiment of the invention and other arrangements may be devised without departing from the spirit and scope of the invention.

What is claimed is:

1. A system for analyzing biological cells comprising a capillary tube, means for controlling a flow through said capillary tube of a carrier solution containing biological cells therein, said capillary tube having a inner diameter and the rate of flow of said carrier solution through said capillary tube being such that said biological cells are controlled to flow in essentially single file through said capillary tube, means for irradiating said capillary tube in the form of line sweeps across said tube with focused light of wavelengths which are absorbed by said biological cells, said focused light being such that a substantial portion of the energy of said light is contained in ultra-violet wavelengths lower than 300 millimicrons, means for detecting light transmitted through said capillary tube to determine characteristics of the biological cells flowing through said capillary tube, said detecting means including means responsive to the instantaneous intensity of the ultra-violet light at wavelengths below 300 millimicrons transmitted through said capillary tube for deriving a signal proportional thereto, means for distinguishing between nuclear and cytoplasmic cellular material within said capillary tube along any line sweep across said tube in accordance with the instananeous magnitude of the derived signal, means for generating a pulse signal of a first type during each of said line sweeps across said capillary tube during the time interval when the magnitude of said derived signal exceeds a first threshold level, means for generating a pulse signal of a second type during each of said line sweeps across said capillary tube during the time interval when the magnitude of said derived signal exceeds a second threshold level, and means for categorizing a cell flowing through said capillary tube as normal or non-normal in accordance with the widths of said first-type and second-type pulse signals.

2. A system in accordance with claim 1 further including means responsive to the detection of pulse signals during a number of successive line sweeps exceeding a predetermined number for inhibiting the categorization of a cell as normal or non-normal.

3. A system in accordance with claim 1 further including means for enabling said signal to be derived only while said light sweeps through a portion of said capillary tube in the middle thereof.

4. A system for analyzing biological cells comprising a capillary tube, means for controlling a flow through said capillary tube of a carrier solution containing biological cells therein, said capillary tube having an inner diameter and the rate of flow of said carrier solution through said capillary tube being such that said biological cells are controlled to flow in essentially single file through said capillary tube, means for irradiating said capillary tube in the form of line sweeps across said tube with focused light of wavelengths which are absorbed by said biological cells, said focused light being such that a substantial portion of the energy of said light is contained in ultra-violet wavelengths lower than 300 millimicrons, means for detecting the light transmitted through said capillary tube to determine characteristics of the biological cells flowing through said capillary tube, said detecting means including means responsive to the instantaneous intensity of the ultra-violet light at wavelengths below 300 millimicrons transmitted through said capillary tube for deriving a signal proportional thereto, means for distinguishing between nuclear and cytoplasmic cellular material within said capillary tube along any line sweep across said tube in accordance with the instantaneous magnitude of the derived signal, means for generating timing pulses corresponding to each line sweep across said tube, said detecting means being controlled by said timing pulses to determine characteristics of each biological cell flowing through said capillary tube at the end of each line sweep, and means for categorizing a cell at the termination of all line sweeps through a cell in accordance with the characteristics determined at the end of each line sweep through the cell.

5. A system in accordance with claim 4 further including means for counting a predetermined number of successive line sweeps across said tube during which the magnitude of said derived signal does not exceed a predetermined threshold level for determining that a cell previously being scanned is no longer being scanned.

6. A system in accordance with claim 5 further including means for counting the number of successive line sweeps across said capillary tube during which said derived signal has a magnitude exceeding a predetermined threshold level, and means responsive to said number exceeding a predetermined number for inhibiting the operation of said categorizing means.

7. A system for analyzing biological cells comprising a capillary tube, means for controlling a flow through said capillary tube of a carrier solution containing biological cells therein, said capillary tube having an inner diameter and the rate of flow of said carrier solution through said capillary tube being such that said biological cells are controlled to flow in essentially single file through said capillary tube, means for irradiating said capillary tube in the form of line sweeps said tube with focused light of wavelengths which are absorbed by said biological cells, said focused light being such that a substantial portion of the energy of said light is contained in ultra-violet wavelengths lower than 300 millimicrons, means for detecting the light transmitted through said capillary tube to determine characteristics of the biological cells flowing through said capillary tube, said detecting means including means responsive to the instantaneous intensity of the ultra-violet light at wavelengths below 300 millimicrons transmitted through said capillary tube for deriving a signal proportional thereto, means for distinguishing between nuclear and cytoplasmic cellular material within said capillary tube along any line sweep across said tube in accordance with the instantaneous magnitude of the derived signal and means responsive to the operation of said distinguishing means for generating a first pulse as the light in a line sweep passes through nuclear cellular material and for generating a second pulse as the light in a line sweep passes through cytoplasmic cellular material.

8. A system in accordance with claim 7 further including means for comparing the width of said first pulse generated during each line sweep across said capillary tube to a predetermined threshold width, and means responsive to the width of said first pulse exceeding said threshold width for characterizing a cell as having a non-normal nuclear diameter.

9. A system in accordance with claim 7 further including means for comparing the sum of the widths of the second pulses generated during each line sweep which extends through the nucleus of a cell to a predetermined threshold width, and means responsive to the sum of the widths of said second pulses being less than said threshold width for characterizing a cell as having non-normal cytoplasm shoulders.

10. A system in accordance with claim 7 further including means for forming a signal whose magnitude is dependent upon the relative widths of the first and second pulses generated during each line sweep across said capillary tube, and means responsive to the magnitude of said formed signal exceeding a predetermined threshold level for characterizing a cell as having a non-normal nucleus-to-cell volume relationship.

11. A system in accordance with claim 7 wherein, during a line sweep which extends through the nucleus of a cell, a single one of said first pulses and a pair of said second pulses are generated, said pair of second pulses occurring respectively earlier and later than said single first pulse, and further including first means operative responsive to the width of said earlier second pulse exceeding the width of said later second pulse during any line sweep through a cell, second means operative responsive to the width of said later second pulse exceeding the width of said earlier second pulse during another line sweep through the same cell, and means responsive to the operation of both said first and second means for characterizing the cell as having a non-normal shape.

12. A system for analyzing biological cells comprising a capillary tube, means for controlling a flow through said capillary tube of a carrier solution containing biological cells therein, said capillary tube having an inner diameter and the rate of flow of said carrier solution through said capillary tube being such that said biological cells are controlled to flow in essentially single file through said capillary tube, means for irradiating said capillary tube in the form of line sweeps across said tube with focused light of wavelengths which are absorbed by said biological cells, said focused light being such that a substantial portion of the energy of said light is contained in ultra-violet wavelengths lower than 300 millimicrons, means for detecting the light transmitted through said capillary tube to determine characteristics of the biological cells flowing through said capillary tube, said detecting means including means responsive to the instantaneous intensity of the ultra-violet light at wavelengths below 300 millimicrons transmitted through said capillary tube for deriving a signal proportional thereto, means for distinguishing between nuclear and cytoplasmic cellular material within said capillary tube along any line sweep across said tube in accordance with the instantaneous magnitude of the derived signal, means for integrating that portion of said derived signal which exceeds a predetermined threshold during each line sweep through a cell in said capillary tube, means for comparing the magnitude of the integrated signal to a predetermined magnitude, and means responsive to the magnitude of said integrated signal exceeding said predetermined magnitude during any line sweep through a cell for characterizing the cell as having a non-normal peak nuclear area.

13. A system for analyzing biological cells comprising a capillary tube, means for controlling a flow through said capillary tube of a carrier solution containing biological cells therein, said capillary tube having an inner diameter and the rate of flow of said carrier solution through said capillary tube being such that a substantial portion of the energy of said light is contained in ultra-violet wavelengths lower than 300 millimicrons, means for detecting the light transmitted through said capillary tube to determine characteristics of the biological cells flowing through said capillary tube, said detecting means including means responsive to the instantaneous intensity of the ultra-violet light at wavelengths below 300 millimicrons transmitted through said capillary tube for deriving a signal proportional thereto, means for distinguishing between nuclear and cytoplasmic cellular material within said capillary tube along any line sweep across said tube in accordance with the instantaneous magnitude of the derived signal, wherein said detecting means further includes means for identifying particular ones of predetermined characteristics in a cell in accordance with the time periods during each line sweep across said capillary tube that said derived signal exceeds predetermined threshold levels, means for controlling the categorization of a cell as non-normal responsive to at least one of said predetermined characteristics being identified in a cell, and means for selectively inhibiting the categorization of a cell as non-normal responsive to selected ones of said predetermined characteristics being identified in a cell.

14. A system for analyzing biological cells comprising a capillary tube, means for controlling a flow through said capillary tube of a carrier solution containing biological cells therein, said capillary tube having an inner diameter and the rate of flow of said carrier solution through said capillary tube being such that said biological cells are controlled to flow in essentially single file through said capillary tube, means for irradiating said capillary tube in the form of line sweeps across said tube with focused light of wavelengths which are absorbed by said biological cells, said focused light being such that a substantial portion of the energy of said light is contained in ultra-violet wavelengths lower than 300 millimicrons, means for detecting the light transmitted through said capillary tube to determine characteristics of the biological cells flowing through said capillary tube, said detecting means including means responsive to the instantaneous intensity of the ultra-violet light at wavelengths below 300 millimicrons transmitted through said capillary tube for deriving a signal proportional thereto, means for distinguishing between nuclear and cytoplasmic cellular material within said capillary tube along any line sweep across said tube in accordance with the instantaneous magnitude of the derived signal, wherein said detecting means further includes means for categorizing and counting all cells in accordance with the characteristics thereof, and means for inhibiting the further categorizing and counting of cells if the total count in any category exceeds a respective predetermined count.

15. A system for analyzing biological cells comprising a capillary tube, means for controlling a flow through said capillary tube of a carrier solution containing biological cells therein, said capillary tube having an inner diameter and the rate of flow of said carrier solution through said capillary tube being such that said biological cells are controlled to flow in essentially single file through said capillary tube, means for irradiating said capillary tube in the form of line sweeps across said tube with focused light of wavelengths which are absorbed by said biological cells, said focused light being such that a substantial portion of the energy of said light is contained in ultra-violet wavelengths lower than 300 millimicrons, means for detecting the light transmitted through said capillary tube to determine characteristics of the biological cells flowing through said capillary tube, said detecting means including means responsive to the instantaneous intensity of the ultra-violet light at wavelengths below 300 millimicrons transmitted through said capillary tube for deriving a signal proportional thereto, means for distinguishing between nuclear and cytoplasmic cellular material within said capillary tube along any line sweep across said tube in accordance with the instantaneous magnitude of the derived signal, wherein said detecting means further includes means for identifying particular characteristics in a cell in accordance with the time periods during each line sweep across said capillary tube that said derived signal exceeds predetermined threshold levels, and means for weighting the various characteristics identified in a cell to categorize the cell as normal or non-normal.

16. A system for analyzing biological cells comprising a capillary tube, means for controlling a flow through said capillary tube of a carrier solution containing biological cells therein, said capillary tube having an inner diameter and the rate of flow of said carrier solution through said capillary tube being such that said biological cells are controlled to flow in essentially single file through said capillary tube, means for irradiating said capillary tube in the form of line sweeps across said tube with focused light of wavelengths which are absorbed by said biological cells, said focused light being such that a substantial portion of the energy of said light is contained in ultra-violet wavelengths lower than 300 millimicrons, means for detecting the light transmitted through said capillary tube to determine characteristics of the biological cells flowing through said capillary tube, said detecting means including means responsive to the instantaneous intensity of the ultraviolet light at wavelengths below 300 millimicrons transmitted through said capillary tube for deriving a signal proportional thereto, means for distinguishing between nuclear and cytoplasmic cellular material within said capillary tube along any line sweep across said tube in accordance with the instantaneous magnitude of the derived signal, wherein said detecting means further includes means for identifying particular characteristics of a cell flowing through said capillary tube in accordance with the relative time periods during each line sweep through the cell that the sweep passes through nuclear and cytoplasmic cellular material, means for generating coded signals indicative of particular characteristics having been identified in a cell flowing through said capillary tube, and means for combining said coded signals with said derived signal for producing a signal suitable for controlling a display on a television monitor which represents both the cells flowing through said capillary tube and its characteristics as identified by said detecting means.

17. A system for analyzing biological cells comprising a capillary tube, means for controlling a flow through said capillary tube of a carrier solution containing biological cells therein, means for irradiating said capillary tube in the form of line sweeps across said tube with focused light of wavelengths which are absorbed by said biological cells, said focused light being such that a substantial portion of the energy of said light is contained in ultra-violet wavelengths lower than 300 millimicrons, means for detecting the light transmitted through said capillary tube to determine characteristics of the biological cells flowing through said tube, said detecting means including means responsive to the instantaneous intensity of the ultra-violet light at wavelengths below 300 millimicrons transmitted through said capillary tube for deriving a signal proportional thereto, means for distinguishing between nuclear and cytoplasmic cellular material within said capillary tube along any line sweep across said tube in accordance with the instantaneous magnitude of the derived signal, means for registering the category of each cell whose characteristics are determined by said detecting means, and means for preventing the operation of said registering means unless said derived signal has exceeded a predetermined threshold level during each line sweep of a predetermined number of successive line sweeps following the categorization of the last cell.

18. A system in accordance with claim 17 further including means for initiating the operation of said registering means responsive to the magnitude of said derived signal remaining below a predetermined threshold level during each line sweep of a predetermined number of successive line sweeps.

19. A system in accordance with claim 17 further including means responsive to said derived signal exceeding a predetermined threshold level during each line sweep of a predetermined number of successive line sweeps for inhibiting the operation of said registering means.

20. A system for analyzing biological cells comprising a capillary tube, means for controlling a flow through said capillary tube of a carrier solution containing biological cells therein, means for irradiating said capillary tube in the form of line sweeps across said tube with focused light of wavelengths which are absorbed by said biological cells, said focused light being such that a substantial portion of the energy of said light is contained in ultra-violet wavelengths lower than 300 millimicrons, means for detecting the light transmitted through said capillary tube to determine characteristics of the biological cells flowing through said tube, said detecting means including means responsive to the instantaneous intensity of the ultra-violet light at wavelengths below 300 millimicrons transmitted through said capillary tube for deriving a signal proportional thereto, means for distinguishing between nuclear and cytoplasmic cellular material within said capillary tube along any line sweep across said tube in accordance with the instantaneous magnitude of the derived signal, means for inserting said capillary tube into different containers in succession, each container containing sample cells from a different person, means for controlling the flow of cells from each sample through said capillary tube for a predetermined time interval prior to the change of samples, means for counting the total number of cells whose characteristics are determined by said detecting means during the flow of cells from each sample, and means for registering if the total number of such cells is less than a predetermined number.

21. A system for analyzing biological cells comprising a scanning station, means for controlling the movement of biological cells in essentially single file past said scanning station, means for scanning said cells at the scanning station with line scans of ultra-violet light having a substantial portion of its energy at wavelengths below 300 millimicrons, means for detecting the instantaneous intensity of the ultra-violet light transmitted through said cells at the scanning station for deriving a signal proportional thereto, means for distinguishing between nuclear and cytoplasmic cellular material along any line scan through a cell in accordance with the derived signal, said distinguishing means operative to indicate the scanning of cytoplasmic cellular material responsive to the magnitude of said derived signal exceeding a first threshold level and operative to indicate the scanning of nuclear cellular material responsive to the magnitude of said derived signal exceeding a second threshold level, means responsive to said distinguishing means for categorizing a cell in one of at least two groups, said categorizing means including means for generating a pulse of a first type during each line scan during the time interval when said derived signal exceeds said first threshold level and means for generating a pulse of a second type during each line scan during the time interval when said derived signal exceeds said second threshold level, means for determining the existence of pre-selected characteristics in a cell scanned at said scanning station in accordance with the widths of said first type and second type pulses during a line scan, and means for controlling the categorizing of a cell in one of said at least two groups in accordance with the determined characteristics after the scanning of said cell has been completed.

22. A system in accordance with claim 21 further including means for counting a predetermined number of successive line scans during which said derived signal does not exceed a predetermined threshold level for determining that a cell previously being scanned is no longer being scanned.

23. A system in accordance with claim 22 further including means for enabling the operation of said categorizing means only if said derived signal exceeded a fixed threshold level during each of a predetermined number of successive line scans following the categorizing of the last cell.

24. A system in accordance with claim 22 further including means for inhibiting the operation of said categorizing means at the completion of the scanning of a cell if during the scanning of the cell said derived signal exceeded a fixed threshold level during a number of line scans exceeding a predetermined number.

25. A system in accordance with claim 21 further including a plurality of counter means each for maintaining a count of the number of cells categorized in a respective one of said at least two groups, means for incrementing the respective one of said counter means following the categorizing of each cell in the respective group, means for scanning cells from successive samples, and means responsive to the completing of the scanning of cells from a sample for registering the total counts in said counter means.

26. A system in accordance with claim 25 wherein one of said counter means maintains a count of the total number of cells categorized, and further including means responsive to a count at the completion of the scanning of cells of a sample for registering that an insufficient number of cells of the sample have been scanned.

27. A system in accordance with claim 25 further including means for scanning said cells with line scans of light having a portion of its energy at wavelengths above 300 millimicrons, means for detecting the instantaneous intensity of the light at wavelengths above 300 millimicrons transmitted through said cells for generating a signal proportional thereto, means for comparing the instantaneous magnitude of said generated signal to a threshold level, means responsive to the instantaneous magnitude of said generated signal exceeding said threshold level for registering that the cell being scanned is a histiocyte, counter means for counting the total number of histiocytes scanned during the scanning of cells of a sample, and means responsive to the total count in said histiocyte counter means exceeding a predetermined number at the completion of the scanning of cells of a sample for registering that the sample is of lung cells.

28. A system in accordance with claim 21 further including means for comparing the width of said first-type pulse generated during each line scan with a predetermined threshold width, and means responsive to the width of said first-type pulse exceeding said threshold width for characterizing a cell as having a non-normal nuclear diameter.

29. A system in accordance with claim 21 wherein two of said second-type pulses are generated during each line scan which passes through the nucleus of a cell and further including means for comparing the sum of the widths of the two second-type pulses generated during each line scan which passes through the nucleus of a cell with a predetermined threshold width, and means responsive to the sum of the widths of said two second-type pulses being less than said threshold width for characterizing the cell as having insufficient cytoplasm shoulders.

30. A system in accordance with claim 21 further including means for generating a signal whose magnitude is dependent upon the ratio of the widths of said first-type and second-type pulses generated during each line scan, and means responsive to the magnitude of said ratio signal exceeding a predetermined threshold level for characterizing a cell as having a non-normal nucleus-to-cell volume relationship.

31. A system in accordance with claim 21 wherein, during a line scan which extends through the nucleus of a cell, a single one of said first-type pulses and a pair of said second-type pulses are generated, said pair of second-type pulses occurring respectively earlier and later than said single first-type pulse, and further including first means operative responsive to the width of said earlier second-type pulse exceeding the width of said later second-type pulse during any line scan which extends through the nucleus of a cell, second means operative responsive to the width of said later second-type pulse exceeding the width of said earlier second-type pulse during another line scan which extends through the nucleus of the same cell, and means responsive to the operations of both of said first and second means for characterizing the cell as having a non-normal shape.

32. A system for analyzing biological cells comprising a scanning station, means for controlling the movement of biological cells in essentially single file past said scanning station, means for scanning said cells at the scanning station with line scans of ultra-violet light having a substantial portion of its energy at wavelengths below 300 millimicrons, means for detecting the instantaneous intensity of the ultra-violet light transmitted through said cells at the scanning station for deriving a signal proportional thereto, means for distinguishing between nuclear and cytoplasmic cellular material along any line scan through a cell in accordance with the derived signal, said distinguishing means operative to indicate the scanning of cytoplasmic cellular material responsive to the magnitude of said derived signal exceeding a first threshold level and operative to indicate the scanning of nuclear cellular material responsive to the magnitude of said derived signal exceeding a second threshold level, means responsive to said distinguishing means for categorizing a cell in one of at least two groups, means for integrating that portion of said derived signal which exceeds a predetermined threshold level during each line scan through a cell, means for comparing the magnitude of the integrated signal to a predetermined magnitude, and means responsive to the magnitude of said integrated signal exceeding said predetermined magnitude during any line scan through a cell for characterizing the cell as having a nonnormal peak nuclear area.

33. A system for analyzing biological cells comprising a scanning station, means for controlling the movement of biological cells in essentially single file past said scanning station, means for scanning said cells at the scanning station with line scans of ultra-violet light having a substantial portion of its energy at wavelengths below 300 millimicrons, means for detecting the instantaneous intensity of the ultra-violet light transmitted through said cells at the scanning station for deriving a signal proportional thereto, means for distinguishing between nuclear and cytoplasmic cellular material along any line scan through a cell in accordance with the derived signal, said distinguishing means operative to indicate the scanning of cytoplasmic cellular material responsive to the magnitude of said derived signal exceeding a first threshold level and operative to indicate the scanning of nuclear cellular material responsive to the magnitude of said derived signal exceeding a second threshold level, means responsive to said distinguishing means for categorizing a cell in one of at least two groups, means for generating a cell simulating signal corresponding to said derived signal for simulating a scanned cell and to be operated upon by said distinguishing means instead of said derived signal, said cell simulating signal generating means including means for controlling the number of simulated line scans during which the instantaneous magnitude of said cell simulating signal exceeds said first and second threshold levels, and the time intervals during each of said simulated line scans during which the instantaneous magnitude of said cell simulating signal exceeds said first and second threshold levels.

34. A system for analyzing biological cells comprising a scanning station, means for controlling the movement of biological cells in essentially single file past said scanning station, means for scanning said cells at the scanning station with line scans of ultra-violet light having a substantial portion of its energy at wavelengths below 300 millimicrons, means for detecting the instantaneous intensity of the ultra-violet light transmitted through said cells scanning station for deriving a signal proportional thereto, means for distinguishing between nuclear and cytoplasmic cellular material along any line scan through a cell in accordance with the derived signal, said distinguishing means operative to indicate the scanning of cytoplasmic cellular material responsive to the magnitude of said derived signal exceeding a first threshold level and operative to indicate the scanning of nuclear cellular material responsive to the magnitude of said derived signal exceeding a second threshold level, means responsive to said distinguishing means for categorizing a cell in one of at least two groups, means for generating a digitized signal from said derived signal, means responsive to said scanning means for generating television synchronizing pulses, and means for combining said digitized signal and said synchronizing pulses to form a video signal representative of digitized cell information.

35. In a system for the line scanning of biological cells in which a signal is derived during each of a plurality of line scans through a cell, the instantaneous magnitude of said derived signal being dependent upon the light absorption characteristics of the cellular material being scanned, the improvement comprising means responsive to said derived signal exceeding a first threshold level for indicating the presence of cytoplasmic cellular material, means responsive to said derived signal exceeding a second threshold level for indicating the presence of nuclear cellular material, means for recognizing the beginning of a cell in accordance with the criteria that said derived signal exceeds a first threshold level during each of a predetermined number of successive line scans, means for recognizing the end of a cell in accordance with the criteria that said derived signal fails to exceed said first threshold level for a predetermined number of successive line scans, means for characterizing a scanned cell in accordance with the sequence that said derived signal exceeds said first and second threshold levels during the line scans through the cell and means for categorizing a scanned cell at the end of the scanning thereof in accordance with the operation of said characterizing means.

36. A system in accordance with claim 35 wherein said categorizing means is operative in response to the magnitude of said derived signal having remained below a fixed threshold level throughout each of a predetermined number of successive line scans.

37. A system in accordance with claim 36 further including means for preventing the operation of said categorizing means at the end of the scanning of cellular material responsive to said derived signal having exceeded a predetermined threshold level during each of a number of line scans through said cellular material which exceeds a predetermined number.

38. A system in accordance with claim 35 further including means for preventing the operation of said categorizing means at the end of the scanning of cellular material responsive to said derived signal having exceeded a predetermined threshold level during each of a number of line scans through said cellular material which exceeds a predetermined number.

39. A system in accordance with claim 35 wherein said characterizing means includes means for generating a first-type pulse while said derived signal exceeds said first threshold level and means for generating a second-type pulse while said derived signal exceeds said second threshold level.

40. A system in accordance with claim 39 wherein said characterizing means includes means for comparing the width of said first-type pulse generated during each line scan through a cell with a predetermined threshold width, and means responsive to the width of a first-type pulse exceeding said threshold width for characterizing the scanned cell as having a non-normal nuclear diameter.

41. A system in accordance with claim 39 wherein said characterizing means includes means for comparing the sum of the widths of the second-type pulses generated during any line scan which extends through the nucleus of a cell to a predetermined threshold width, and means responsive to the sum of the widths of said second-type pulses being less than said threshold width for characterizing the scanned cell as having non-normal cytoplasm shoulders.

42. A system in accordance with claim 39 wherein said characterizing means includes means for forming a signal whose magnitude is dependent upon the relative widths of the first-type and second-type pulses generated during each line scan through a cell, and means responsive to the magnitude of said formed signal exceeding a predetermined threshold level for characterizing a cell as having a non-normal nucleus-to-cell volume relationship.

43. A system in accordance with claim 39 wherein during a line scan which extends through a nucleus of a cell, a single one of said first-type pulses and a pair of said second-type pulses are generated, said pair of second-type pulses occurring respectively earlier and later than said single first-type pulse, and said characterizing means includes first means operative responsive to the width of said earlier second-type pulse exceeding the width of said later second-type pulse during any line scan through a cell, second means operative responsive to the width of said later second-type pulse exceeding the width of said earlier second-type pulse during another line scan through the same cell, and means responsive to the operation of both said first and second means for characterizing the cell as having a nonnormal shape.

44. A system in accordance with claim 35 wherein said characterizing means includes means for integrating that portion of said derived signal which exceeds a predetermined threshold during each line scan through a cell, means for comparing the magnitude of the integrated signal to a predetermined magnitude, and means responsive to the magnitude of said integrated signal exceeding said predetermined magnitude during any line scan through a cell for characterizing the cell as having a non-normal peak nuclear area.

45. A system in accordance with claim 35 wherein said cells are scanned as they move past a scanning station and further including means for maintaining said derived signal below said first threshold level at time periods corresponding to the leading and trailing portions of each line scan.

46. A system in accordance with claim 35 further including means for adjusting the operation of said characterizing means, and means for generating a simulated scanning signal to be operated upon by said characterizing means instead of said derived signal to allow the adjustment of said characterizing means such that thereafter a cell having the characteristics of the cell represented by said simulated signal is characterized in a desired manner, said simulated signal generating means including means for selectively controlling the generated signal to exceed said first threshold level during each of a first selected number of successive line scans, means for selectively controlling the generated signal to exceed said second threshold level during each of a second selected number of successive line scans, and means for controlling the time intervals during each of the line scans simulated by the generated signal that said first and second threshold levels are exceeded.

47. A system in accordance with claim 46 wherein said simulated signal generating means further includes means for selectively controlling the magnitude of the generated signal.

48. A system in accordance with claim 35 wherein said characterizing means includes means for generating a first constant-magnitude signal whenever said derived signal exceeds said first threshold level, means for generating a second constant-magnitude signal whenever said derived signal exceeds said second threshold level, and means for generating a third constant-magnitude signal whenever said derived signal exceeds said first threshold level and is lower than said second threshold level.

49. A system in accordance with claim 35 further including means for deriving a digitized signal whose magnitude is maintained only at selected levels in accordance with the magnitude of said derived signal exceeding respective threshold levels, and means for controlling said characterizing means to characterize a scanned cell in accordance with said digitized signal instead of said derived signal.

50. A system in accordance with claim 35 wherein said characterizing means includes means for identifying a predetermined number of non-normal characteristics in a scanned cell, and further including means for selectively identifying particular ones of said non-normal characteristics and means for controlling the categorization of a scanned cell as non-normal at the end of the scanning thereof responsive to said characterizing means having identified at least one of the selected non-normal characteristics in the cell.

51. A system in accordance with claim 35 further including means for categorizing and counting the scanned cells in accordance with the operation of said characterizing means.

52. A system in accordance with claim 51 further including means for controlling the scanning of cells from different samples in succession, said categorizing and counting means including means for counting the total number of cells which are categorized in any manner, and means for registering if the total number of cells categorized from a sample is less than a predetermined number.

53. A system in accordance with claim 51 further including means for controlling the scanning of cells from different samples in succession, and means responsive to the total number of cells categorized in a particular manner exceeding a predetermined number for inhibiting the further categorizing of cells from the same sample.

* * * * *